US010318057B2

(12) United States Patent
Kneuper et al.

(10) Patent No.: US 10,318,057 B2
(45) **Date of Patent: *Jun. 11, 2019**

(54) TOUCH SCREEN INSTRUMENT PANEL

(71) Applicant: Textron Innovations, Inc., Providence, RI (US)

(72) Inventors: Jeremy Joseph Kneuper, Hesston, KS (US); Christopher Adair Pinkerton, Derby, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,552

(22) Filed: Aug. 16, 2017

(65) Prior Publication Data

US 2017/0344181 A1 Nov. 30, 2017

Related U.S. Application Data

(63) Continuation of application No. 14/642,256, filed on Mar. 9, 2015, now Pat. No. 9,772,712.
(Continued)

(51) Int. Cl.
*B64D 45/00* (2006.01)
*G01C 23/00* (2006.01)
(Continued)

(52) U.S. Cl.
CPC ........... *G06F 3/0416* (2013.01); *B64D 43/00* (2013.01); *G01C 23/00* (2013.01);
(Continued)

(58) Field of Classification Search
CPC .... G08G 5/0052; G08G 5/065; G08G 5/0008; B64D 45/00; G01C 23/00; G01C 21/00;
(Continued)

(56) References Cited

U.S. PATENT DOCUMENTS 5,208,590 A 5/1993 Pitts
5,272,652 A 12/1993 Rosenshein et al.
(Continued)

FOREIGN PATENT DOCUMENTS

EP 1775556 B1 5/2011
EP 2623935 A1 7/2013

OTHER PUBLICATIONS

G. Hines, Z. Rahman, D. Jobson, G. Woodell and S. Harrah, "Real-time Enhanced Vision System," SPIE Defense and Security Symposium 2005, Orlando, FL, Apr. 2005.
(Continued)

*Primary Examiner* — Yuri Kan
(74) *Attorney, Agent, or Firm* — Erise IP, P.A.

(57) ABSTRACT

Systems, methods and computer-storage media are provided for a touch-screen interface panel (TSIP) of an aircraft. The TSIP may communicate with one or more aircraft systems. In other words, the TSIP is configured to display information of one or more aircraft systems. For example, the TSIP may receive a request for weather information. In response, the TSIP receives weather information from a weather system and displays it via the TSIP screen. In another example, the TSIP may display warnings or alerts that are detected by an aircraft warning system, maintenance system, or the like. Furthermore, information that may have typically been looked up physically or called in to a tower may now be provided via the TSIP by the interfacing of the TSIP with the systems maintaining the information. For example, a charts database may communicate with the TSIP and the information thereof displayed via the TSIP.

20 Claims, 60 Drawing Sheets

Related U.S. Application Data

(60) Provisional application No. 61/951,145, filed on Mar. 11, 2014, provisional application No. 61/951,189, filed on Mar. 11, 2014, provisional application No. 61/951,260, filed on Mar. 11, 2014, provisional application No. 61/951,231, filed on Mar. 11, 2014, provisional application No. 61/951,240, filed on Mar. 11, 2014, provisional application No. 61/951,243, filed on Mar. 11, 2014, provisional application No. 61/951,157, filed on Mar. 11, 2014, provisional application No. 61/951,168, filed on Mar. 11, 2014, provisional application No. 61/951,201, filed on Mar. 11, 2014, provisional application No. 61/951,152, filed on Mar. 11, 2014, provisional application No. 61/951,195, filed on Mar. 11, 2014, provisional application No. 61/951,208, filed on Mar. 11, 2014, provisional application No. 61/951,220, filed on Mar. 11, 2014, provisional application No. 61/951,234, filed on Mar. 11, 2014, provisional application No. 61/951,166, filed on Mar. 11, 2014, provisional application No. 61/951,215, filed on Mar. 11, 2014, provisional application No. 61/951,253, filed on Mar. 11, 2014, provisional application No. 61/951,216, filed on Mar. 11, 2014, provisional application No. 61/951,223, filed on Mar. 11, 2014.

(51) Int. Cl.
*G06F 3/041* (2006.01)
*B64D 43/00* (2006.01)
*G08G 5/00* (2006.01)
*G08G 5/02* (2006.01)
*G06F 3/0488* (2013.01)

(52) U.S. Cl.
CPC ....... *G06F 3/04883* (2013.01); *G08G 5/0021* (2013.01); *G08G 5/0034* (2013.01); *G08G 5/0052* (2013.01); *G08G 5/0078* (2013.01); *G08G 5/0091* (2013.01); *G08G 5/025* (2013.01); *G08G 5/0065* (2013.01)

(58) Field of Classification Search
CPC .. G01C 23/005; B64C 39/10; H04N 13/0497; A62B 18/082; G06F 3/0416; G06F 3/041
See application file for complete search history.

(56) References Cited

U.S. PATENT DOCUMENTS 6,636,786 B2 10/2003 Partel
6,687,578 B2 * 2/2004 Lehman ................ G01C 23/00 701/3
7,262,707 B2 8/2007 Kaoh
7,382,288 B1 6/2008 Wilson et al.
7,420,476 B2 9/2008 Stiffler
8,515,658 B1 8/2013 Foster et al.
8,552,889 B2 10/2013 Lutz et al.
8,554,457 B2 * 10/2013 White .................... G08G 5/065 701/120
8,564,544 B2 10/2013 Jobs et al.
8,570,192 B2 * 10/2013 McLoughlin .......... B64D 45/00 340/945
8,600,675 B1 12/2013 Borghes et al.
8,626,360 B2 1/2014 Komer et al.
8,633,913 B1 1/2014 Raghu et al.
8,634,972 B2 1/2014 Matthews, Jr. et al.
8,659,447 B2 2/2014 Francois et al.
8,660,718 B2 2/2014 Holder
8,666,649 B2 3/2014 Otto et al.
9,245,242 B2 1/2016 Arnold et al.
9,302,780 B2 4/2016 Zaneboni et al.
9,478,140 B2 10/2016 Kathirvel et al.
2001/0035832 A1 11/2001 Block
2003/0078704 A1 4/2003 Partel
2003/0156046 A1 8/2003 Dwyer
2004/0140959 A1 7/2004 Matsumura et al.
2004/0199307 A1 10/2004 Kipersztok et al.
2004/0236481 A1 11/2004 Saint-Aroman et al.
2005/0007261 A1 1/2005 Berson et al.
2006/0164261 A1 7/2006 Stiffler
2006/0238402 A1 10/2006 Khatwa
2007/0130591 A1 6/2007 Brady, Jr. et al.
2007/0164168 A1 7/2007 Hirvonen
2009/0238378 A1 * 9/2009 Kikinis .............. H04N 13/0497 381/92
2010/0231418 A1 * 9/2010 Whitlow ................ G01C 23/00 340/945
2010/0256863 A1 10/2010 Nielsen et al.
2010/0262318 A1 * 10/2010 Ariens ................... G01C 21/00 701/3
2012/0035849 A1 * 2/2012 Clark ..................... G01C 23/00 701/467
2012/0265372 A1 10/2012 Hedrick
2013/0135328 A1 5/2013 Rappoport et al.
2013/0245860 A1 * 9/2013 Cooper .................. B64D 45/00 701/14
2014/0172204 A1 * 6/2014 Coulmeau ............ G01C 23/005 701/14
2014/0347197 A1 * 11/2014 Boomgarden ....... A62B 18/082 340/980
2015/0210388 A1 * 7/2015 Criado .................... B64C 39/10 701/3
2015/0217856 A1 8/2015 Mesguen et al.

OTHER PUBLICATIONS

International Search Report and Written Opinion issued in PCT/US2015/019437, dated Jun. 18, 2015, 14 pages.
Mangion, D., et al, "A Single Interactive Display Concept for Commercial and Business Jet Cockpits," 11th AIAA Aviation Technology, Integration and Operations (AIIO) Conference, Virginia Beach, VA, Sep. 2011.

* cited by examiner

TOUCH SCREEN INSTRUMENT PANEL

CROSS REFERENCE TO RELATED APPLICATIONS

This application is a continuation of U.S. patent application Ser. No. 14/642,256, filed Mar. 9, 2015, which claims the benefit of each of U.S. Provisional Application No. 61/951,145; U.S. Provisional Application No. 61/951,189; U.S. Provisional Application No. 61/951,260; U.S. Provisional Application No. 61/951,231; U.S. Provisional Application No. 61/951,240; U.S. Provisional Application No. 61/951,243; U.S. Provisional Application No. 61/951,157; U.S. Provisional Application No. 61/951,168; U.S. Provisional Application No. 61/951,201; U.S. Provisional Application No. 61/951,152; U.S. Provisional Application No. 61/951,195; U.S. Provisional Application No. 61/951,208; U.S. Provisional Application No. 61/951,220; U.S. Provisional Application No. 61/951,234; U.S. Provisional Application No. 61/951,166; U.S. Provisional Application No. 61/951,215; U.S. Provisional Application No. 61/951,253; U.S. Provisional Application No. 61/951,216; and U.S. Provisional Application No. 61/951,223 all filed Mar. 11, 2014. The entireties of each of the aforementioned applications are incorporated by reference herein.

BACKGROUND

Aircraft instrument panels are largely composed of instruments dedicated to a single purpose, such as displaying a single piece of information or receiving a specific type of control input from a user. These instruments typically include gauges, dials, buttons, switches, text or graphic display monitors, and other similar components. As a result of their single purpose and physical arrangement, the instrument panel has limited flexibility and customizability. The instruments are in fixed locations and are limited in what information they can display or input they can receive from the user.

Also, since typically an aircraft must provide functionality for both a pilot and a co-pilot, the instrument panel includes duplicate instruments to provide for two users. This reduces the effective area of the instrument panel available for the display of information.

A flexible, customizable instrument panel, utilizing touch screen technology and providing a user friendly, intuitive interface for receiving information and controlling the aircraft are described. A user interface that provides a synoptic, summary overview of the aircraft configuration and operation is also described.

SUMMARY

This summary is provided to introduce a selection of concepts in a simplified form that are further described below in the Detailed Description. This summary is not intended to identify key factors or essential features of the claimed subject matter, nor is it intended to be used as an aid in determining the scope of the claimed subject matter.

In some embodiments, the invention comprises a method for providing information using a touch-screen instrument panel (TSIP). The method comprises receiving an indication to display information associated with an aircraft via the TSIP; receiving information associated with the aircraft from a plurality of systems managing aircraft or flight information; and providing on the TSIP at least one user interface, the at least one user interface corresponding to the indication, and the at least one user interface being associated with a first system of the plurality of systems.

In some embodiments, the invention comprises a method for controlling an aircraft having a touch screen instrument panel. An onboard computer is connected to the touch screen instrument panel. The inventive method includes the steps of displaying a synoptic user interface panel on a portion the touch screen instrument panel, providing information about the aircraft from the onboard computer on the at least one synoptic user interface panel, and receiving control input to the onboard computer through the at least one synoptic user interface panel. In some embodiments, the method further involves modifying the state of the aircraft in response to the control input.

In some embodiments, the synoptic user interface panel includes a depiction of all or a portion of an aircraft and associates one or more display elements associated with the graphical depiction of the aircraft. In some embodiments, the panel graphically depicts an aircraft, and in some embodiments the panel symbolically depicts an aircraft. The panel may include both graphically and symbolically depicted elements.

In various embodiments the display elements depict components of the aircraft, and show them in relation to the graphical depiction of the aircraft on the synoptic user interface panel. In some embodiments, the method includes displaying information on the synoptic user interface panel from the onboard computer about a component of the aircraft in relation to the display element depicting the component.

In other embodiments, the system receives control input by sensing a touch input on the portion of the touch screen instrument panel on which the synoptic user interface panel is displayed; and determining a display element associated with the touch input.

The method of controlling the aircraft may also include modifying the state of the aircraft by determining the component of the aircraft depicted by the display element associated with the touch input, and modifying the state of the component of the aircraft in response to the touch input.

In some embodiments, the system automatically updates the information from the onboard computer that is displayed on the display element to represent the state of the aircraft. In varying embodiments, the display elements are automatically modified by altering the color, text or numerical value, shape, or configuration of the display element to represent the state of the aircraft.

The synoptic user interface panel in some embodiments are selected from the group consisting of an anti-icing systems panel, an environmental control systems panel, an electrical systems panel, a flight control panel, an hydraulic systems panel, an exterior light panel, an oxygen systems panel, a cabin pressurization panel, a propulsion systems panel, an internal light panel, and a cabin window shade panel.

To allow for customization of the instrument panel, some embodiments allow a user to drag a synoptic user interface panel to a desired location on the touch screen instrument panel. In some embodiments, the user can pin the user interface panel in a desire location by actuating an icon displayed in the synoptic user interface panel thereby preventing the synoptic user interface panel from being moved from the desired location. Then the user may touch the touch screen instrument panel in the area depicting the synoptic user interface panel to manipulate the information provided on the synoptic user interface panel. When the user is finished manipulating the information in the user interface panel, the user may actuate the icon to unpin the at least one user interface panel allowing the panel to be moved from the desired location. In some embodiments of the user interface, one user interface panel may overlay a second user interface panel.

In some embodiments, the display element depicts a control surface of the aircraft; and the system modifies the aircraft in response to input by repositioning the control surface. In some of those embodiments, the display element depicts an internal or external light and actuating it modifies the state of the aircraft by turning the internal or external light on or off. In other embodiments, the display element depicts an electrical component, and actuating it modifies the state of the aircraft by actuating the electrical component. In some of those embodiments, the electrical component is a power generator, a relay, or an electrical bus. In other embodiments, the display element depicts a hydraulic valve, a pneumatic valve, or a fuel valve, and actuating it modifies the state of the aircraft by opening or closing the valve.

In some embodiments, the display element is an icon associated with the depiction of all or a portion of an aircraft. In some of those embodiments, receiving control input comprises sensing a touch input on the icon. In some the embodiments, the icon is associated with an anti-icing system, and actuating the icon modifies the state of the aircraft by turning the anti-icing system on or off. In other embodiments, the icon is associated with the temperature of a portion of the aircraft, and actuating the icon modifies the state of the aircraft by increasing or decreasing the temperature settings for the portion of the aircraft. In some embodiments, the icon is associated with the position of a control surface for the aircraft, and actuating the icon modifies the state of the aircraft by repositioning the control surface. In other embodiments, the icon is associated with an aircraft system selected from a hydraulic system, a lighting system, an oxygen system, a climate control system, a fuel system, and a cabin control system, and the step of modifying the state of the aircraft comprises modifying a component in the aircraft system.

In one embodiment, a flight planning system for navigation of an aircraft is provided. The system includes a storage component having one or more instructions stored thereon, a touch screen display device, a processor coupled to the display device and a memory. The processor is configured to execute the one or more instructions stored in the storage component. The system further includes a manager configured to provide navigational views via the touch screen display device in an aircraft cockpit. The manager includes a mapping interface for displaying one or more maps on the touch screen display device, a charts component for displaying one or more aeronautical charts on the touch screen display device, a radio frequency component for receiving and displaying one or more radio frequencies on the touch screen display device, a weather component for displaying one or more weather representations, wherein the one or more weather representations overlays the one or more maps on the touch screen display device, and a virtual flight plan component for displaying one or more simulated flight plans on the touch screen display device.

In another embodiment, a method for flight planning utilizing an interactive map on a touch screen device in an aircraft cockpit is provided. The method includes receiving a set of flight rules, receiving an indication of both an origin airport and a destination airport via the touch screen device, and based on each of the set of flight rules and the origin and destination airports, displaying a flight path on the map.

In yet another embodiment, a method for providing a chart on a touch screen device is provided. The method includes presenting a list of menu options on a touch screen mounted in an aircraft cockpit, said list including a charts function. The method further includes receiving a selection of the charts function, in the charts function receiving an indication of an airport, upon identifying the airport, enabling selection of (i) an approach or departure, (ii) a navigation method, (iii) a runway, and based on the selections, identifying corresponding charts and automatically displaying the corresponding charts on the touch screen device.

In an embodiment, a method for providing navigational aids is provided. The method recites receiving an indication of a flight path that includes one or more waypoints, wherein a waypoint is a coordinate in physical space; generating a graphical representation of the flight path, wherein the graphical representation includes a plurality of planes (path indicators) along the flight path, wherein each plane is associated with a slope and an angle for an orientation of a vehicle navigating the flight path; and dynamically updating the graphical representation relative to an updated location of the vehicle.

In another embodiment, a method for providing navigational aids is provided. The method includes identifying one or more airports proximate to a location of an aircraft, wherein proximate is within a predefined distance from the aircraft; identifying information associated with the one or more airports including, at least, an airport identifier and a distance from the aircraft; generating an airport icon for each of the one or more airports; providing the airport icon for each of the one or more airports, wherein the airport icon for each of the one or more airports is provided in a three-dimensional real-time image; and updating the one or more airports and airport icons based on an updated location of the aircraft.

In yet another embodiment, one or more computer-storage media having embodied thereon computer-usable instructions that, when executed, facilitate a method for providing navigational aids is provided. The claim recites identifying a location of a first aircraft; identifying any traffic within a predetermined distance of the first aircraft, wherein traffic includes other aircraft; determining that a second aircraft is within the predetermined distance of the first aircraft; generating a traffic user interface panel that includes information associated with the second aircraft including an airspeed of the second aircraft, wherein the traffic user interface panel is provided via a touch-screen instrument panel overlaying a real-time image; and monitoring the predetermined distance from the first aircraft and updating according to an updating location of the first aircraft.

In an embodiment, a method for displaying a real-time view within an aircraft is provided. The method comprises receiving an indication of a synthetic vision application, wherein the indication enables the synthetic vision application for the real-time view; identifying a synthetic vision application value to apply to the real-time view; applying a synthetic vision enhancement to the real-time view according to the synthetic vision application value; and generating a modified real-time view where the modified real-time view is enhanced by synthetic vision as indicated by the synthetic vision application value.

In another embodiment, a system for displaying a real-time view within an aircraft is provided. The system comprises a processor; and a memory having embodied thereon instructions that, when executed by the processor, cause a computing device to perform a method for displaying the real-time view within the aircraft, the method comprising: receiving an indication of a synthetic vision application, wherein the indication enables the synthetic vision application for the real-time view; identifying a synthetic vision application value to apply to the real-time view; applying the synthetic vision application value to the real-time view; and generating a modified real-time view where the modified real-time view is the real-time view enhanced by synthetic vision as indicated by the synthetic vision application value.

In yet another embodiment, one or more computer-storage media having embodied thereon computer-usable instructions that, when executed, facilitate a method of displaying a real-time image within an aircraft is provided. The claim recites receiving an indication to enable synthetic vision; based on the indication to enable synthetic vision, generating a second image including a synthetic vision enhancement overlaying the real-time image; receiving an indication to include weather data in the second image; and generating a modified second image that includes each of the synthetic vision enhancement and the weather data overlaying the real-time image.

In one embodiment, a flight-control system for navigation of an aircraft is provided. The system includes a storage component having one or more instructions stored thereon, a touch screen display device, a processor coupled to the display device and a memory. The processor is configured to execute the one or more instructions stored in the storage component. The system further includes a manager configured to provide flight-control surface representations via the touch screen display device in an aircraft cockpit. The manager includes a graphical image of the aircraft for displaying flight-control surface representations and one or more position indicators for indicating one or more positions of the aircraft flight-control surfaces. The graphical image and the position indicators are configured to receive indications for controlling positions of the aircraft flight-control surfaces and to display actual aircraft flight-control surface positions.

In another embodiment, a flight-control system for navigation of an aircraft is provided. The system includes a storage component having one or more instructions stored thereon, a touch screen display device, a processor coupled to the display device and a memory. The processor is configured to execute the one or more instructions stored in the storage component. The system further includes a manager configured to provide autopilot controls and engine indicators via the touch screen display device in an aircraft cockpit. The manager includes a cross-sectional representation of the aircraft fuselage for displaying a mode controller. The mode controller is configured to display autopilot modes and to receive autopilot mode selections. The cross-sectional representation further includes one or more engine cowls attached to the fuselage for displaying performance indicators for the one or more engines.

In yet another embodiment, a method for controlling an aircraft flight-control surface via a touch screen device is presented. The method includes presenting a list of menu options on a touch screen mounted in an aircraft cockpit, said list including a flight-control function. The method further includes receiving a selection of the flight-control function. Upon selection of the flight-control function, the method includes receiving an indication of a flight-control surface to control. Upon identifying the flight-control surface, the method includes enabling selection of a position change. Based on the position change selection, the method includes verifying a corresponding movement of the flight-control surface to the selected position and displaying an actual position of the flight-control surface on the touch screen device.

In various embodiments, methods for increasing awareness of users, e.g., a pilot or crew member, are provided. In one aspect, the method alerts the aircraft crew of a relevant condition. The method in one embodiment consists of receiving information from an aircraft warning system regarding a condition, displaying an awareness-enhancing indication on a touchscreen display in an aircraft cockpit. Further, the awareness-enhancing indication is communicated to the pilot or crew member in a way that suggests a need to investigate the existence of the condition. Finally, the awareness-enhancing indication is located peripherally on the display, at the margins in some embodiments.

In another aspect, the method involves receiving information regarding a real-time value for an aircraft-parameter (e.g., the parameter being relevant to a condition of an aircraft system). Then, a window including graphic representative of an aircraft component relevant to the parameter is displayed such that it is accompanied with a real-time value of the aircraft-parameter proximate the graphic.

In another aspect, the method could generate an awareness-enhancing indication on a display in response to an alert regarding a condition, where the condition regards a real-time value of a parameter on an aircraft. Further, a menu item is highlighted, and the menu item enables a crew member to bring up a window displaying an option for changing the condition. In some versions, the option for changing is presented in the form of an action button.

In yet another aspect, the method involves receiving information regarding a real-time value for an aircraft-parameter where the parameter is relevant to a condition in an aircraft system. Then the real-time value is communicated to a user in a historical context (e.g., using a time-line representation in a chart).

Systems are also disclosed. In one embodiment, the system includes a touch-screen device incorporated into an aircraft cockpit. The touch-screen is arranged to interface with a computer on the aircraft. The computer receives information regarding a parameter relating to a condition in one of an electrical or a mechanical system. Then, a first process operating on the computer displays a graphic related to the condition. Then, a second process enables the user to institute a corrective action regarding the condition.

Further embodiments and aspects will become apparent by reference to the drawings and by study of the following detailed description.

BRIEF DESCRIPTION OF THE DRAWINGS

Illustrative embodiments of the present invention are described in detail below with reference to the attached figures, which are incorporated by reference herein and wherein.

DETAILED DESCRIPTION

Embodiments of the present invention provide a touch-screen interface panel (TSIP) in a cockpit of an aircraft.

Figure 1:
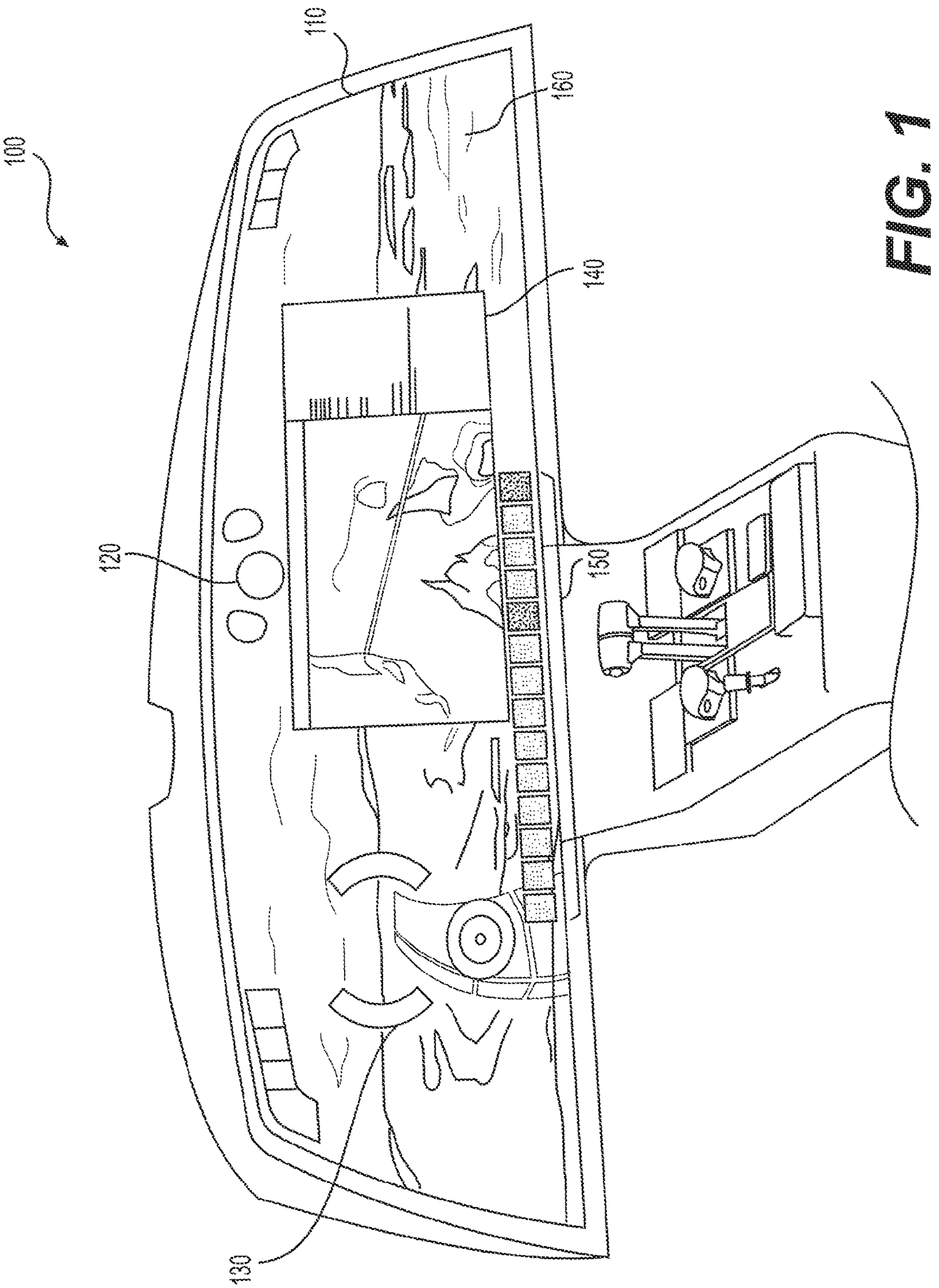
FIG. 1 depicts a perspective view of an embodiment of a touch-screen instrument panel system for an aircraft, in accordance with an embodiment of the present invention.

Referring to FIG. 1, a representation 100 of a touch-screen instrument panel (TSIP) is illustrated. The TSIP replaces the plurality of instruments, dials, gauges, and screens typically utilized on the console of an aircraft. The TSIP is configured for at least a touch screen implementation. In some embodiments, the TSIP may span the width of a cockpit of an aircraft. As illustrated in FIG. 1, the TSIP is the width of the cockpit and may be accessed by both a pilot, co-pilot, and the like.

The TSIP is a digital information panel and may include a plurality of digital layers. The digital layers may overlay one another to create multiple views. For instance, and as will be described in further detail below, one layer may be a real-time view while another layer may be a three-dimensional representation of, for example, weather while another layer may include flight instruments and may not be obstructed with any other layers or representations. A processor, similar to that onboard computer 201 of FIG. 2, for example, may stack the plurality of digital images to provide a complete real-time image including the real-time view and any other additional information stacked on top of it as deemed appropriate by the user. Additional information may include synthetic vision, three-dimensional weather, information regarding traffic or airports, etc. Furthermore, the TSIP may be configured such that, in the event of a failure or malfunction of the TSIP, each digital layer is cleared so that the flight instruments are accessible/viewable to users.

Turning back to FIG. 1, the representation 100 includes the TSIP 110, one or more flight instrument displays 120, one or more navigational displays 130, one or more user interface panels 140, a menu 150, and the real-time view 160. Initially, the real-time view displayed by the TSIP may be captured by a high-definition (HD) camera on the exterior of the aircraft. In an embodiment, the HD camera is mounted to the nose of the aircraft. The camera may be mounted in any appropriate position to capture a real-time view that gives a display of a view ahead of an aircraft. Additionally, as will be further discussed herein, the real-time view may be altered or enhanced by, for instance, synthetic vision enhancements.

The TSIP 110 further includes one or more flight instrument displays 120. The flight instrument display 120 may be configured to include any necessary information regarding the current configuration of the aircraft. Additionally, the flight instrument display 120 may be identically reproduced such that a plurality of users has easy access to the one or more flight instrument displays 120. By way of example, the flight instrument display 120 illustrated in FIG. 1 may be identically reproduced and positioned on the opposite side of the TSIP 110.

The TSIP 110 further includes one or more navigational displays 130. Similar to the one or more flight instrument displays 120, the one or more navigational displays 130 may be positioned anywhere within the TSIP 110. Additionally, the one or more navigational displays 130 may be reproduced for ease of access for multiple users. Given the size of the TSIP 110, the reproduction may be convenient when there is more than one user requiring access to the one or more navigational displays 130.

The TSIP 110 may include one or more user interface panels 140. The one or more user interface panels 140 may be displayed alone or in combination with other panels. The panels 140 display information and accept input from a user regarding various aircraft systems. Exemplary panels provide information regarding, but not limited to, anti-icing systems, environmental control systems, electrical systems, flight controls, hydraulic systems, cabin pressurization systems, interior and exterior lighting, propulsion systems, cabin window shades, weather maps, charts, maps, alerts, system information notifications, maintenance notifications, flight plans, traffic alerts, etc. Depending on the information displayed, user interface panels may be presented automatically (e.g., without user input) or upon receipt of a user input.

The TSIP 110 may further include a menu 150. The menu may include one or more selectors to aid a user in navigating the TSIP 110. For example, the menu 150 may include a weather indicator that provides a weather user interface panel. The menu 150 may also include a charts indicator to access various charts. Any feature that may be accessed via the TSIP may be represented in the menu 150. Various features will be described herein and in several of the applications related by subject matter, referenced above, and herein incorporated by reference in their entirety.

Additionally, the TSIP 110 may include a real-time view 160. The real-time view 160 may be an ahead-type view illustrating the view ahead of an aircraft. The real-time view 160 may be captured, as previously mentioned, by a camera mounted to the aircraft. The real-time view 160 may be a real-time panoramic view. Panoramic, as used herein, refers to a wide-angle view. In additional embodiments, infrared imaging may be used in the real-time view to aid in navigation at night, for instance.

Figure 2:
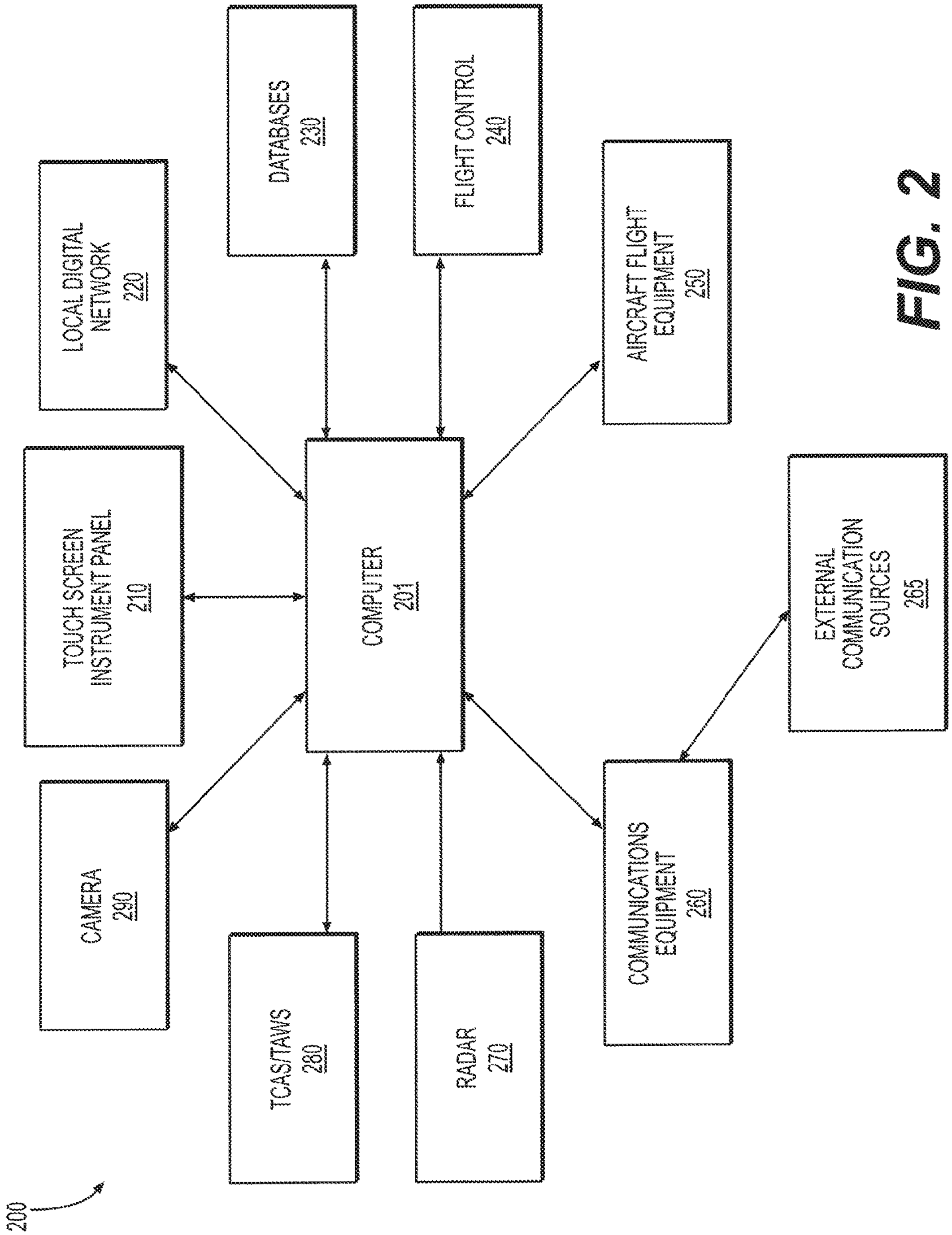
FIG. 2 depicts a system diagram for an embodiment of a touch-screen instrument panel system for an aircraft, in accordance with an embodiment of the present invention.

FIG. 2 provides an embodiment of a system environment 200 including an aircraft touch-screen instrument panel (TSIP) 210. System environment 200 has a network of subsystems that includes an on-board computer 201, the TSIP itself 210, a local digital network 220, databases 230, a flight controller 240, aircraft flight equipment 250, communications equipment 260, radar 270, an anti-collision and terrain awareness 280, and a camera 290. Communications equipment 260 communicates with external communication sources 265, which are not physically located onboard the aircraft (for example, terrestrial communications, satellites, and other aircraft). TSIP 210 interacts with the subsystems of system environment 200 through computer 201.

On-board computer 201 includes for example non-volatile memory, software, and a processor. TSIP 210 serves as a user interface for computer 201. Memory stores software that includes machine readable instructions, that when executed by processors provide control and functionality of system environment 200 as described herein. Computer 201 has for example electronic circuitry including relays and switches to electrically connect with components of system environment 200. In an embodiment, computer 201 includes a first computer and a second computer located on-board the aircraft, where the second computer mirrors the first computer, thereby providing redundancy in the event of a computer failure. It should be recognized that where a single computing device (e.g., computer 201) is represented graphically, the component might be represented by multiple computing units in a networked system or have some other equivalent arrangement which will be evident to one skilled in the art.

TSIP 210 provides a user interface for visualizing and controlling subsystems of system environment 200 through computer 201. TSIP 210 includes a substrate that supports a display and a touch membrane. Substrate is a transparent material such as glass, acrylic, polycarbonate or other approved for flight materials on which display and touch membrane are overlaid. In an embodiment, substrate is made of flexible material for conforming to aircraft cockpit dimensions, including complex shapes such as corners. In an embodiment, substrate has a large aspect ratio for providing images. Display is for example an organic light-emitting diode (OLED) display, which is thin and flexible for layering onto substrate. When unpowered, the display is, in embodiments, transparent. Touch membrane is a thin, transparent and flexible material that is layered onto display and capable of sensing touch. Touch membrane is for example a resistive, capacitive, optical, or infrared touch screen. Together, touch membrane and display provide TSIP 210 with a visual display that a user may control by touching with one or more fingers or a stylus.

Local digital network 220 provides a digital connection between computer 201 and on-board subsystems, such as cabin management subsystem (CMS) and in-flight entertainment (IFE). CMS includes for example cabin lighting, heating, air conditioning, water temperature, and movement of shades. IFE includes for example audio and video content. TSIP 210 provides an interface for monitoring and controlling CMS and IFE over local digital network 220.

Databases 230 are digital databases stored in memory of computer 201 on-board the aircraft. Databases 230 include charts, manuals, historical aircraft component data, and checklists. Databases 230 allow pilots to quickly access and search information via computer 201. TSIP 210 displays the information such that pilots maintain a heads-up view while piloting an aircraft. Historical aircraft component data is for example updated during flight with data from aircraft flight equipment 250 (e.g., sensors) via computer 201.

Flight controller 240 provides navigation, avionics, and autopilot functions. In an embodiment, flight controller 240 is a standalone unit supplied by an independent manufacturer (e.g., Garmin, Honeywell, Rockwell Collins). TSIP 210 displays aircraft information from flight controller 240 via computer 201 such as airspeed, altitude, heading, yaw, and attitude (i.e., pitch and bank).

Aircraft flight equipment 250 includes flight control surfaces, engines, deicing equipment, lights, and sensors (e.g., temperature, pressure, electrical). Aircraft flight equipment 250 is monitored and controlled by pilots using TSIP 210 through computer 201 for flying aircraft.

Communications equipment 260 allows pilots to communicate with one another, with passengers, and with airports and other aircraft. Communications equipment 260 includes radios, phones, and internal and external digital networks (e.g., Internet and Intranet). Different frequency bands are used for example to transmit and receive data with multiple recipients. TSIP 210 allows pilots to communicate with others by using communications equipment 260 via computer 201.

Communications equipment 260 includes a transceiver configured to communicate with external communication sources 265, which include for example terrestrial based communication towers, satellites, and other aircraft. External communication sources 265 also provide communications with for example radio, global positioning system (GPS), and Internet. TSIP 210 provides a user interface for communicating with external communication sources 265, enabling a pilot or co-pilot to communicate with air traffic control, terrestrial communication towers (e.g., navigation towers, waypoints), satellites, and directly with other aircraft for example. TSIP 210 allows pilots to receive and transmit external communications through communications equipment 260 and computer 201.

Satellites provide network links for phone and internet communications, and GPS information. Aircraft interact with satellites using communications equipment 260 to transmit and receive radio frequency signals. TSIP 210 allows pilots to communicate via satellites through computer 201 and communications equipment 260.

Other aircraft within view of camera 290 are displayed in real-time on a panoramic view provided by TSIP 210. Information about other aircraft, which may be retrieved from radar 270 or radio communication, is displayed for improved pilot awareness and ease of contact.

Radar 270 includes equipment for determining a location and speed of objects from radio waves. Equipment for radar 270 includes a radio transmitter for producing pulses of radio waves and an antenna for receiving a reflected portion of the radio waves from nearby objects. TSIP 210 receives information from radar 270 via computer 201 and uses the information to display the location of nearby objects, such as weather, terrain and other aircraft.

Anti-collision and terrain awareness 280 includes a traffic collision avoidance subsystem (TCAS) and a terrain awareness and warning subsystem (TAWS). Anti-collision and terrain awareness 280 includes radar 270 and transponder information to determine aircraft position relative to other aircraft and Earth terrain, and to provide appropriate warning signals. TSIP 210 displays these warnings and allows pilots to respond to them by, for example, silencing an audible warning signal.

Camera 290 provides forward looking images to TSIP 210 through computer 201. Camera 290 is mounted for example under the aircraft nose. In alternative embodiments, camera 290 is located on the tail or on aircraft wings. Camera 290, in embodiments, receives one or both of visible light as well as infrared (IR) light. Further, in embodiments, camera 290 provides high-definition (HD) quality images (e.g., using an HD capable camera). In a preferred embodiment, camera 290 provides HD quality and IR functionality. Alternatively, camera 290 might include two separate cameras, one for HD quality and a second camera for IR imaging.

Camera 290 provides images to computer 201, which renders the images for real-time projection on TSIP 210. TSIP 210 projects HD panoramic views looking forward and below from the front of the aircraft. The forward view spans an angle of about 120° to about 180° for example. In an embodiment, TSIP 210 uses IR imaging to project a synthetic view, which is for example useful at night or when flying through clouds or fog that obscure visible light.

Various components of the user interface displayed on TSIP 210 are designed to provide a synoptic view of the condition of the aircraft, meaning that the user interface components provide an intuitive, broad view of the aircraft, its various components and subsystems, and their condition. The user interface utilizes the touch screen functionality of the TSIP 210 to present views of the aircraft to intuitively communicate information and accept input from the pilot. The views of the aircraft incorporate graphical, textual, and numerical elements to simultaneously convey multiple pieces of information to the pilot. The graphical, textual, and numerical elements of the user interface may flash, change color, change content, appear, disappear, move or change location, or otherwise change in response to user input or the state of the aircraft systems.

The computer 201 monitors the aircraft's data busses to determine the positions, temperatures, pressures, and states of various equipment and systems of the aircraft. TSIP 210 graphically displays the data gleaned from the busses and stored in computer 201 in the appropriate synoptic panels or windows for flight crew interaction. The inventive user interface provides a thorough, easily understood, intuitive and user-friendly interaction with each synoptic user interface. The touch screen functionality of TSIP 210 also allows the user to activate aircraft systems and change configuration settings through user interface displayed on TSIP 210.

The user interface may provide a variety of user interface elements grouped into a variety of "windows", which may also be referred to as "panels" or "pages. Some user interface elements are common to a plurality of the synoptic user interface panels. For example, each user interface panel may comprise a border surrounding the information displayed in the user interface and defining a "panel". A title for each user interface may be displayed within the panel or on the border of the panel area. In some embodiments, the title is displayed in the top or the bottom left or right corner of the panel. The title may optionally be displayed as an abbreviation. Similar to other known graphical user interfaces, each "window" or "panel" may be provided with controls for closing or minimizing the panel to remove it from active display on TSIP 210. Various embodiments of the panels that are presented in TSIP 210 are described in relation to FIGS. 4A through 4E and FIGS. 4G through 4K.

In some embodiments of the user interface, a silhouette, cross-section, or other diagram of an aircraft is utilized to illustrate the state of the aircraft and convey relevant information to the pilot. The diagram of an aircraft may be a top, bottom, side, front, back, or perspective view of an aircraft. The windows may incorporate both static elements and active controls. Static elements comprise elements that are fixed or are updated automatically by the system to display the current aircraft configuration. Active controls may be updated automatically by the system to display the current aircraft configuration, but are also capable of interacting with the user via TSIP 210 to receive pilot input.

Figure 3A:
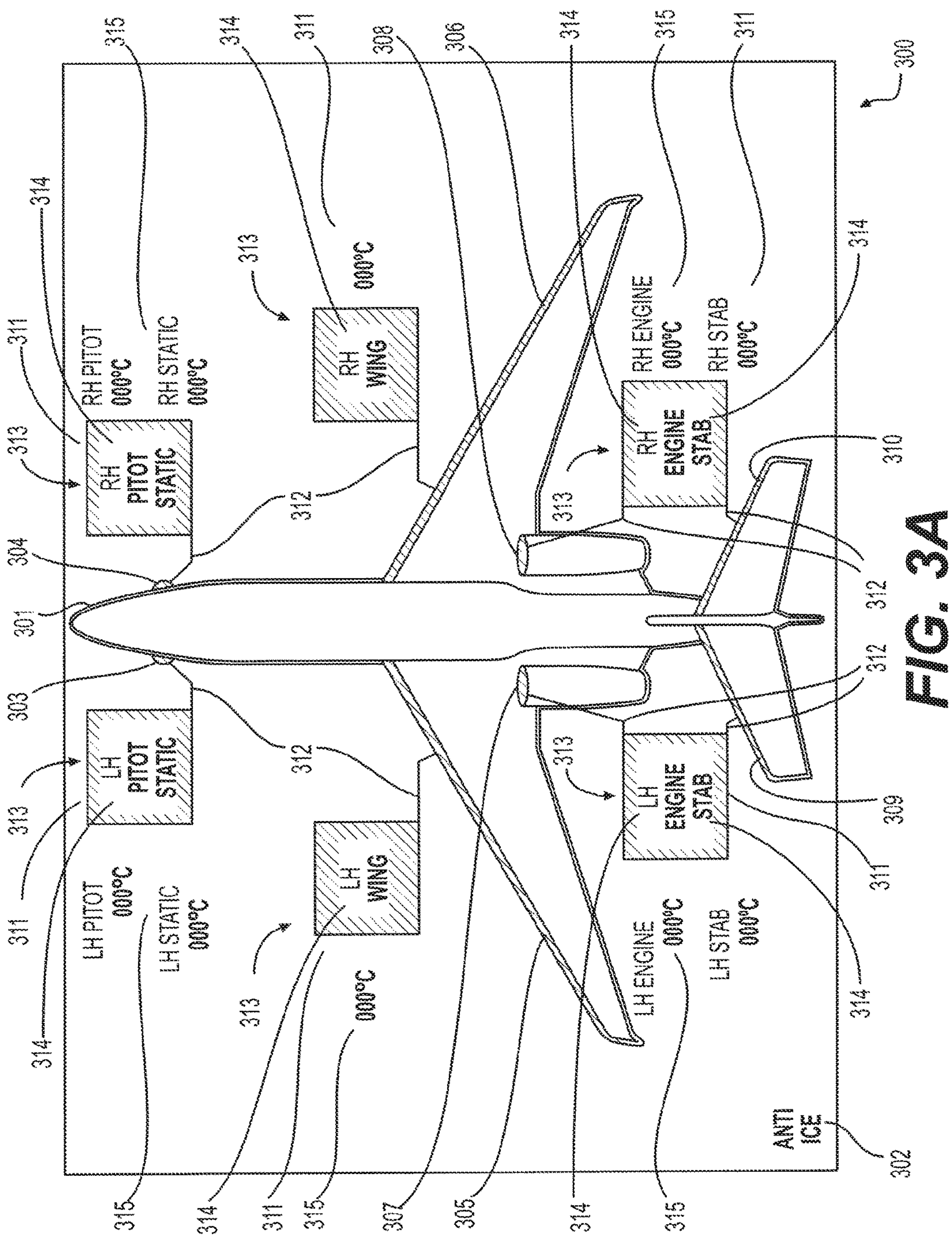
FIG. 3A depicts a synoptic user interface for aircraft anti-icing systems information 300, in accordance with an embodiment of the present invention.

FIG. 3A depicts an embodiment of a synoptic user interface panel for aircraft anti-icing systems information 300. The user interface depicts a top view 301 of an aircraft. The title 302 is displayed in the lower left corner of the window, though in other embodiments it may be located elsewhere or not provided at all. Various components of the anti-icing systems of the aircraft are depicted on top view 301 in relation to their actual location on the aircraft. In the depicted embodiment, these systems include pitot tubes 303 and 304, wing anti-icing systems 305 and 306, engine inlets 307 and 308, and stabilizer anti-icing systems 309 and 310. The anti-icing systems are shown on top view 301 in their general location on an actual aircraft. In some embodiments, the color of each of the systems 303 through 310 on top view 301 may be modified individually to provide a status for each anti-icing system. In some embodiments, the systems are depicted in green to convey normal operation, in yellow to convey a warning state, and red or amber to convey an alarm state for the anti-icing system. In some embodiments, systems 303 through 310 may be green to indicate that the anti-icing system is active and gray or transparent to indicate that the system is currently inactive.

In the depicted embodiment, status information 311 is provided for each anti-icing system and linked by line 312 to the applicable anti-icing system. In the depicted embodiment, the status information 311 includes a panel 313 with a background color that conveys the status of the relevant anti-icing system. The panel 313 may also include text 314 such as the name of the anti-icing system or other relevant information. In the depicted embodiment, the text comprises the names of each system, such as left hand and right hand pitot-static systems, left hand and right hand wing anti-icing systems, left hand and right hand engine inlet anti-icing systems, and left hand and right hand stabilizer anti-icing systems. In addition to the text on the panel 313, other text or numeric data may also be provided, such as temperatures 315. In the depicted embodiments, the temperatures of the various systems are displayed as an indicator of the operation of each anti-icing system.

Figure 3B:
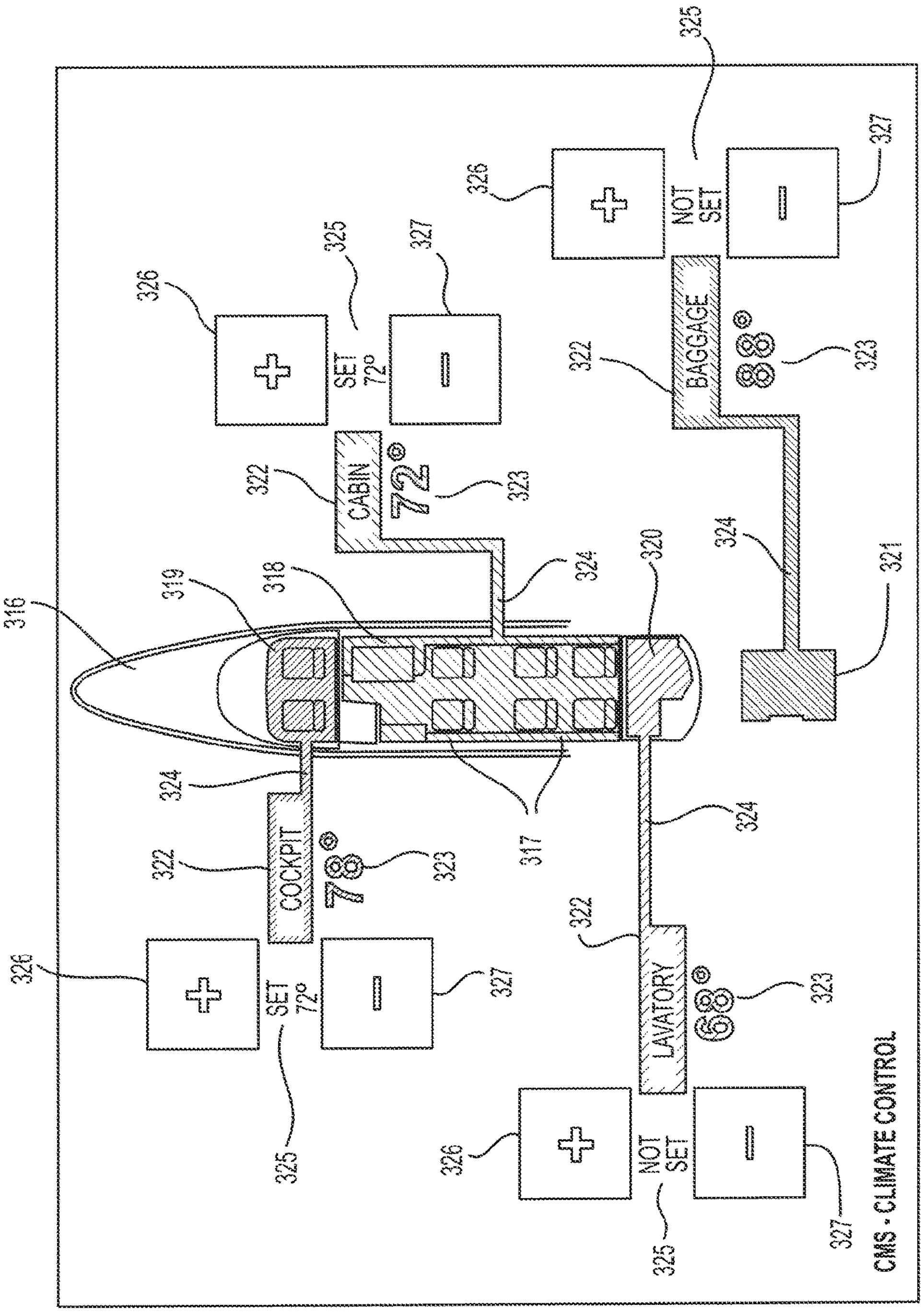
FIG. 3B depicts a synoptic user interface for an aircraft environmental control system, in accordance with an embodiment of the present invention.

FIG. 3B depicts an embodiment of a synoptic user interface panel for aircraft environmental control system. The depicted embodiment displays the temperature in various climate zones disposed in various parts of the aircraft. A top view or top cross-sectional view 316 of all or a relevant portion of an aircraft is provided. The top view may be a partial view as appropriate to cover all the zones of the aircraft provided with climate control. In some embodiments the location of seats may be depicted with seat icons 317 in cabin 318. The location of the cockpit 319 and lavatory 320 may also be depicted. The baggage area may also be depicted as part of the top view 316 of the aircraft, or via a symbol 321. Other climate zones may also be depicted as appropriate for the aircraft. Each climate zone may be depicted with a color that is indicative of the temperature in the various areas of the aircraft. In the depicted embodiment, the colors are selected on a range of color to provide a graphical indication of temperature. In some embodiments, the colors range between two complementary colors. In some embodiments the range of colors is disposed between a reddish color and a complementary blue green color. In other embodiments the range of colors may between non-complementary colors such as red and blue. In some embodiments, the red color depicts higher temperatures and blue depicts lower temperatures.

Each climate area may be provided with status information. Status information may include a label 322 for each climate zone such as “Cockpit”, “Cabin”, “Lavatory”, or “Baggage”. It may also include a numerical indication 323 of the measured temperature in the relevant climate zone. It may also include a text or numerical indication 325 to indicate the current temperature setting for the relevant climate zone. The status information may be linked to the relevant climate zone by a line 324. In some embodiments, the line, the background of the status information, or the text of the status information may be in the color that corresponds to the temperature of the relevant climate zone. In some embodiments, control elements are provided for some or all of the climate zones in the aircraft. The control elements may include control input icons 326 and 327 to receive user input through the touch screen functionality of the TSIP 210. One area 326 may be provided to increase the set temperature for the appropriate climate zone, and another area 327 may be provided to decrease the set temperature for the appropriate climate zone.

Figure 3C:
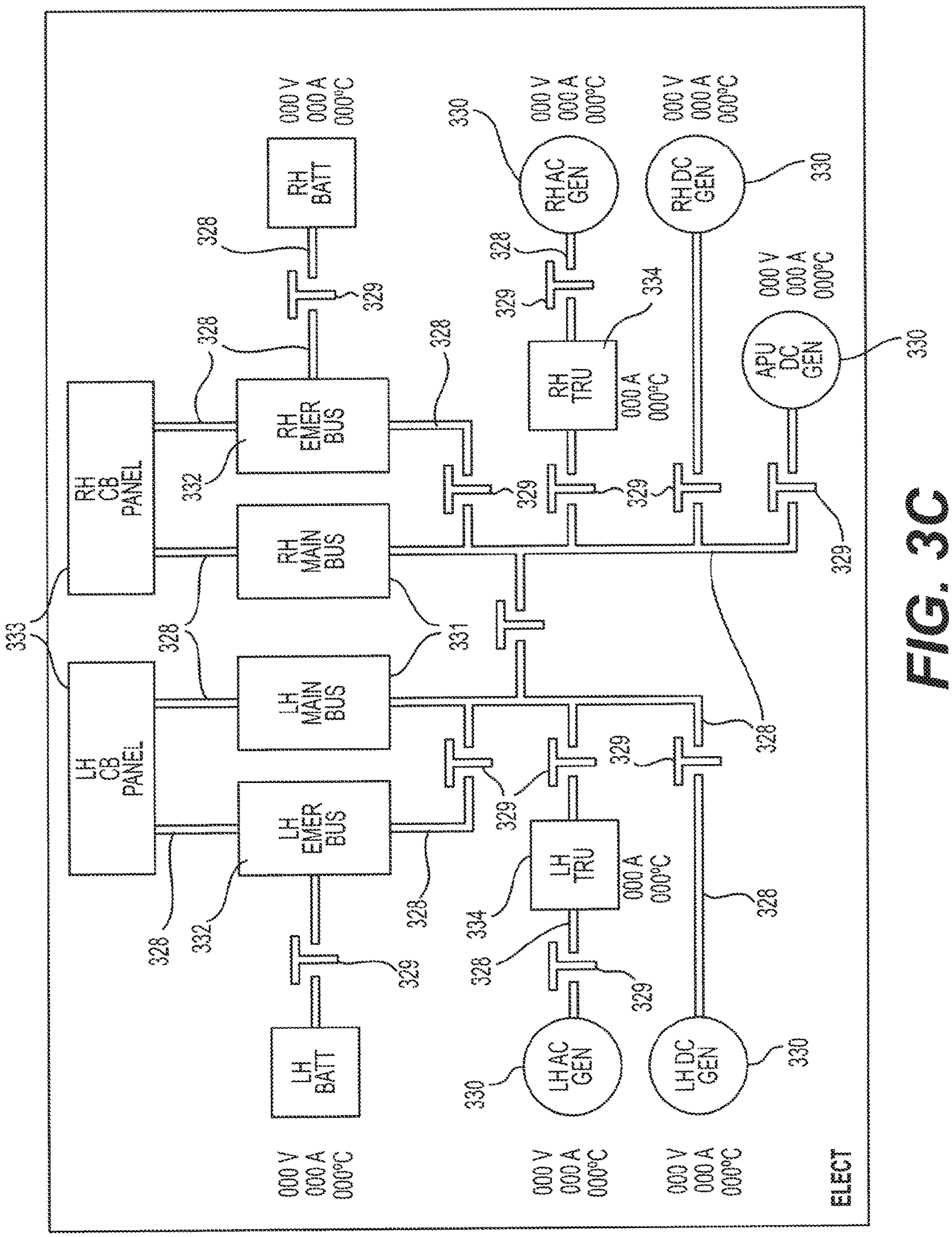
FIG. 3C depicts a synoptic user interface for an aircraft electrical buss structure, in accordance with an embodiment of the present invention.

FIG. 3C depicts an embodiment of a synoptic user interface panel for aircraft electrical systems. In this embodiment, a symbolic top view of the aircraft is presented by the user interface. The electrical busing structure is displayed showing main buses from all power sources. Connections 328 depict electrical connections between the various components. The color of the connection 328 may indicate whether or not electricity is flowing through the branch. In one embodiment, connections 328 that are green indicate that electricity is flowing through the connection, and connections that are grey indicate that electricity is not flowing through the connection. In some embodiments, relays 329 are depicted on the connections 328. In the depicted embodiment, the relays are depicted as a “T”-shaped icon and the color of the icon indicates if the relay is engaged (green) or disengaged (grey).

In some embodiments, a circle icon 330 indicates a power plant such as a generator. In the depicted embodiment, voltages, amperages, and temperatures are displayed at each power source, including power plants and batteries. In some embodiments, a square icon indicates a switch to turn described equipment on or off. In some embodiments, a rectangle icon indicates an item that can be explored further by touching it to expand the item.

In the depicted embodiment the buses include left hand and right hand main buses 331 and left hand and right hand emergency buses 332. The buses are connected to right hand and left hand electrical panels 333 to distribute electrical energy to various systems on the aircraft. Other components, such as transformer rectifier units 334, may also be depicted along with information regarding the performance of the unit including current flow and temperature.

Figure 3D:
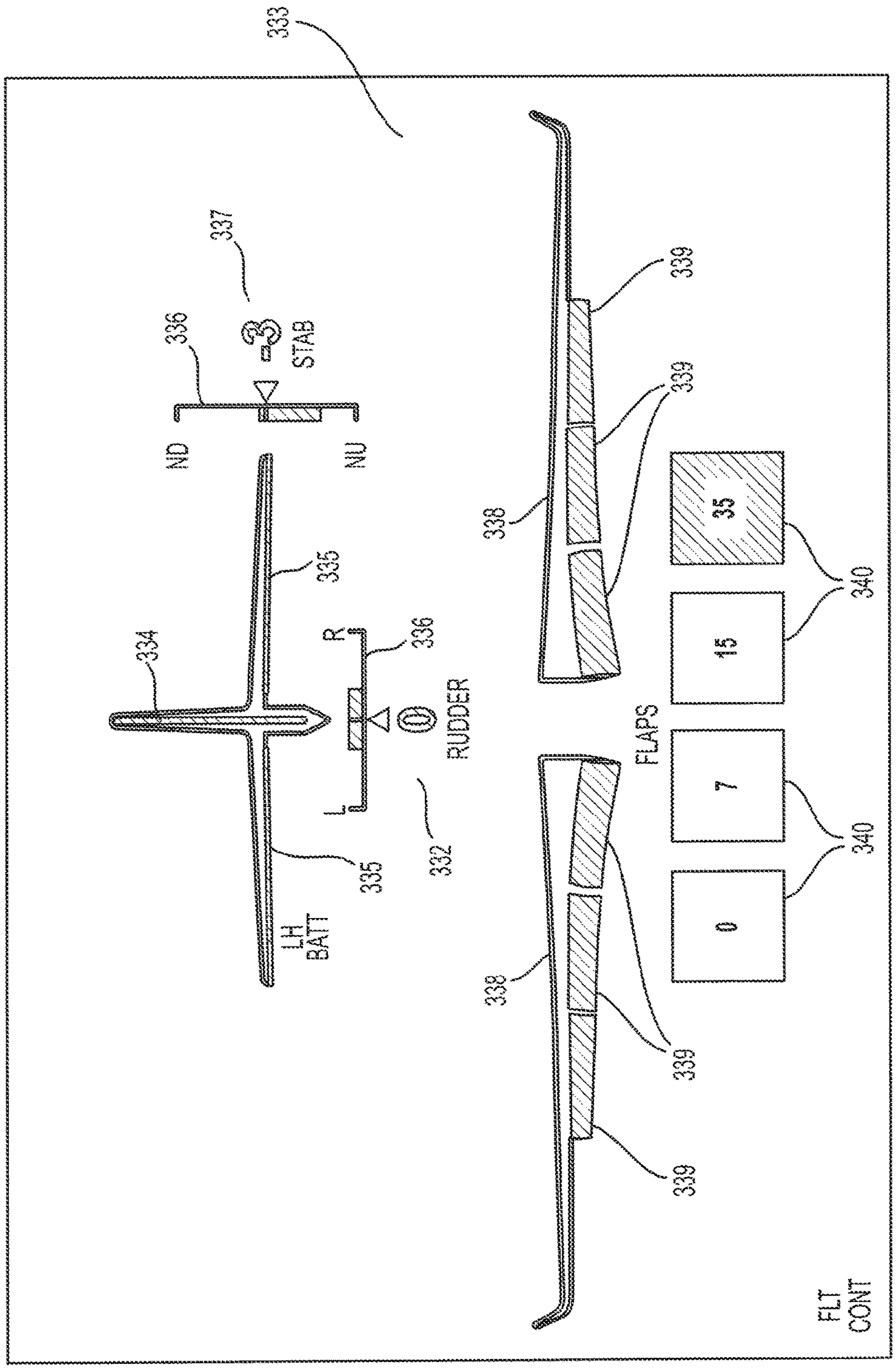
FIG. 3D depicts a synoptic user interface for aircraft flight controls, in accordance with an embodiment of the present invention.

FIG. 3D depicts an embodiment of a synoptic user interface panel for aircraft flight controls. This user interface provides a view of the position of various flight control surfaces on the aircraft. In this embodiment, a back view 333 of the horizontal and vertical stabilizers and wings is depicted. The horizontal and vertical stabilizers are graphically displayed, and show the state of the rudder 334, elevators 335, and stabilizer trim position. A graphical depiction 336 of the operational range and a numerical depiction 337 of the current position of each element may also be depicted.

In some embodiments, the trailing edges of the wings 338 are graphically displayed, and show the state of the aircraft’s flaps 339. In some aircraft, the flaps are adjustable to discrete positions. In the depicted embodiment, the flaps can be adjusted to four different angles: 0, 7, 15, and 35. These discrete positions may be provided as buttons 340. The button corresponding to the current setting of the flaps may be highlighted green or some other color to indicate the flap position. The pilot may adjust the flaps by touching one of the other discrete flap settings. As the flaps on the aircraft extend, the graphical representation also alters to provide feedback to the pilot that all flap surfaces are extended correctly, and may change color to indicate a failure to extend or retract to the desired setting. Text labels may also be provided for the various control surfaces, and the control surfaces may be depicted in various colors to highlight their position or indicate their current functionality.

Figure 3E:
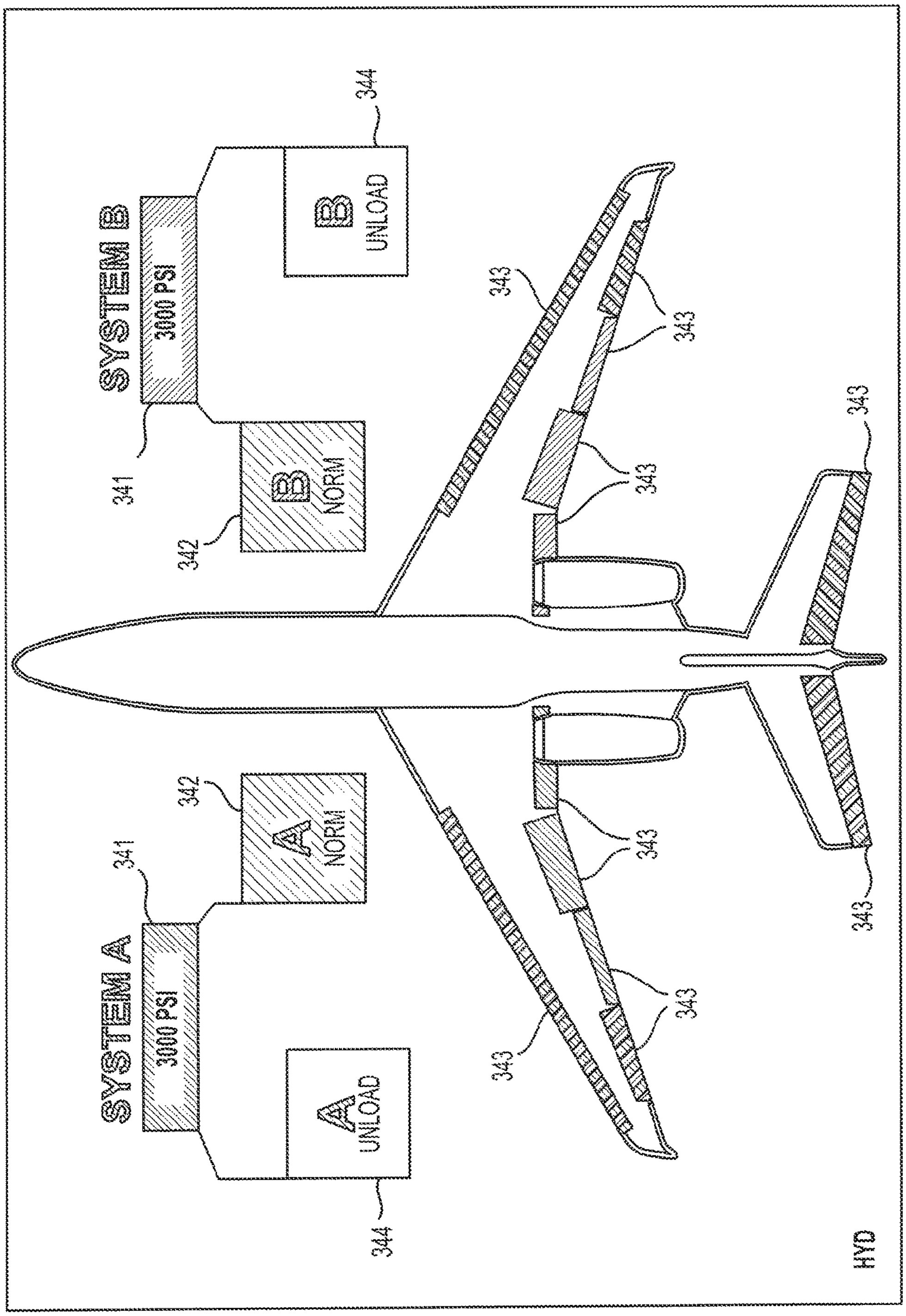
FIG. 3E depicts a synoptic user interface for aircraft hydraulic systems, in accordance with an embodiment of the present invention.

FIG. 3E depicts an embodiment of a synoptic user interface panel for hydraulic systems. A top view of the aircraft illustrating the aircraft’s hydraulic systems is shown. In the depicted embodiment, the aircraft has dual A and B hydraulic systems connected to various flight control surfaces. In the depicted embodiment, a unique color is associated with each system, though shading or cross-hatching might be used instead of a unique color. In the depicted embodiment, each system has status elements 341 such as title and pressure reading, and status panel 342. The color of status panel 342 may be modified to visually indicate the status of each hydraulic system, such as green for normal condition, yellow for warning, and red or amber for malfunction. The flight control surfaces 343 may be highlighted in the color for the system that actuates the control. For flight control surfaces that are controlled by both systems, a cross-hatch pattern of both system colors may be displayed on the surface. A button 344 on the touch screen may be provided for actuating an unloading valve to relieve pressure from the hydraulic system.

Figure 3F:
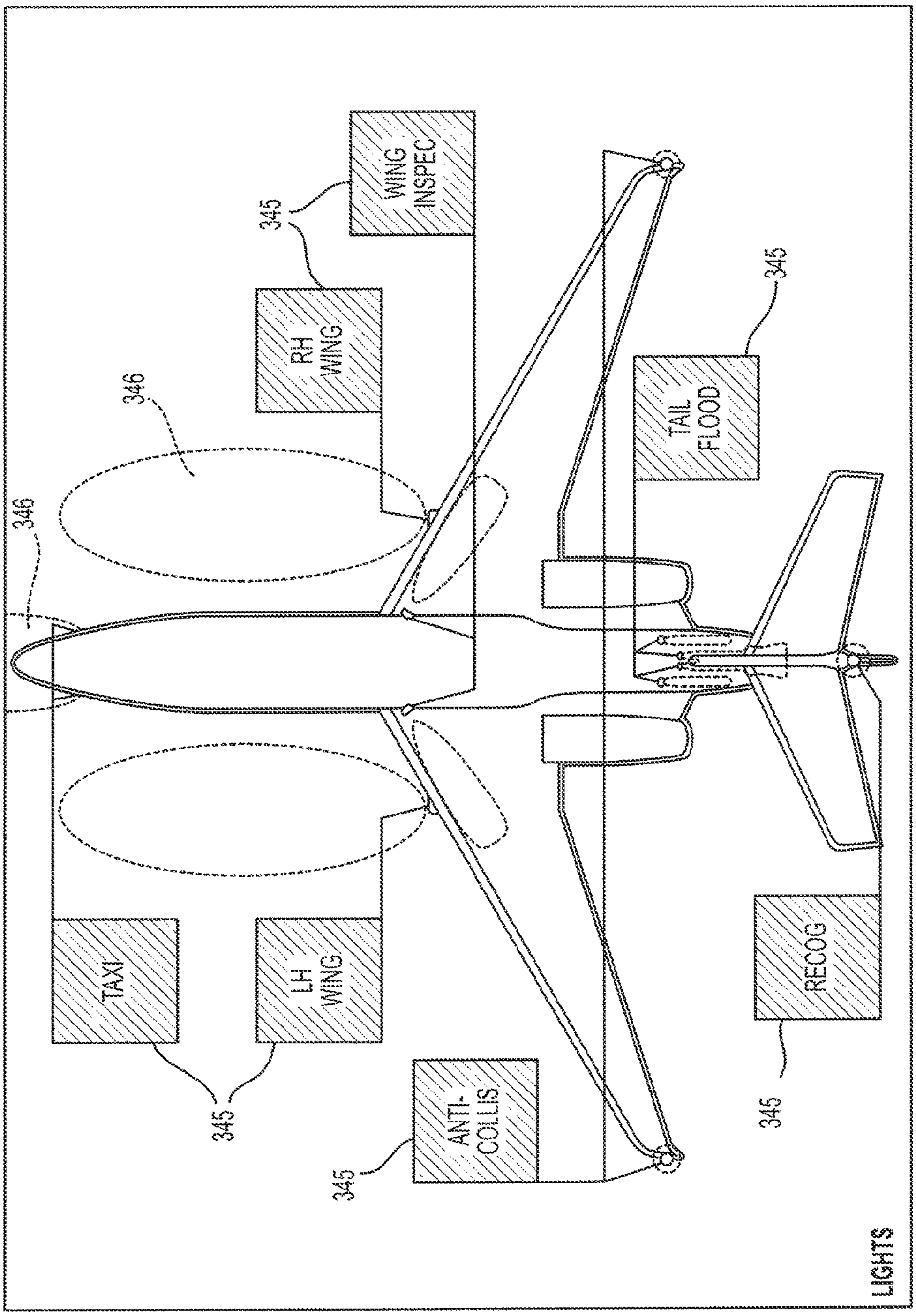
FIG. 3F depicts a synoptic user interface for aircraft exterior lights, in accordance with an embodiment of the present invention.

FIG. 3F depicts an embodiment of a synoptic user interface panel for aircraft exterior lights. In the depicted embodiment, a top view of the aircraft is shown with the location of each exterior light indicated by a button 345. When the light is on it is shown with a light 346 cast on to the area the light covers (as in the case of the landing, wing inspection, and tail flood lights) and the color of the light (such as red and green for the anti-collision and recognition lights). When the light is off, light is not cast from the light's location on the graphical display of the silhouetted aircraft. Buttons 345 may be depicted with a color to indicate that the light is on, such as green. The pilot may turn each light off and on by touching the button 345.

Figure 3G:
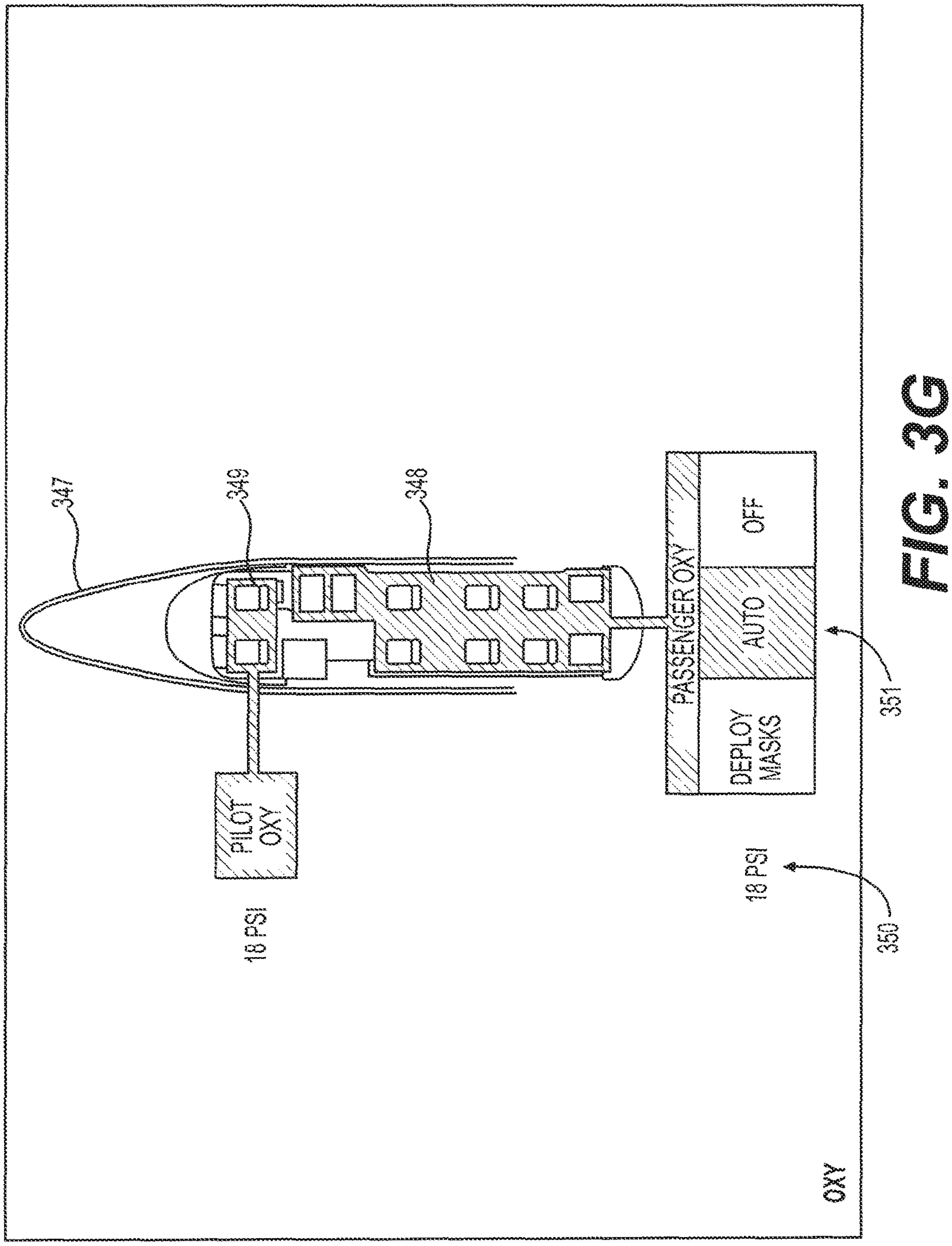
FIG. 3G depicts a synoptic user interface for aircraft oxygen systems, in accordance with an embodiment of the present invention.

FIG. 3G depicts an embodiment of a synoptic user interface panel for aircraft oxygen systems. Top view 347 of the aircraft cockpit 349 and cabin 348, and possibly other areas provided with oxygen systems, displays the state of the emergency oxygen system. In the depicted embodiment, a zone is highlighted with green to indicate that the oxygen system is on. Similarly, a zone is not highlighted, but filled with gray to indicate that the oxygen system for that zone is off. Textual information 350 may be provided to communicate additional information regarding oxygen systems such as the current pressure of oxygen in the system. An active control such as toggle buttons 351 may be provided to allow the pilots to toggle the oxygen system between automatic function, manual deployment, and full off.

Figure 3H:
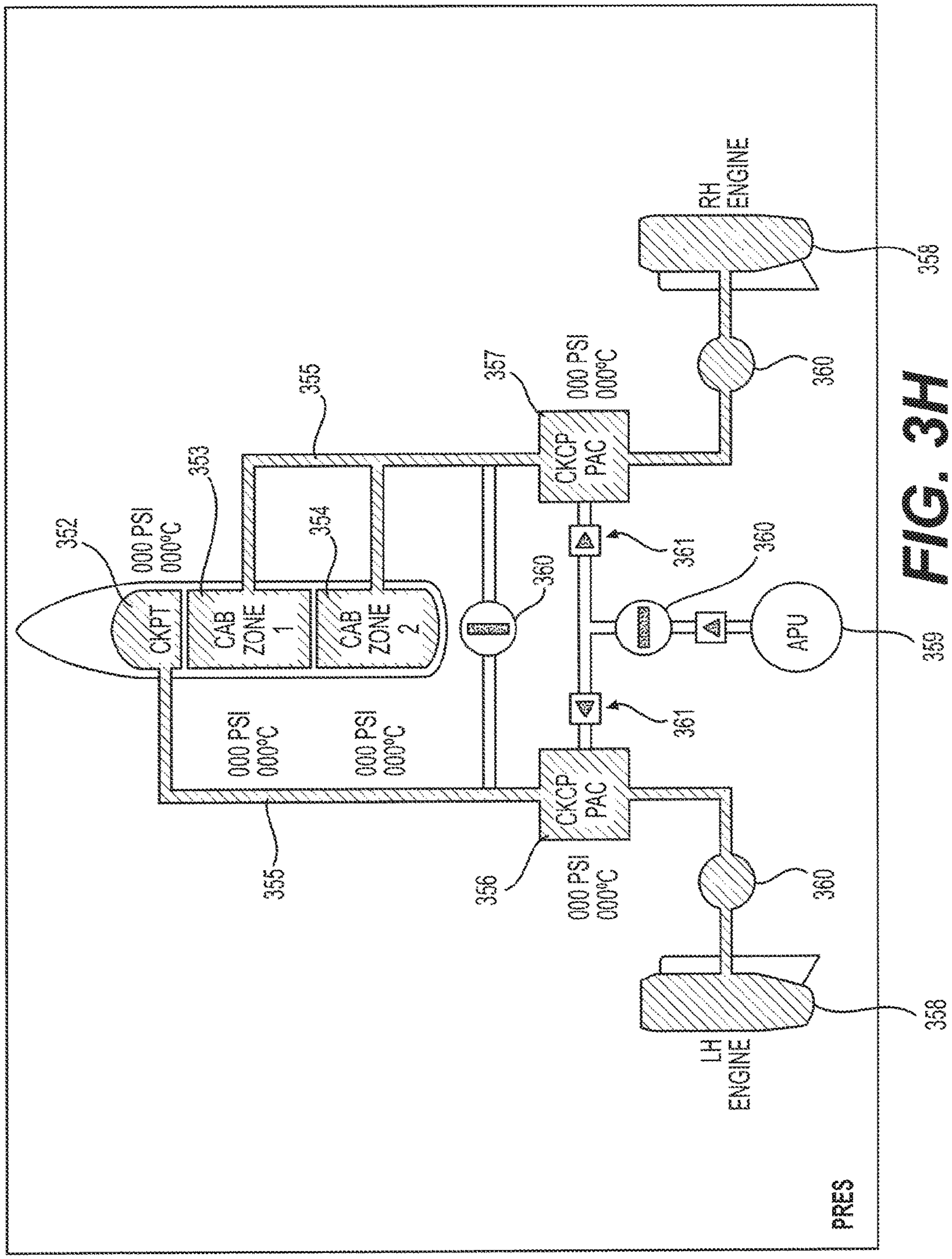
FIG. 3H depicts a synoptic user interface for cabin pressurization systems, in accordance with an embodiment of the present invention.

FIG. 3H depicts an embodiment of a synoptic user interface panel for cabin pressurization systems. Various pressurization zones of the aircraft may be depicted separately, such as cockpit 352, and one or more cabin pressurization zones 353 and 354. Various text elements may be provided on the user interface to convey the pressure and temperature of each zone or of other elements of the cabin pressurization system. The various zones are connected to pressurized air sources 358 and 359 by pressure lines 355. The pressurized air systems may be provided with pneumatic air conditioning systems 356 and 357 to cool, decompress, and mix the pressurized air prior to its circulation through the cabin. In the depicted user interface, the aircraft is provided with two engines 358 which provide pressurized bleed air to the conditioning systems 356 and 357. An auxiliary power unit 359 may also provide pressurized air, for example, when the aircraft is on the ground and the engines are off. Valve icons 360 are depicted and the icon indicates if it is open or closed. In some embodiments, a user may be able to actuate a valve by touching the valve icon 360 on the TSIP 210. Additional items such as check valves 361 may also be represented on the user interface. The color of the zone, pressurized line, condition unit, valve or air source may be modified to indicate if the component is functioning normally. As in other embodiments of the synoptic windows, green may indicate a component functioning within normal parameters, while gray may indicate a component that is not currently active and other colors may indicate component failures.

Figure 3I:
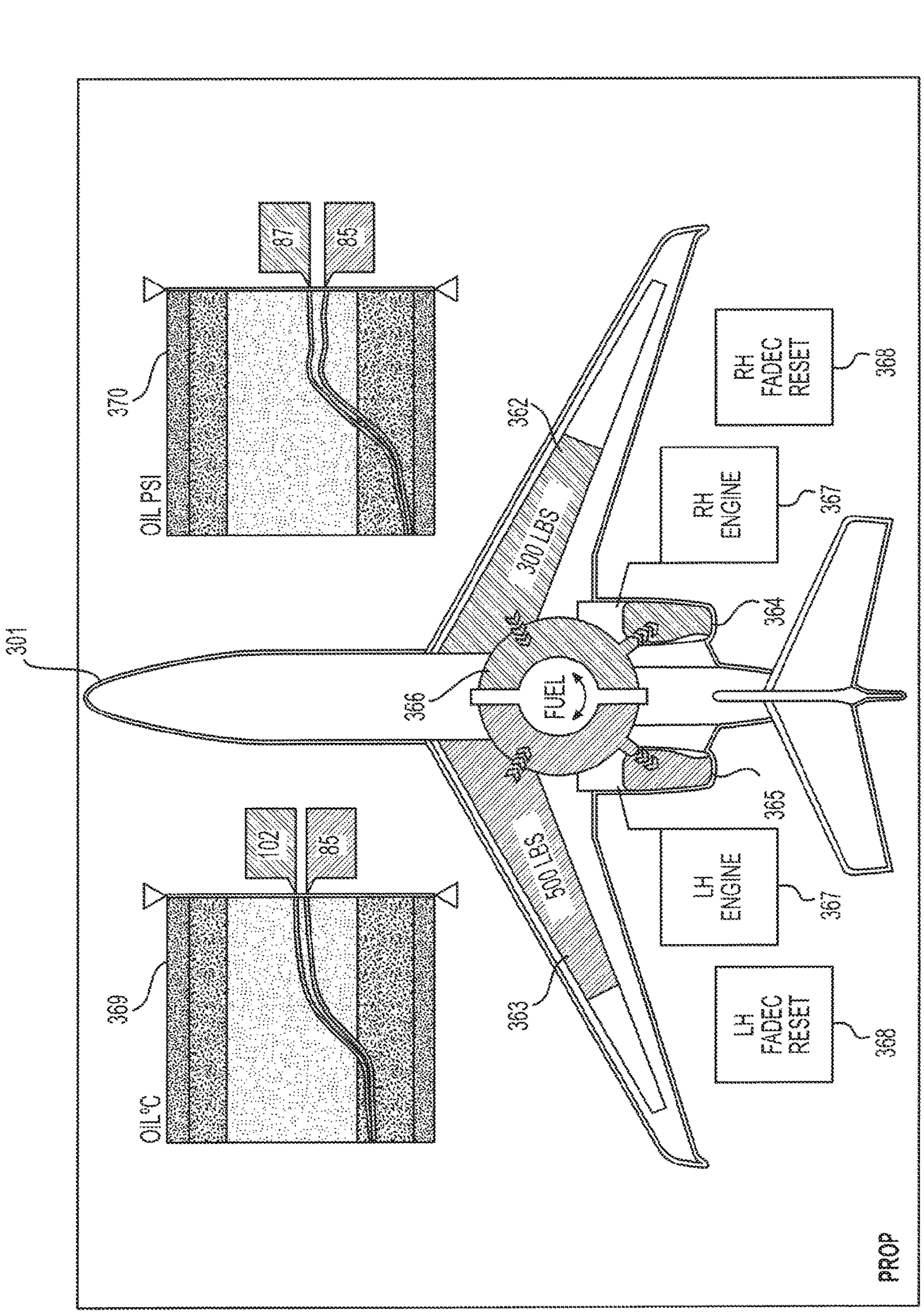
FIG. 3I depicts a synoptic user interface for aircraft propulsion systems, in accordance with an embodiment of the present invention.

FIG. 3I depicts a synoptic user interface panel for aircraft propulsion systems. In this embodiment a top view 301 is depicted, though in other embodiments a side view may be more appropriate depending on aircraft configuration. Various components of the fuel and propulsion systems of the aircraft are depicted on the top view of an aircraft shown on FIG. 3I, such as fuel tanks 362 and 363, engines 354 and 365, and a symbolic representation 366 of the fuel flow from the fuel tanks to the engines. The fuel tanks may be provided with graphical and textual elements conveying the amount of fuel left in the tank, such as the number of remaining pounds (lbs) of fuel. In some embodiments a color may be associated with each fuel tank, and the area highlighted in this color may vary to indicate graphically the amount of fuel remaining in each tank. Similarly the flow of fuel from each tank to each engine may be highlighted with the color associated with each tank. In some embodiments one or more buttons 367 may be provided to access further information about an element of the system such as the engines. Similarly, one or more buttons 368 may be provided. In some embodiments, graphical displays of parameters may depicted, such as graph 369 depicting the oil temperature of each engine over time, and graph 370 depicting the oil pressure of each engine over time.

Figure 3J:
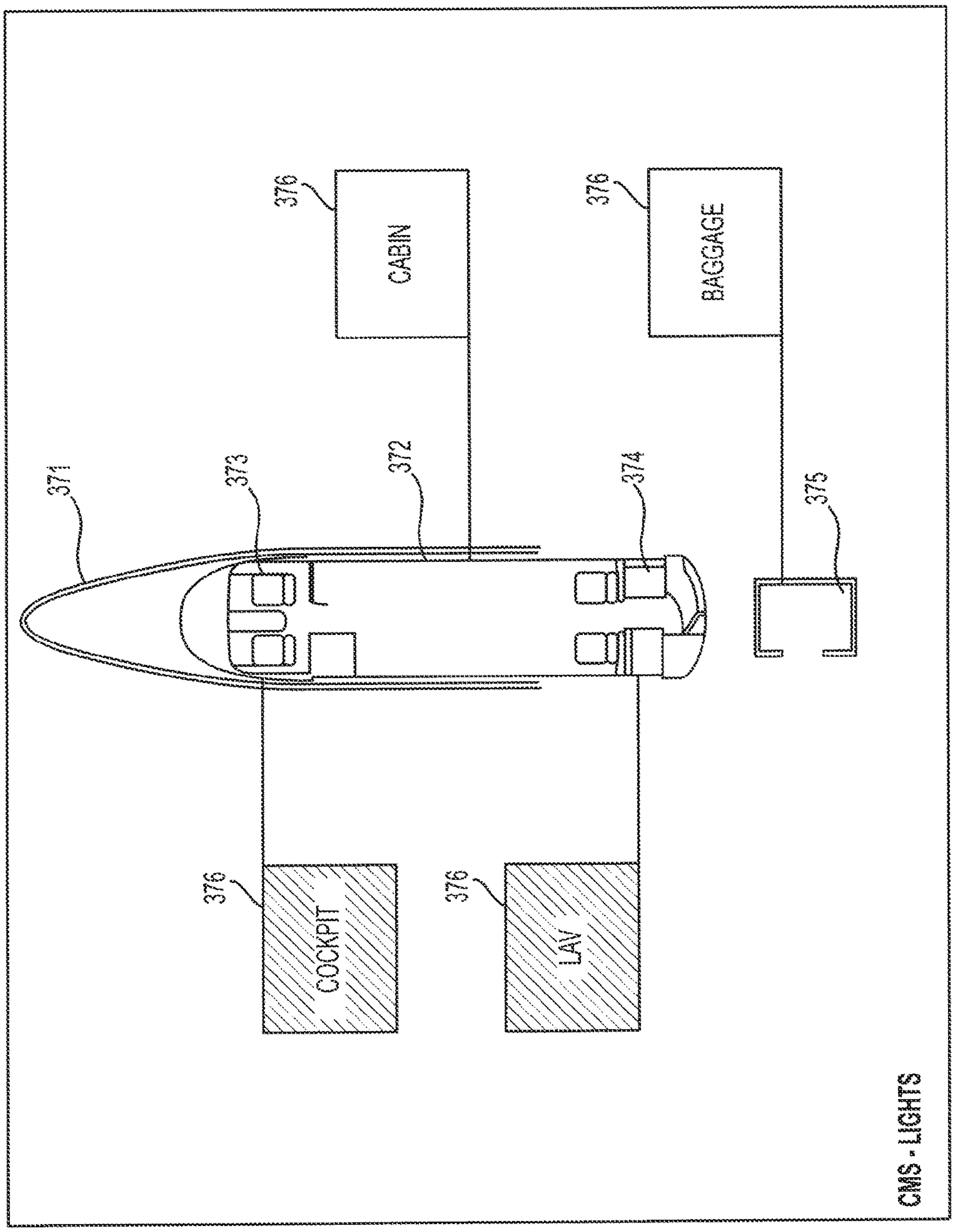
FIG. 3J depicts a synoptic user interface for aircraft internal lights, in accordance with an embodiment of the present invention.

FIG. 3J depicts an embodiment of a synoptic user interface panel for aircraft internal lights. The user interface is provided with a full or partial top schematic depiction 371 of an aircraft. In some embodiments, the depiction 371 may be provided with spot lights at each light location that flood (cast light) into areas the light is to illuminate within the aircraft when the light is on. When the light is off, the light cup is present but not casting light. In some embodiments, when the lights of an area of the aircraft are turned off, that area is shown in black, as the Cabin area is depicted in FIG. 3J. In some embodiments, when the lights are turned on in an area of the aircraft, the area is shown with a lighted schematic of the interior of the aircraft, as the Cockpit area 373 and the Lavatory area 374 depicted in FIG. 3J. Other areas of the aircraft outside the cabin may be shown as well, either schematically or symbolically, such as baggage area 375. In some embodiments, buttons 376 for each light or lighting area within the aircraft may be provided. Each button 376 may be connected to the respective light or area of the aircraft with a line, and the color of the button 376 may provide a status indicator for the light or lighted area. For example, green buttons 376 may represent that the light or lights are turned on, and gray or transparent buttons 376 may represent that the light or lights are turned off. Other colors may be used to represent malfunctions or other states. In some embodiments, a user may be able to turn a light or lights off by touching the button 376 that corresponds to the light or lights to be activated or deactivated.

Figure 3K:
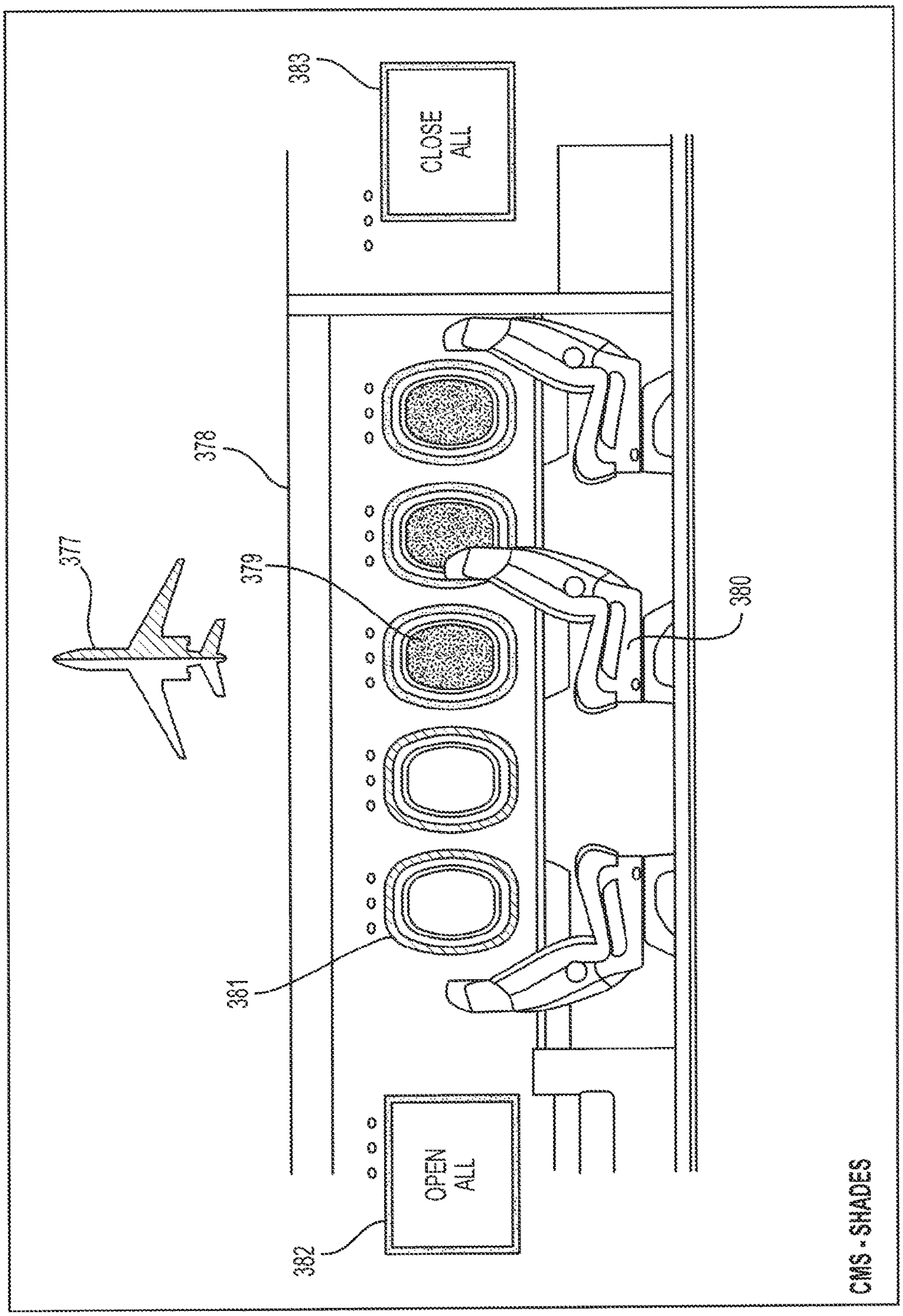
FIG. 3K depicts a synoptic user interface for aircraft cabin window shades, in accordance with an embodiment of the present invention.

FIG. 3K depicts an embodiment of a synoptic user interface panel for aircraft cabin window shades. In some embodiments of this user interface, a top view 377 of an aircraft is depicted. The top view 377 allows a user to select which side of the aircraft cabin will be displayed in the user interface by touching the appropriate side of top view 377. Additionally, the color of a portion of the top view 377 may change to indicate which side of the cabin is currently depicted below. In other embodiments of this user interface, top view 377 may not be present and both sides of the aircraft cabin may be depicted simultaneously. The side view 378 of a portion of the aircraft cabin depicts each window 379 in the cabin and may also show other features of the cabin interior such as seats 380. The color of each window 379 may be modified to show the state of the shade at each window. For example, an open shade may be represented by a white window 379, while a closed shade may be represented by a black window 379. In some embodiments, an interface panel may be provided for raising, lowering, activating, and deactivating cabin video and audio displays, and selecting and displaying video and audio content on such cabin displays.

In some embodiments, an additional status ring 381 may be provided around each window 379. The color of the status ring 381 may provide additional information regarding the status of the window. A user may individually raise and lower a window shade by touching the window 379. In some embodiments, additional buttons 382 and 383 may be provided to allow a user to open or close, respectively, all shades simultaneously.

In other embodiments, the TSIP 210 may provide access to control additional types of cabin or aircraft functions, or provide additional information to the users. The user interfaces described herein are not limiting but exemplary of the types of synoptic user interfaces contemplated within the inventive system.

In some embodiments of the system, the various windows may be opened, closed, and moved around the TSIP 210. A user may "drag" or move the window by touching the window in a certain area and moving a finger across the TSIP 210 while maintaining contact with the TSIP 210. In some embodiments, once the finger is lifted from the TSIP 210 the window stops moving, though in other embodiments the window may have emulated momentum to continue moving for some additional distance if the finger is moving when lifted from the TSIP 210. In various embodiments, the areas that a user may touch to drag the window or page may include the title bar (if present), the border (if present), or any portion of the window that does not comprise an active control such as a button.

In some embodiments, the windows may overlap or overlay one another to allow the user to maximize the use and efficiency of the TSIP 210. A user may bring a window to the foreground by touching the window, and may move it in front of another window by dragging it to a location that wholly or partially overlaps another window shown on the TSIP 210. In some embodiments, a user must bring a window to the foreground position on the TSIP 210 before activating an active control located in the window.

In some embodiments the system does not allow a user to move windows into certain areas of the TSIP 210, such as areas that display primary flight controls or other information that must be visible for the safe operation of the aircraft. In some embodiments for a single pilot application, the pilot could open multiple synoptic pages or windows and arrange them on the co-pilot Multi-Function Display (MFD) area of the TSIP 210. The flight crew may open multiple synoptic pages or windows and arrange them by physically moving them on the TSIP 210 as they see fit to help maintain a higher state of situational awareness.

In some embodiments of the user interfaces, a user may need to fix a user interface panel in a certain place on the TSIP 210. This may be necessary to prevent accidental movement of user interface panels, or because some user interface panels may be completely covered with an active control such as a map that cannot be activated when the window is capable of being dragged across the TSIP 210. In those embodiments, the user is provided with a method of "pinning" a user interface panel in place on TSIP 210 such that the user interface panel is not movable from its current location on the screen until it has been "unpinned".

Figure 3L:
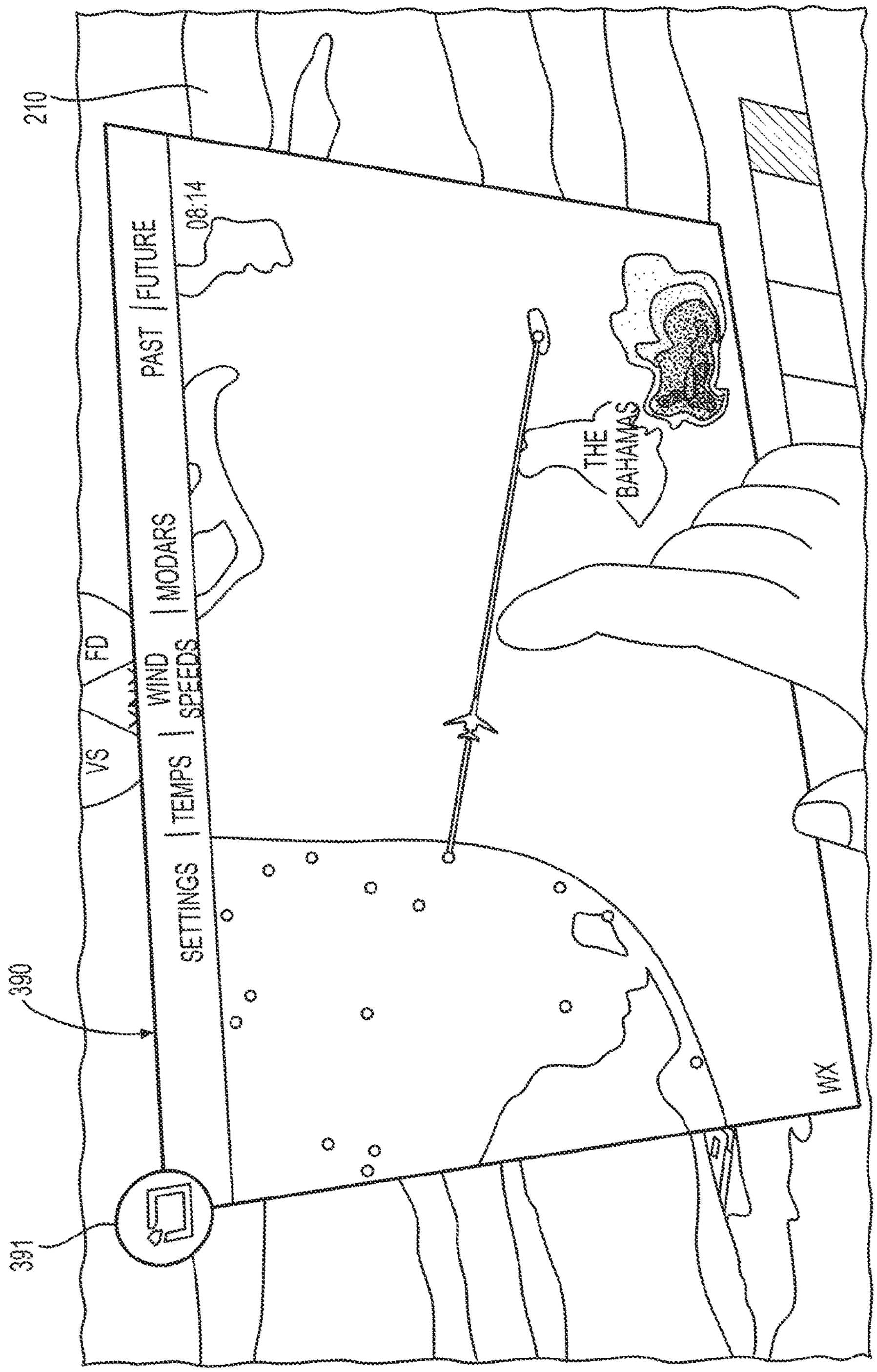
FIG. 3L depicts a pinnable synoptic user interface, in accordance with an embodiment of the present invention.
Figure 3M:
FIG. 3M depicts a pinnable synoptic user interface, in accordance with an embodiment of the present invention.

Referring now to FIGS. 3L and 3M, a user interface panel is depicted with an embodiment of the pinning functionality. In this example, a mapping or weather function is displayed in the panel 390. At some times the user may want to move the panel 390 to a desired location on the TSIP 210, while at other times the user may want to alter the contents of the panel 390 to display different portions of a map within panel 390. The touch input required for both changes may be the same, for example, touching the TSIP 210 and dragging a finger across the panel 390. The panel 390 is provided with a pin icon 391 which may be touched by a user to toggle the pin function on and off.

In FIG. 3L, the pin icon 391 is not highlighted and the pin function is inactive. When the user touches the screen within the panel 390 and moves a finger, the entire panel 390 will move on the TSIP 210. The contents of the panel 390 will not change as the panel 390 moves across the TSIP 210 in response to the users touch input. When the user has moved the panel 390 to the desired location, the pin icon 391 is touched to activate the pin function and prevent further movement of the panel 390 on the TSIP 210.

In FIG. 3M, the pin icon is highlighted as a result of the users touch input. As the user touches the TSIP 210 within the area of panel 390, and drags a finger across the screen of the TSIP 210, the content of the panel 390 changes in response to that movement. For example, the user may pan a map within the panel 390 by dragging a finger within panel 390, or pinch two fingers together on the screen to zoom in on the content. When a user desires to move the panel 390 to a different location on the TSIP 210 they touch the pin icon 391 to deactivate the pin function, and then the panel 390 will move on TSIP 210.

FIGS. 4A-4E depict exemplary panels of a flight planning system for navigation of an aircraft. The flight planning system is displayed on TSIP 210, which uses on-board computer 201 for storing and executing instructions. Algorithms written with software calculate flight planning information, such as flight duration for example, using computer 201.

On-board computer 201 includes a manager for providing navigational views on TSIP 210. The navigational views on TSIP 210 include a mapping interface for displaying one or more maps (see FIGS. 4A-4E), a charts component for displaying one or more aeronautical charts (see FIGS. 4G-4J), a radio frequency component for receiving and displaying one or more radio frequencies (see FIG. 4K), a weather component for displaying one or more weather representations overlaid on the map (see FIGS. 4A-4E), and a virtual flight plan component for displaying one or more simulated flight plans.

Figure 4A:
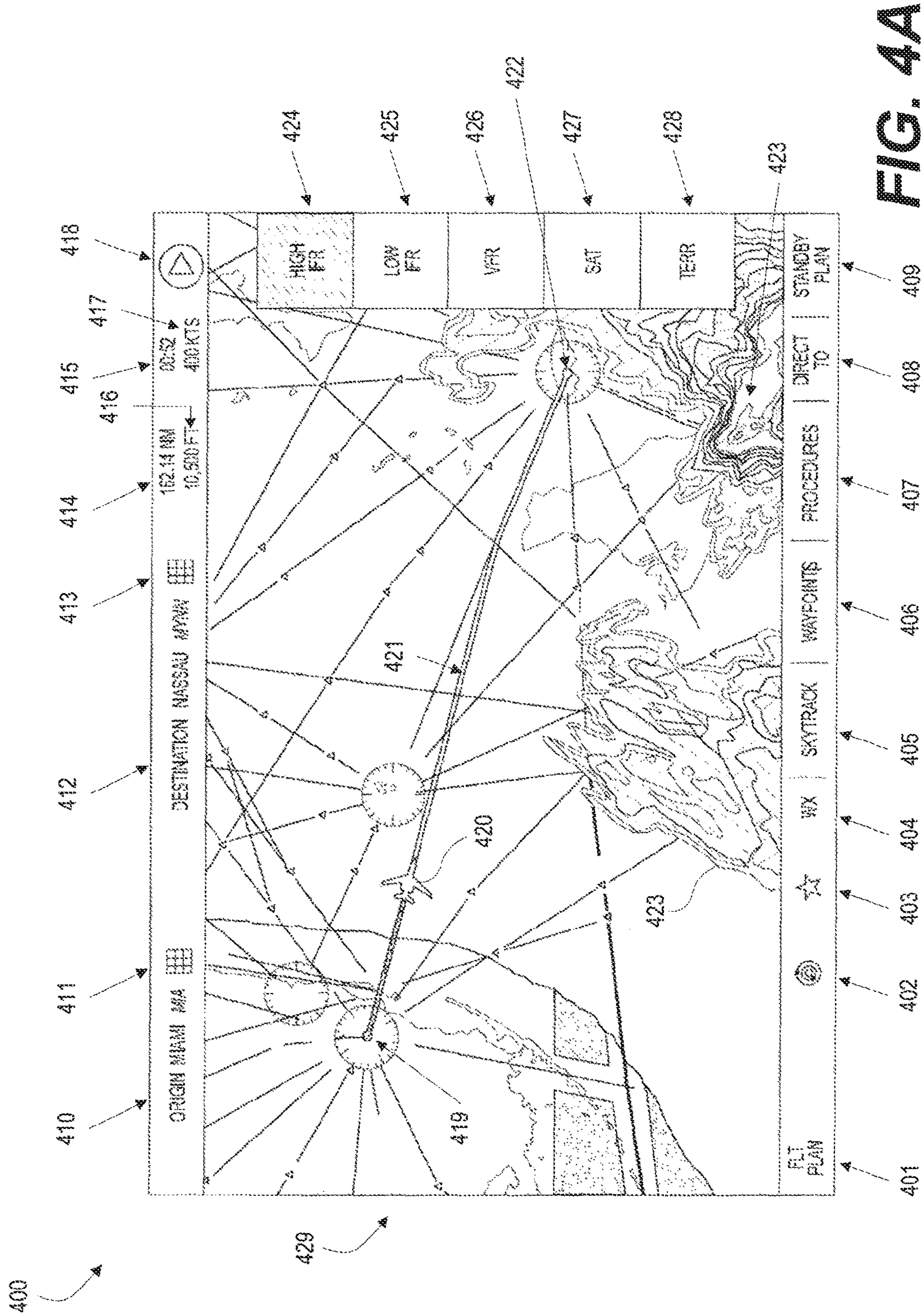
FIG. 4A depicts one embodiment of a flight planning system for navigation of an aircraft based on high instrument flight rules.

FIG. 4A depicts an exemplary panel 400 of the flight planning system. Panel 400 is configured to show a mapping interface 429 based on high instrument flight rules (IFR). Mapping interface 429 includes a displayed image of a map, which may be manipulated by a user with touch gestures, such as zooming and dragging, to view maps of various areas of Earth. Panel 400 includes menus listed, for example, along the bottom, top and sides of the panel. The menus may include icons, names or abbreviations that may be activated by touch, thus serving as links or shortcuts to various features of the flight planning system. The menu along the bottom of panel 400 includes, for example, a title indicator 401, a proximity icon 402, a favorites icon 403, a weather link (WX) 404, a skytrack link 405, a waypoints link 406, a procedures link 407, a direct-to link 408, and a standby-plan link 409. Panel 400 may be configured to display greater or fewer menu items along the bottom or to arrange items differently without departing from the scope hereof.

Proximity icon 402 may be configured such that selection thereof activates a proximity component of the flight planning system for organizing information based on distances from the aircraft. For example, activating the proximity component by selecting proximity icon 402 displays a list of nearby airports and their corresponding radio frequencies on TSIP 210, wherein the list is organized by proximity to the aircraft. Information is updated real-time during aircraft flight, thereby re-organizing the list as needed to continually provide information for the nearest airports. Proximity icon 402 provides a convenient one-touch link to display information for flight planning based on proximity. Proximity may be defined as any distance relative to the aircraft within a predetermined maximum distance.

Favorites icon 403 is configured such that selection thereof activates a favorites component of the flight planning system for organizing information based on a custom list of favorite items. For example, activating the favorites component by selecting favorites icon 403 displays a list of frequently used or favorite items on TSIP 210, wherein the list may be tailored to individual pilot preference. The list of favorite items may include flight paths and airports with their corresponding radio frequencies, for example. Favorites icon 403 provides a convenient one-touch link to display information for flight planning based on a custom list.

Weather link (WX) 404 is configured such that selection thereof activates or deactivates a weather component of the flight planning system for displaying real-time and forecasted weather representations overlaid on mapping interface 429. For example, real-time weather is determined from radar 270 and forecasted weather is determined from external communication sources 265, such as the National Weather Service, and depicted on mapping interface 429. Weather may be represented by shaded regions, contour lines or other illustrations, with different shades or colors illustrating rain, snow and heaviness of precipitation, for example. Weather representation 423 is depicted along the bottom and in the bottom right corner of mapping interface 429 of FIGS. 4A-4E. Weather link (WX) 404 provides a convenient one-touch link to display information for flight planning based on real-time and forecasted weather.

Skytrack link 405 may be configured such that selection thereof activates or deactivates a path projecting navigational aid component of the flight planning system, which may be used to assist flight planning by providing navigational parameters including but not limited to aircraft speed, heading and altitude. The navigational aid is displayed in the primary flight instrument area of TSIP 210. Skytrack link 405 provides a convenient one-touch link to display information on TSIP 210 for flight planning based on navigational parameters.

Waypoints link 406 may be configured such that selection thereof activates a waypoints component of the flight planning system for establishing waypoint coordinates and displaying them on mapping interface 429. A waypoint is a coordinate in physical space, for example, latitude, longitude and altitude. In an embodiment, waypoints are determined by touching or selecting a location on mapping interface 429. In an alternative embodiment, waypoints are searched from a list stored in database 230. In another embodiment, waypoints are selected from a list of waypoint names, which is organized, for example, by proximity, favorites, or alphabetically. Waypoints link 406 provides a convenient one-touch link to establish and display waypoints for flight planning.

Procedures link 407 may be configured such that selection thereof activates a procedures component of the flight planning system. Procedures component includes a series of menus containing procedures displayed on TSIP 210 for example. Procedures component includes, for example, established protocols, step-by-step instructions, and checklists for flight planning. In an embodiment, the series of menus include cascaded panels, with a separate menu displayed in each panel. Menu selections may determine which procedures or subsequent menus to display. Procedures link 407 provides a convenient link to display information for flight planning based on established procedures.

Direct-to link 408 may be configured such that selection thereof activates a direct-to component of the flight planning system. The direct-to component establishes a flight path 421 directly from an origin to a destination without intervening waypoints. Note that FIGS. 4D and 4E illustrate a flight path 421 headed directly from an origin to a destination, whereas flight paths 421 of FIGS. 4A-4C include a turn. Direct-to link 408 provides a convenient one-touch link to establish a direct flight path 421 for efficient flight planning.

Standby-plan link 409 may be configured such that selection thereof activates a standby-plan component of the flight planning system. The standby-plan component enables a user to establish a back-up flight plan that is on standby and ready to be used if a sudden change is necessary to an original flight plan. Standby-plan link 409 provides a convenient link for establishing a back-up flight plan.

The menu along the top of panel 400 in FIG. 4A includes, for example, an origin name indicator 410, an origin chart icon 411, a destination name indicator 412, a destination chart icon 413, a distance indicator 414, a duration indicator 415, an altitude indicator 416, an airspeed indicator 417, and a play button 418. Panel 400 may be configured to display greater or fewer menu items along the top or to arrange items differently without departing from the scope hereof.

Origin name indicator 410 may be configured such that selection thereof activates an origin selecting component of the flight planning system. Similarly, destination name indicator 412 may be configured such that selection thereof activates a destination selecting component of the system. Origin name indicator 410 and destination name indicator 412 are, for example, used to select an airport and display its name for originating and terminating a flight path 421, respectively. Origin name indicator 410 and destination name indicator 412 display airport names and codes along the top of panel 400, as in FIG. 4A for example. In an embodiment, selecting either origin name indicator 410 or destination name indicator 412 displays a touch-screen keyboard on TSIP 210 for entering an airport from a searchable database, such as database 230. In an embodiment, airports selected using origin name indicator 410 and destination name indicator 412 are also highlighted on mapping interface 429. For example, flight path 421 begins at an origin location 419 and ends at a destination location 422. Origin name indicator 410 and destination name indicator 412 provide convenient selection of airports for efficient flight planning.

Within mapping interface 429, origin location 419 may be configured such that selection thereof activates the origin selecting component of the flight planning system. Similarly, destination location 422 may be configured such that selection thereof activates the destination component of the flight planning system. Origin location 419 and destination location 422 are, for example, used to select airports for originating and terminating a flight path 421 by touching locations within mapping interface 429. By touching and holding a location, a user may activate the system to display a menu on TSIP 210 for selecting an airport and runway, and designating the location as origin, waypoint, or destination, for example. In areas where multiple airports are available, the displayed menu may provide airport options. In an embodiment, selection of origin location 419 and destination location 422 from mapping interface 429 may also populate origin name indicator 410 and destination name indicator 412, respectively, with corresponding airport names and codes. Origin location 419 and destination location 422 provide convenient selection of airports from mapping interface 429 for efficient flight planning.

Origin chart icon 411 and destination chart icon 413 may be configured such that selection thereof activates a charts component of the flight planning system. Selection of origin chart icon 411 displays one or more charts corresponding to an origin airport. Similarly, selection of destination chart icon 413 displays one or more charts corresponding to a destination airport. For example, selecting origin chart icon 411 displays one or more charts corresponding to origin name indicator 410, and selecting destination chart icon 413 displays one or more charts corresponding to destination name indicator 412. Origin chart icon 411 and destination chart icon 413 provide convenient selection of appropriate airport charts for displaying on TSIP 210. Example charts are shown in FIGS. 4G-4J.

Distance indicator 414 displays an estimated flight distance as part of the flight planning system. Similarly, duration indicator 415 displays an estimated duration as part of the flight planning system. Distance may be calculated based on a projected flight path, and duration may be calculated based on distance and a desired altitude and airspeed. Based on flight path 421 displayed in mapping interface 429, distance indicator 414 may display a value, for example, in nautical miles (NM) and duration indicator 415 may display a value, for example, in hours and minutes (hh:mm). Distance indicator 414 is 162.14 nautical miles and duration indicator 415 is 52 minutes, as shown in FIG. 4A. As alternate flight paths are considered, distance indicator 414 may display corresponding alternate distances and duration indicator 415 may display corresponding alternate times. During flight, as the distance and duration remaining to arrive at the destination decrease, the distance indicator 414 and duration indicator 415 update accordingly. For flight planning activities, distance indicator 414 and duration indicator 415 conveniently display the remaining estimated flight path distance and duration, respectively.

Altitude indicator 416 is configured such that selection thereof activates an altitude component of the flight planning system. Similarly, airspeed indicator 417 is configured such that selection thereof activates an airspeed component of the flight planning system. Altitude indicator 416 and airspeed indicator 417 may be used, for example, to select a cruising altitude and a cruising airspeed, respectively. In an embodiment, touching altitude indicator 416 or airspeed indicator 417 on TSIP 210 displays a touch-screen keyboard for entering values. Altitude indicator 416 and airspeed indicator 417 display the selected cruising altitude and airspeed, respectively. Altitude indicator 416 is 10,500 feet (FT) and airspeed indicator 417 is 400 nautical miles per hour (KTS) in FIG. 4A. In an embodiment, altitude indicator 416 and airspeed indicator 417 display values using different units, such as metric system units. During flight, altitude indicator 416 and airspeed indicator 417 may update in real-time to display the aircraft's actual airspeed and altitude. Since an aircraft's altitude and airspeed affect duration of a flight, duration indicator 415 updates its value whenever changes are made to altitude indicator 416 or airspeed indicator 417 during flight planning activities. Altitude indicator 416 and airspeed indicator 417 provide convenient selection of cruising altitude and cruising airspeed for efficient flight planning.

Play button 418 is configured such that selection thereof activates a virtual flight plan component of the flight planning system. By touching play button 418, a virtual flight plan is displayed on mapping interface 429. Specifically, aircraft icon 420 moves from origin location 419 along flight path 421 to destination location 422. The virtual flight plan dynamically represents the aircraft simulating a projected path of the flight plan overlaid on mapping interface 429. In an embodiment, the virtual flight plan simulates the flight at an accelerated pace and displays the estimated remaining distance and duration via distance indicator 414 and duration indicator 415, which count down during the simulation. Virtual flight plan also illustrates a forecasted weather representation 423 overlaid on mapping interface 429, thereby enabling a pilot to visualize aircraft icon 420 dynamically encounter forecasted weather representation 423. Thus, alternate flight paths may be considered in an attempt to avoid forecasted weather 423. Selection of play button 418 causes a display of a visual simulation of a virtual flight plan for effective flight planning.

The menu along the right side of the panel in FIG. 4A includes options to select alternate views for mapping interface 429 including views based on high instrument flight rules (IFR) 424, low IFR 425, visual flight rules (VFR) 426, satellite imagery (SAT) 427, and terrain representation (TERR) 428 for example. Panel 400 may be configured to display greater or fewer menu items along the right of the panel or to arrange items differently without departing from the scope hereof.

FIG. 4A depicts an exemplary mapping interface 429 based on high IFR 424. Note that high IFR 424 is highlighted compared to the other options on the right side of the panel, indicating that the high IRF option was selected. IFR are rules and regulations established by the Federal Aviation Administration (FAA) to govern flight when flying conditions do not allow for safe visual reference, and pilots must rely on their flight instruments for navigation. High IFR 424 illustrates available routes on an aeronautical map based on an established set of rules for efficient flight planning.

FIGS. 4B-4E depict exemplary flight planning panels 430, 432, 434, 436, which are examples of panel 400 of FIG. 4A. Flight planning panels 430, 432, 434, 436 include mapping interfaces 431, 433, 435, 437, which are based on low IFR 425, VFR 426, satellite imagery 427, and terrain representation 428, respectively. A user has the option of viewing one or more mapping interfaces (429, 431, 433, 435, 437) while creating the flight plan.

Figure 4B:
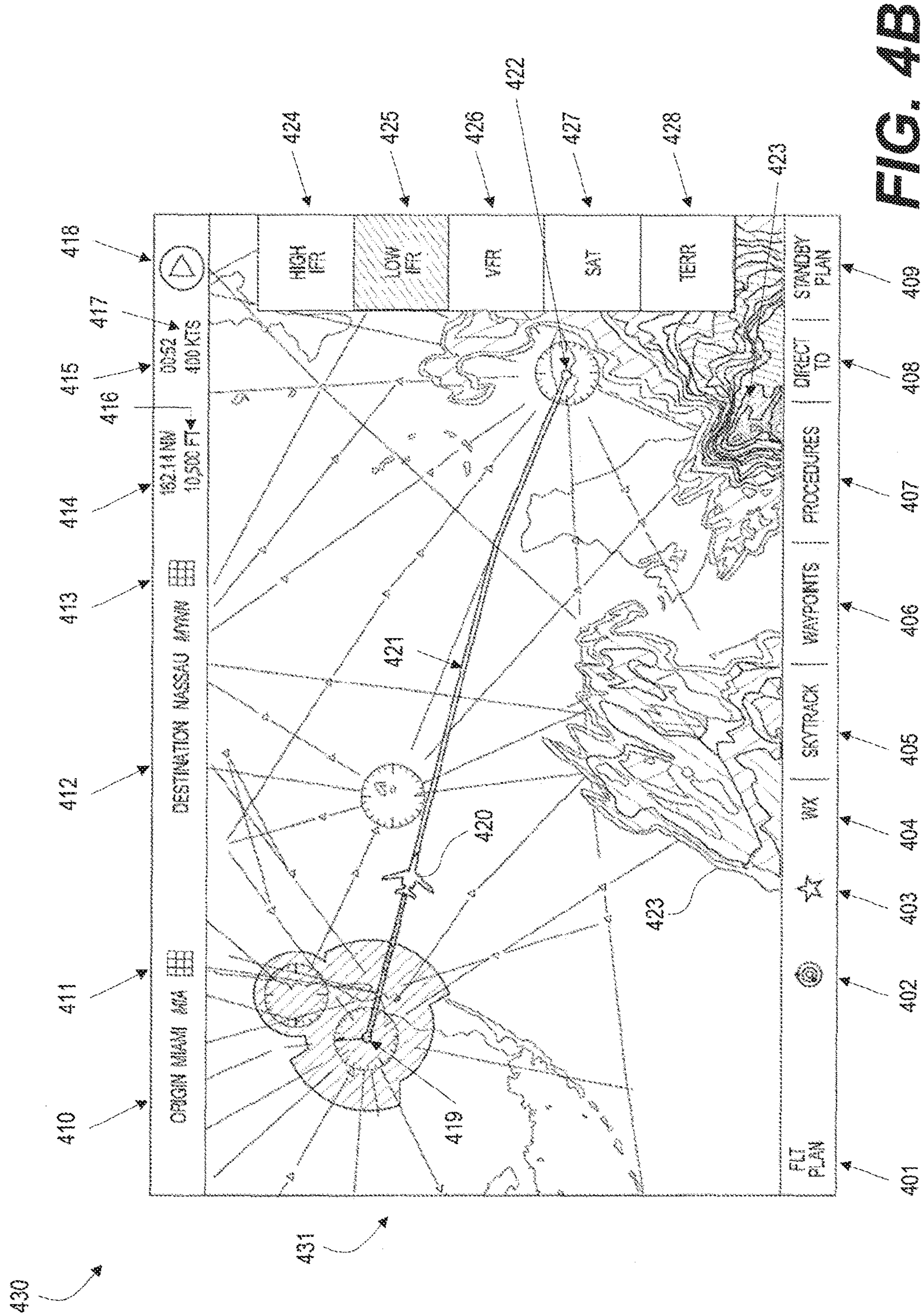
FIG. 4B depicts one embodiment of a flight planning system for navigation of an aircraft based on low instrument flight rules, in accordance with an embodiment of the present invention.

FIG. 4B depicts flight planning panel 430, which is an example of flight planning panel 400 of FIG. 4A, that is configured to show a mapping interface 431 based on low IFR 425. Note that the set of routes available differ between high IFR 424 and low IFR 425. Low IFR 425 illustrates available routes on an aeronautical map based on an established set of FAA rules for efficient flight planning.

Figure 4C:
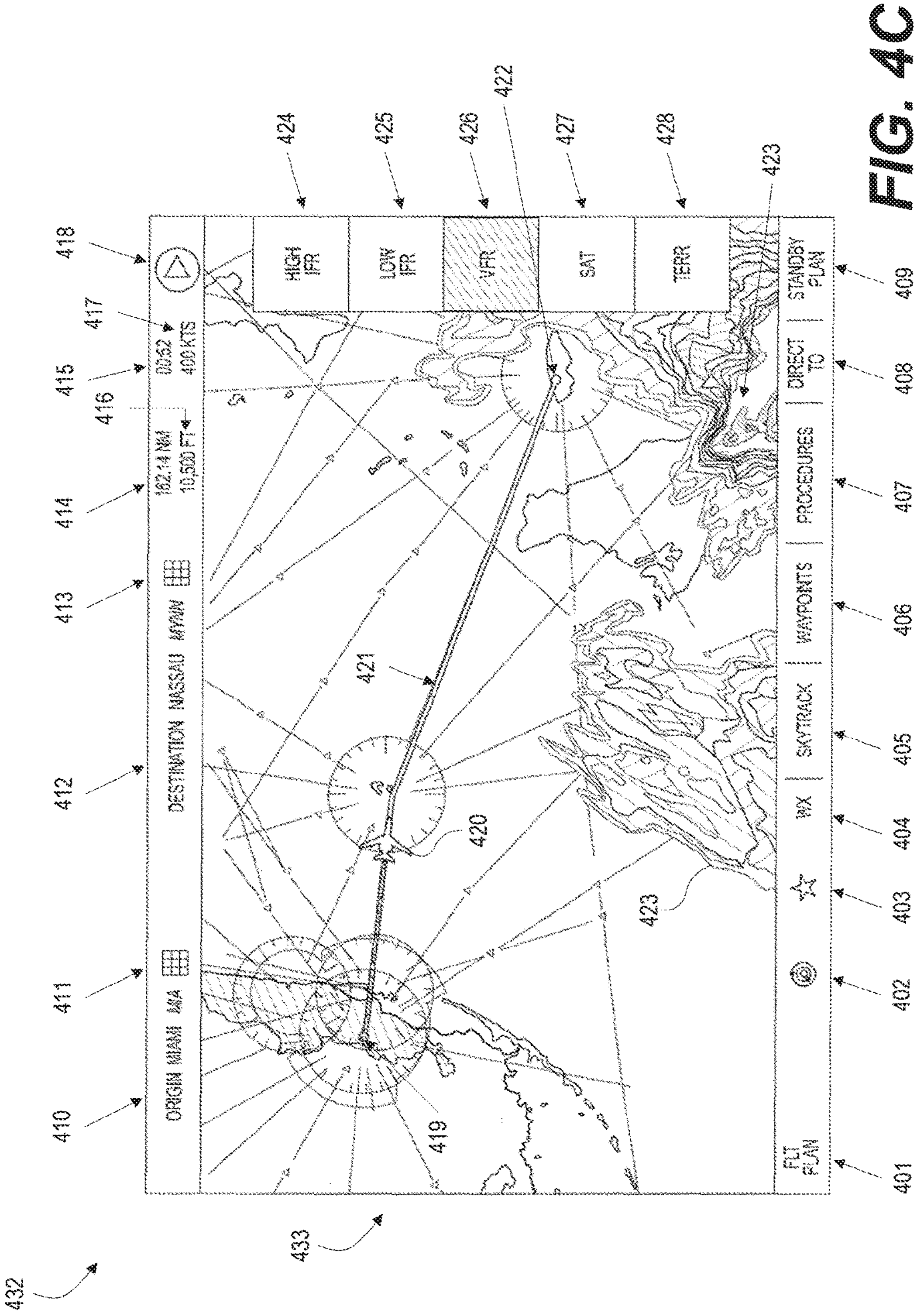
FIG. 4C depicts one embodiment of a flight planning system for navigation of an aircraft based on visual flight rules (VFR), in accordance with an embodiment of the present invention.
Figure 4D:
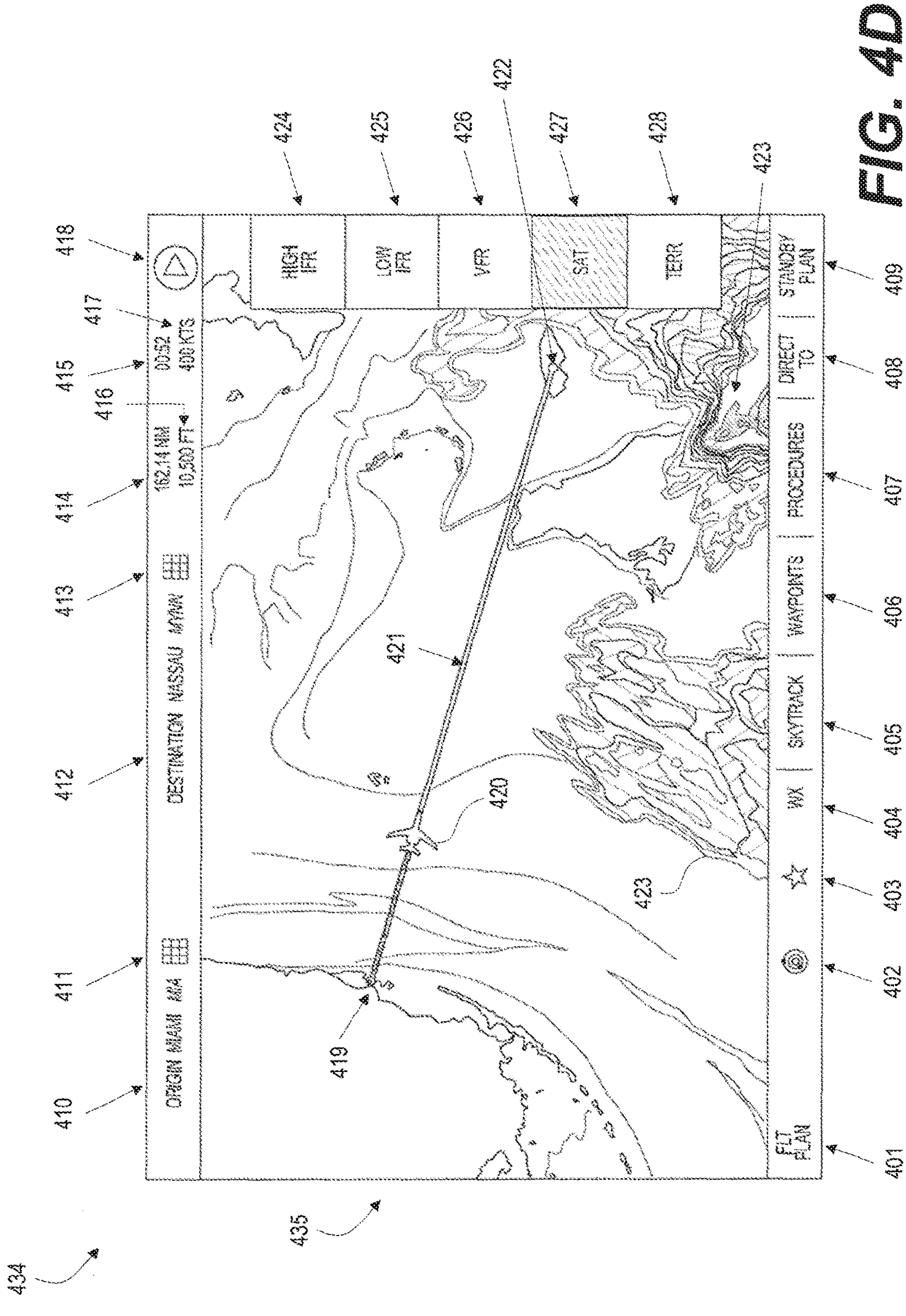
FIG. 4D depicts one embodiment of a flight planning system for navigation of an aircraft based on satellite imagery, in accordance with an embodiment of the present invention.
Figure 4E:
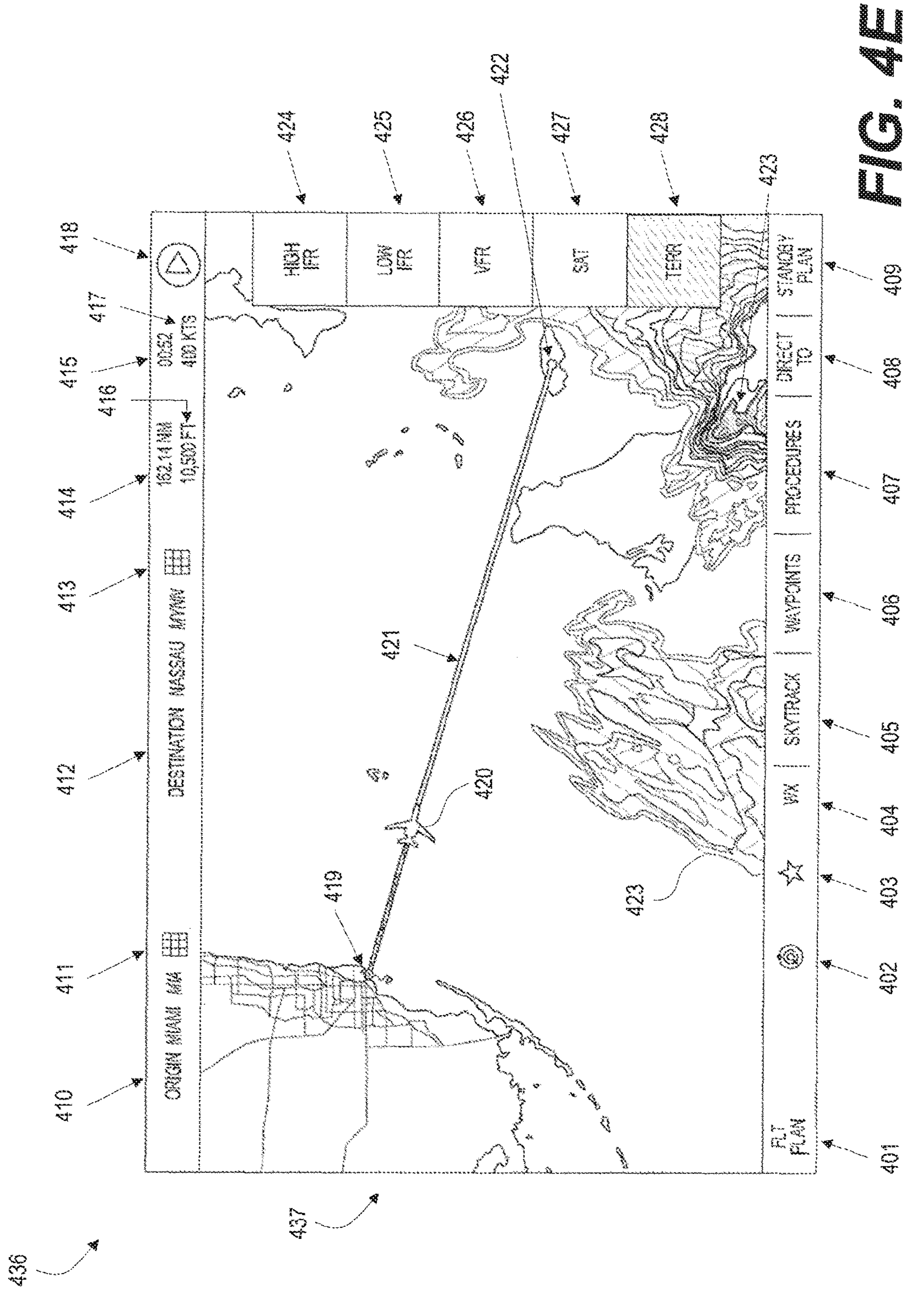
FIG. 4E depicts one embodiment of a flight planning system for navigation of an aircraft based on a terrain representation, in accordance with an embodiment of the present invention.

FIG. 4C depicts flight planning panel 432, which is an example of flight planning panel 400 of FIG. 4A, that is configured to show a mapping interface 433 based on VFR 426. VFR is a set of FAA rules and regulations for flying an aircraft using outside visual cues, wherein reliance on instruments is optional for pilots. VFR 426 illustrates an aeronautical map showing routes based on available visual cues for efficient flight planning.

FIG. 4D depicts flight planning panel 434, which is an example of flight planning panel 400 of FIG. 4A, that is configured to show a mapping interface 435 based on satellite imagery (SAT) 427. Satellite imagery includes, for example, composite images of multiple photographs taken by one or more satellites from an Earth orbit. Satellite imagery 427 provides a mapping interface 435 based on composite satellite images for efficient flight planning.

FIG. 4E depicts flight planning panel 434, which is an example of the flight planning panel 400 of FIG. 4A, that is configured to show a mapping interface 437 based on a terrain representation (TERR) 428. Terrain representation 428 represents terrain features of Earth with lines and shading, where different shades may represent water, land and different elevations for example. Lines may indicate city and county boundaries, roads, and land/water interfaces. Terrain representation 428 provides a mapping interface 437 based on Earth terrain for efficient flight planning.

Figure 4F:
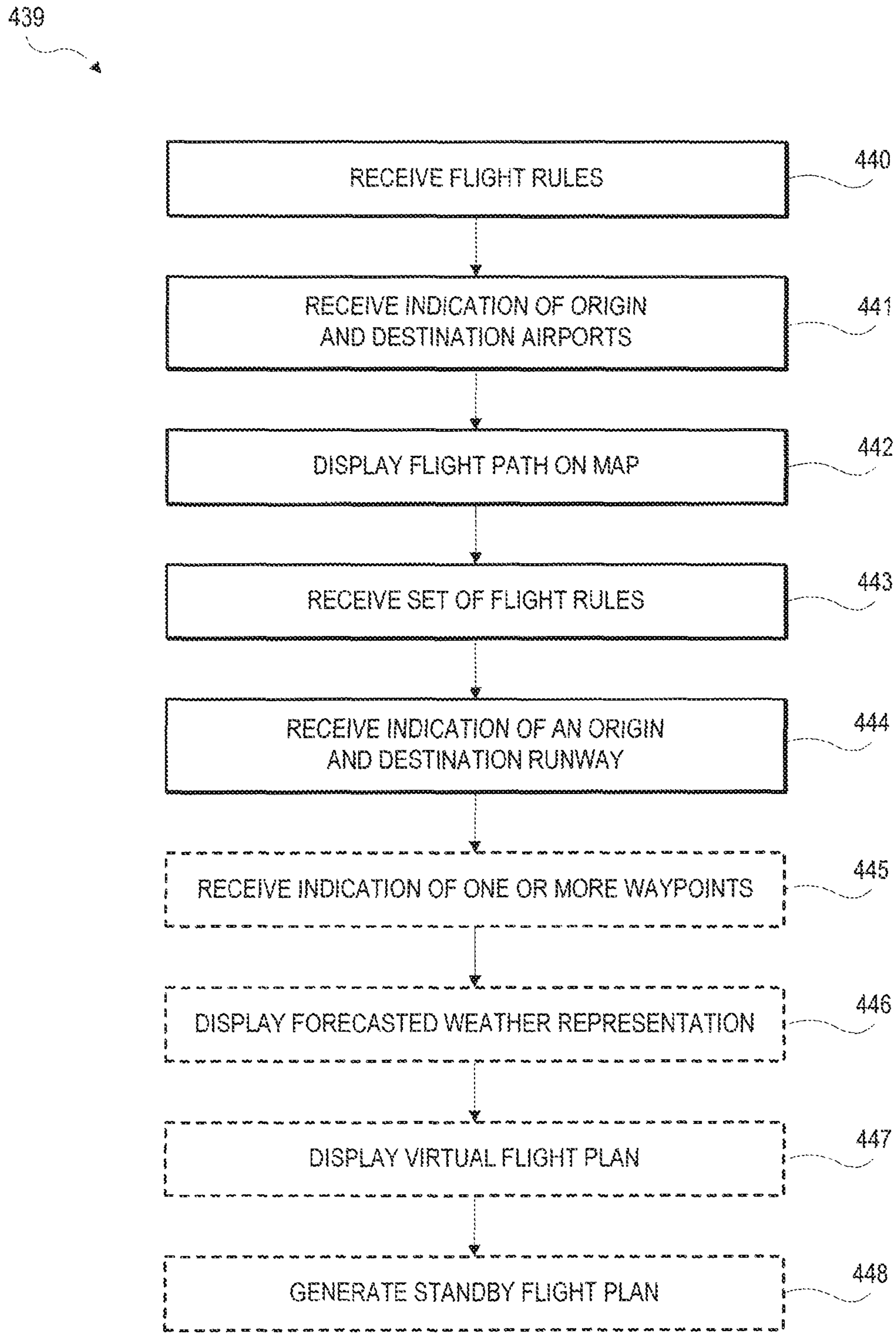
FIG. 4F depicts an embodiment of a flight planning method utilizing an interactive map on a touch screen device in an aircraft cockpit, in accordance with an embodiment of the present invention.

FIG. 4F shows steps of an exemplary flight planning method 439 utilizing an interactive map on a touch screen device in an aircraft cockpit. In step 440, a set of flight rules is received. In an example of step 440, a user selects either high IFR 424, low IFR 425, or VFR 426, as shown in FIG. 4A-4C, respectively, for viewing and selecting a flight path based on a desired set of flight rules.

In step 441, an indication of both an origin airport and a destination airport is received via the touch screen device. In an example of step 441, a user selects an origin/destination airport by activating the origin/destination selecting component of the flight planning system from panel 400. Specifically, origin selecting component is activated using origin name indicator 410, to search for or enter an airport name or code via keyboard, or using origin location 419, to select an origin airport by touching and holding a location within mapping interface 429. Similarly, destination selecting component is activated using destination name indicator 412 to type an airport name or code, or touching and holding destination location 422.

In step 442, a flight path is displayed on the map based on each of the set of flight rules and the origin and destination airports. In an example of step 442, flight path 421 is depicted on the map of at least one of mapping interface 429 (FIG. 4A), 431 (FIG. 4B), 433 (FIG. 4C), 435 (FIG. 4D), 437 (FIG. 4E). In an embodiment, flight path 421 illustrates a projected path from origin location 419 to destination location 422 that is displayed on a particular mapping interface for a given set of flight rules (e.g., 429 of FIG. 4A, 431 of FIG. 4B, 433 of FIG. 4C), as well as for the alternate views satellite imagery 435 (FIG. 4D) and terrain representation 437 (FIG. 4E).

In step 443, a set of flight rules is received from a selection of at least one of the following options: high IFR, low IFR, or VFR. In an example of step 443, a user displays and selects one set of flight rules using panel 400 by touching high IFR 424, low IFR 425, or VFR 426.

In step 444, an indication of an origin runway and a destination runway is received. In an example of step 444, a user selects origin and destination runways by activating the origin/destination selecting component of the flight planning system. Specifically, origin selecting component is activated using origin name indicator 410 or origin location 419, and destination selecting component is activated using destination name indicator 412 or destination location 422, as described above for step 441. Once an origin/destination airport is selected, a menu of available runways for receiving a runway selection is displayed at step 444.

In optional step 445, an indication of one or more waypoints between the origin and destination based on received map locations is received, wherein a waypoint is a coordinate in physical space. In an example of step 445, a waypoint is selected by touching and holding a location on mapping interface 429 to display a menu for selecting a waypoint. In an embodiment, one or more additional waypoints are added to the flight plan by sequentially touching and holding map locations.

In optional step 446, forecasted weather is displayed utilizing dynamic representations on the map. In an example of step 446, forecasted weather representation 423 is displayed on mapping interface 429 of FIG. 4A. In an embodiment, weather representation 423 is a dynamic representation of recent weather or forecasted weather.

In optional step 447, a virtual flight plan is displayed, wherein an aircraft icon simulates the flight path on the map. In an example of step 447, touching play button 418 initiates aircraft icon 420 to move from origin location 419 to destination location 422 along flight path 421 of FIGS. 4A-4E. In an embodiment, simulated flight plan includes potential interaction with dynamic representation of forecasted weather 423.

In optional step 448, an alternate flight path is generated, thereby providing a standby flight plan. In an example of step 448, the alternate flight path is created using steps 440 to 447, as described above. In an embodiment, the alternate flight path is designated as a standby flight plan by touching standby plan link 409.

FIGS. 4G-4J depict example charts from a charts component of the flight planning system. The charts component may be activated in several ways, including touching origin chart icon 411 or destination chart icon 413 of FIG. 4A, for example. One or more chart icons may also be displayed on TSIP 210 outside of flight planning panel 400. Proximity icon 402 and favorites icon 403 may also be used to activate the charts component. Within the mapping interface 429, charts component is activated in response to touch of an origin location 419 or destination location 422 on TSIP 210. Lastly, charts component is activated by typing an airport code, airport name, or city from a keyboard.

The charts component may utilize onboard computer 201 to process information including user input, database 230, GPS location, and flight plan, for determining which airport chart to display. Database 230 provides the necessary charts to display. GPS location data are accessed when the proximity component is used to select an airport. Flight plan data are used based upon origin and destination airports of a loaded flight plan.

Figure 4G:
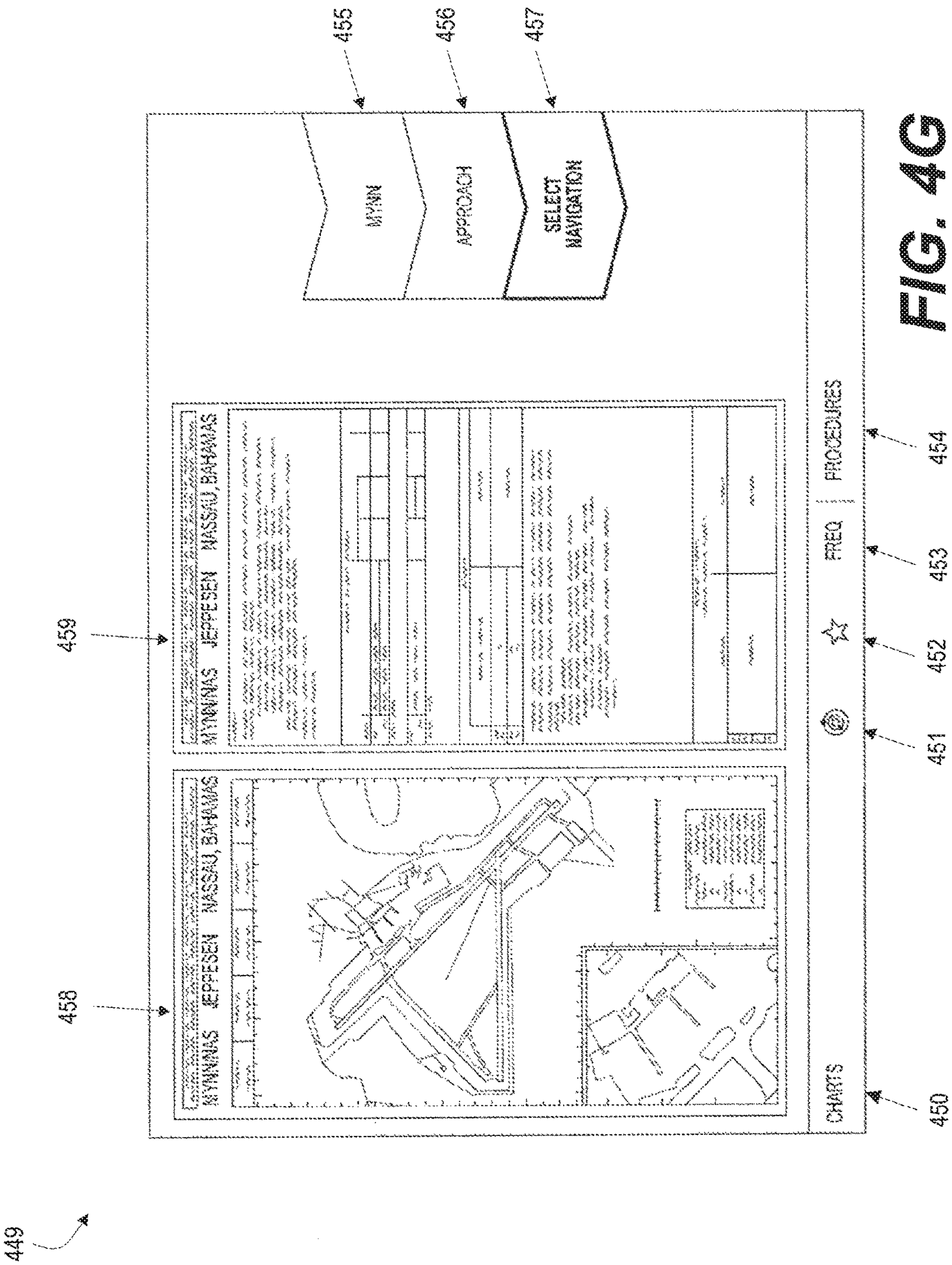
FIG. 4G depicts one embodiment of a charts panel of a flight planning system for navigation of an aircraft, in accordance with an embodiment of the present invention.

FIG. 4G depicts an exemplary charts panel 449. Along the bottom of charts panel 449 is, for example, a title indicator 450, proximity icon 451, favorites icon 452, frequencies (FREQ) link 453, and procedures link 454. Proximity icon 451 and favorites icon 452, which are examples of proximity icon 402 and favorites icon 403 of FIG. 4A, are used to access charts based on proximate airports or a list of favorite/frequent airports, respectively. Frequencies link 453 provides one touch access to a list of radio frequencies associated with the displayed chart. The radio frequencies displayed include, for example, Automatic Terminal Information Service (ATIS), Clearance, Ground Control, Tower, Approach Control and Departure Control. The user may select a desired frequency by touch and load the desired frequency into a radio frequency panel (see FIG. 4K). Procedures link 454, which is an example of procedures link 407 of FIG. 4A, provides a link to standardized procedures and checklists for airport approach and departure. Charts panel 449 may be configured to display greater or fewer items along the bottom or to arrange items differently without departing from the scope hereof.

The right side of charts panel 449 includes airport code indicator 455, approach/departure indicator 456, and select navigation indicator 457. Selection of airport code indicator 455 enables selection of an airport and displays its code. Approach/departure indicator 456 enables selection for approaching or departing an airport. For example, if a user is approaching Nassau, Bahamas, MYNN is selected for airport code indicator 455 and approach is selected for approach/departure indicator 456. A chart for approaching MYNN is displayed in charts panel 449 as a first page chart 458 and a second page chart 459. First page chart 458 shows airport runways and gates, for example. By pinning charts panel 449 to TSIP 210, such that panel 449 remains stationary on TSIP 210, first and second chart pages 458, 459 may be zoomed, dragged, or otherwise manipulated using touch gestures. Selection of select navigation indicator 457 enables selection of a navigation type (see FIG. 4H).

Figure 4H:
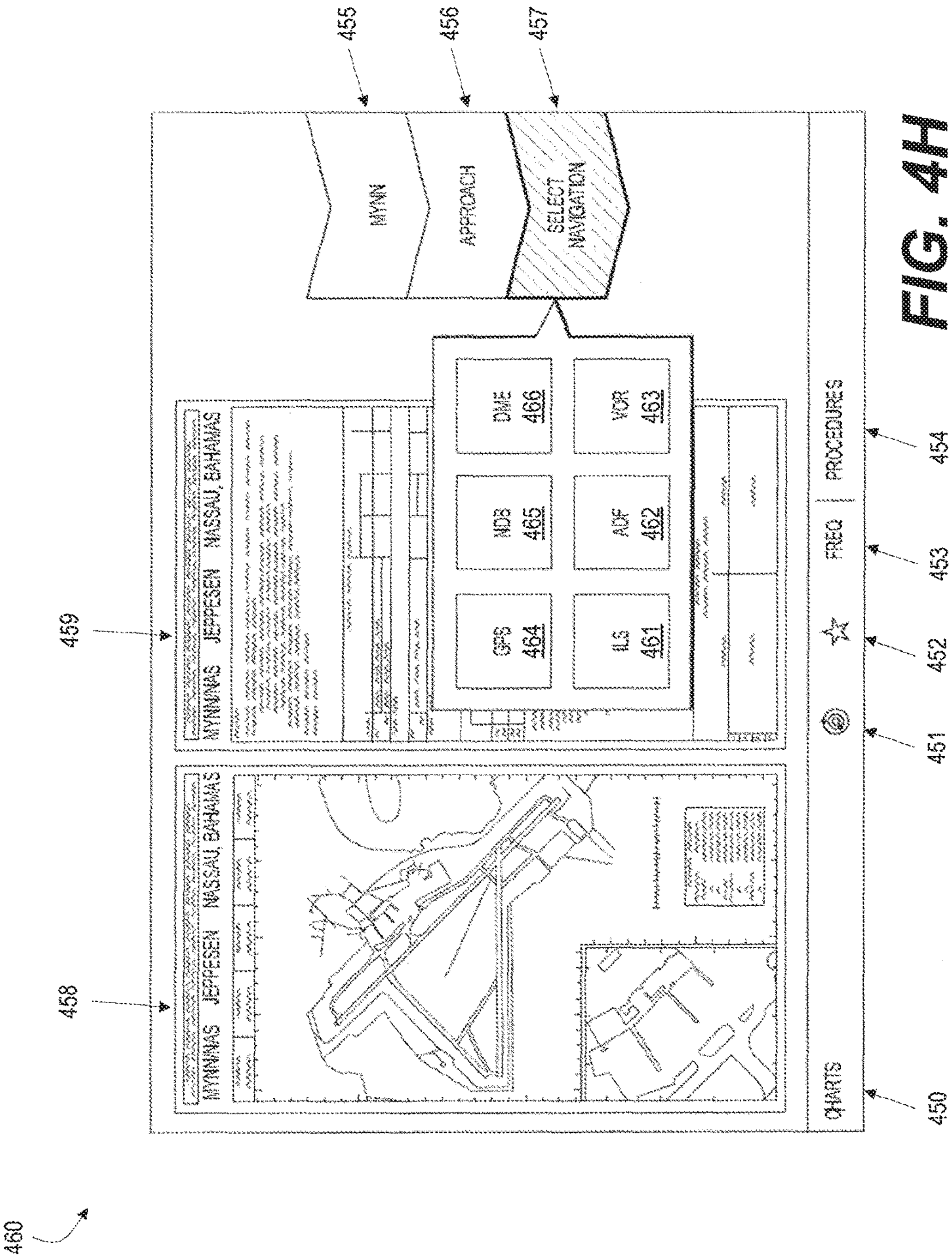
FIG. 4H depicts one embodiment of a charts panel of a flight planning system for navigation of an aircraft in which available navigation types are displayed, in accordance with an embodiment of the present invention.

FIG. 4H depicts an exemplary charts panel 460 in which select navigation indicator 457 is selected to display navigation types available for the aircraft and selected airport. Navigation types include instrument landing system (ILS) 461, automatic direction finder (ADF) 462, VHF (very high frequency) omnidirectional range (VOR) 463, global positioning system (GPS) 464, non-directional beacon (NDB) 465, and distance measuring equipment (DME) 466.

Figure 4I:
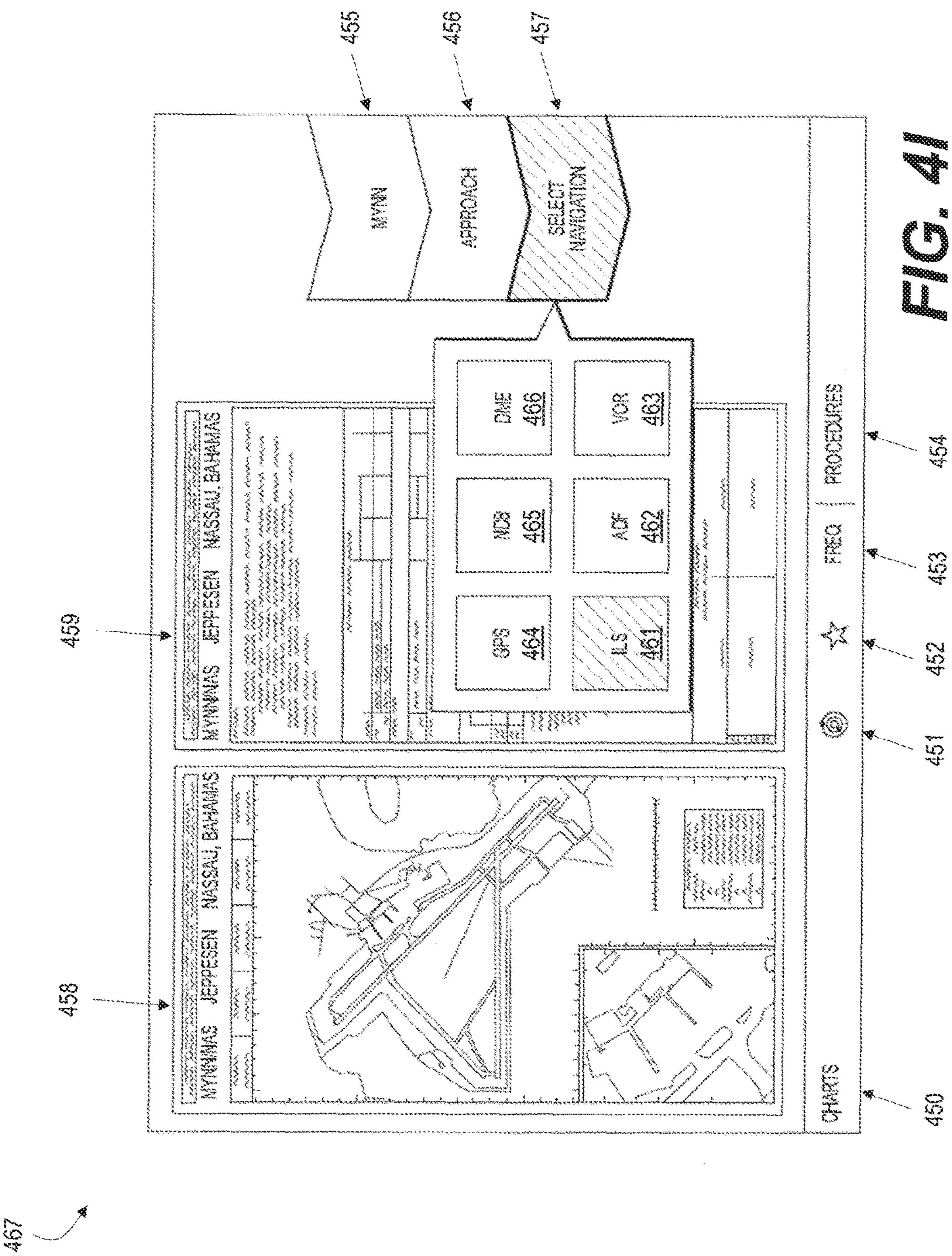
FIG. 4I depicts one embodiment of a charts panel of a flight planning system for navigation of an aircraft in which navigation by ILS is selected, in accordance with an embodiment of the present invention.

FIG. 4I depicts an exemplary charts panel 467 in which navigation by ILS 461 has been selected. Once a navigation type is selected, the charts component automatically displays available runways.

Figure 4J:
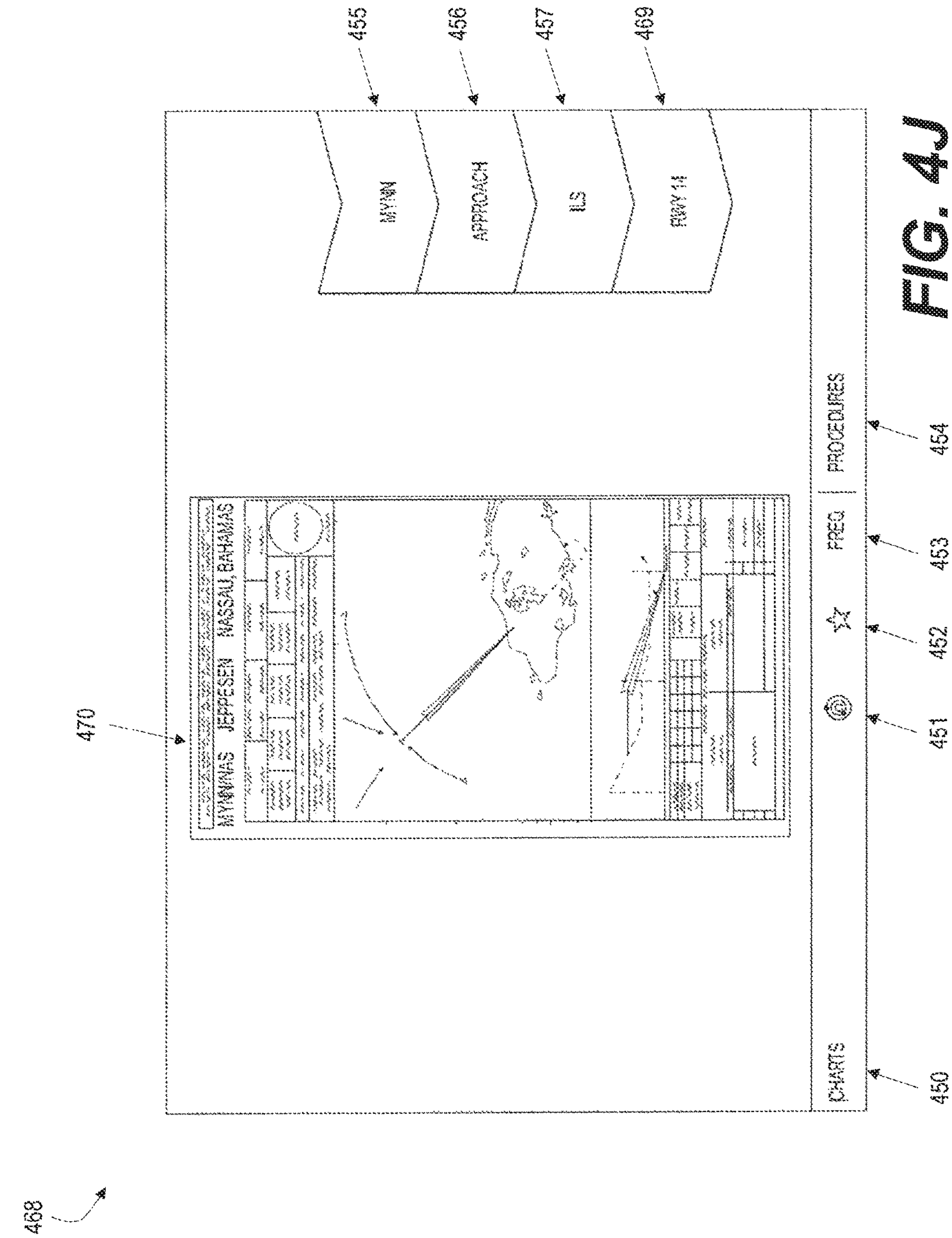
FIG. 4J depicts one embodiment of a charts panel of a flight planning system for navigation of an aircraft in which a runway has been selected, in accordance with an embodiment of the present invention.

FIG. 4J depicts an exemplary charts panel 468 in which runway fourteen (RWY 14) 469 has been selected. A chart 470, corresponding to an approach for runway fourteen is displayed in panel 468. Charts panel 468 is configured such that changes to selections may be made by re-selecting any previous selection, for example airport code indicator 455, approach/departure indicator 456, or select navigation indicator 457.

Figure 4K:
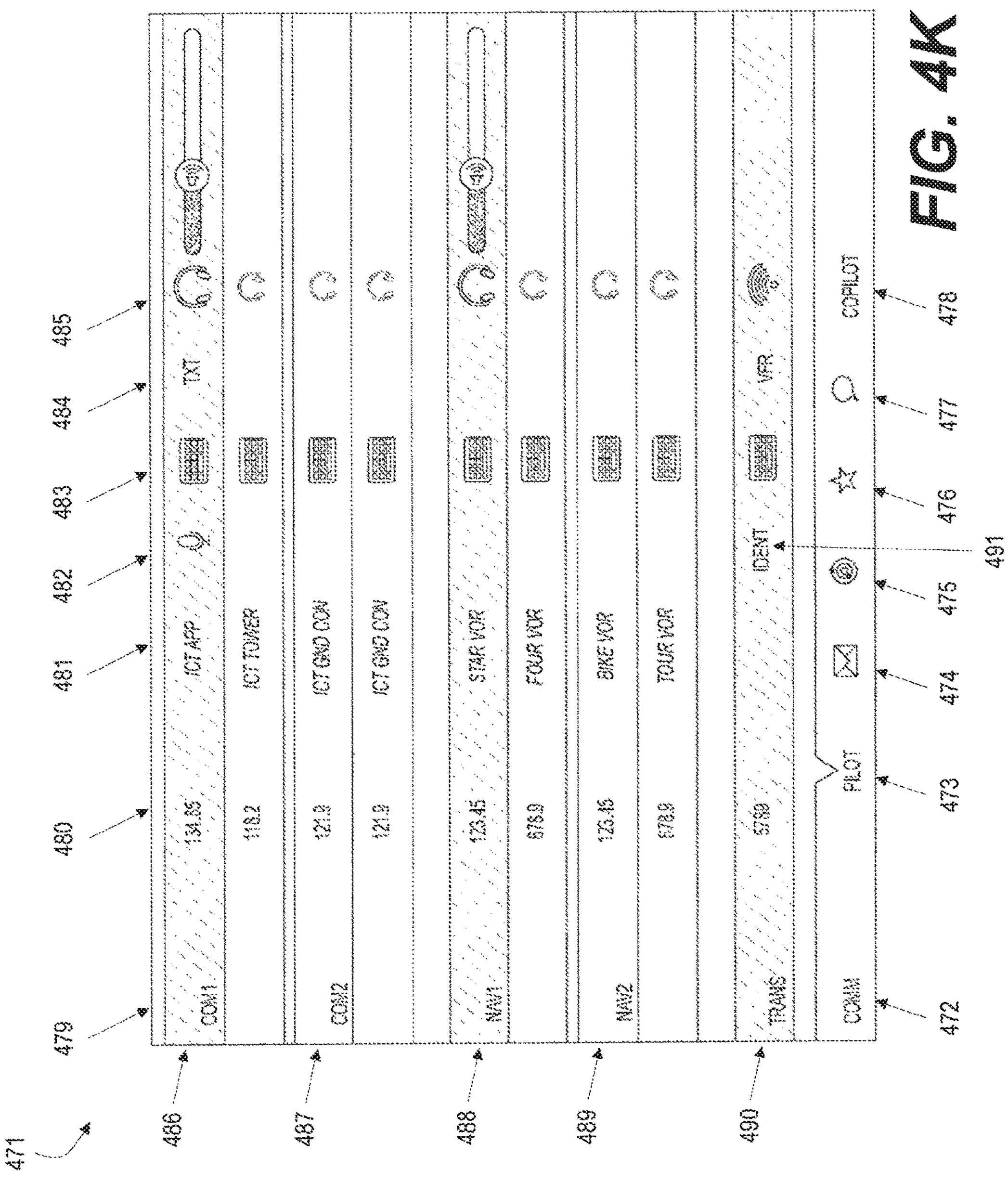
FIG. 4K depicts one embodiment of a radio frequency panel for navigation of an aircraft, in accordance with an embodiment of the present invention.

FIG. 4K depicts an exemplary radio frequency panel 471 of the flight planning system. Radio frequency panel 471 may be accessed in several ways, including selecting or touching one of a communications link on TSIP 210, proximity icon 402, or favorites icon 403. Within the mapping interface 429, radio frequency panel is accessed in response to touch of radio source locations displayed on the map, including, for example, waypoints and origin/destination airports. Lastly, radio frequency component may be accessed by typing or searching for an airport code, airport name, or radio frequency, using a keyboard to search a menu stored in database 230.

Radio frequency panel 471 includes a title indicator 472, a pilot indicator 473, an email icon 474, a proximity icon 475, a favorites icon 476, a text message icon 477, and a co-pilot indicator 478. An example title, as in FIG. 4K, is COMM, which is communication abbreviated, communication being the primary purpose of radio frequency panel 471. Pilot indicator 473 illuminates when a pilot (as opposed to a co-pilot) is the active user who controls radio frequency panel 471. Email icon 474 is used to access an email client for communicating via email. Proximity icon 475 and favorites icon 476, which are examples of proximity icon 402 and favorites icon 403 of FIG. 4A, are used for accessing radio frequencies based on proximity to the aircraft or based on a list of favorite radio frequencies, respectively. Text message icon 477 provides a link to a text messaging component for sending and receiving text messages sent via radio. Co-pilot indicator 478 illuminates when a co-pilot (as opposed to a pilot) is the active user who controls radio frequency panel 471.

Radio frequency panel 471 includes a display of radio frequencies organized in rows for example. Each row includes a communication type indicator 479, a radio frequency indicator 480, a radio frequency identifier 481, a microphone icon 482, a keyboard icon 483, a TXT icon 484, and a headset icon 485. Communication type indicator 479 lists the type of use for each corresponding radio frequency indicator 480. For example, COM indicates a radio frequency used for radio communication (e.g., with an airport tower or ground control), and NAV indicates a radio frequency used for aircraft navigation (e.g., with ground radio beacons). Radio frequency indicator 480 lists the actual frequency of the radio waves in kHz. Radio frequency identifier 481 is a name to describe the purpose or recipient of the radio communication at that particular frequency. In an embodiment, radio frequency identifier 481 includes custom names for rapid identification of appropriate radio frequencies. Microphone icon 482 provides a switch and display for turning a microphone on or off for radio communication. Selection of keyboard icon 483 brings up a keyboard on TSIP 210 for typing. TXT icon 484 displays which radio frequency is active for sending and receiving text messages via the text messaging component. Headset icon 485 includes volume control for adjusting headset volume.

The rows of radio frequencies listed in panel 471 include a first communications channel 486, abbreviated COM1; a second communications channel 487, abbreviated COM2; a first navigation channel 488, abbreviated NAV1; a second navigation channel 489, abbreviated NAV2; and a transmit channel 490, abbreviated TRANS 490. Rows 486, 488, and 490 are highlighted to indicate active radio frequencies. First and second communications channels 486, 487 are, for example, used for radio communication with an airport ground control. First and second navigation channels 488, 489 are, for example, used for radio communication with navigational aids, such as fixed ground beacon or GPS networks. Transponder channel 490 is, for example, used for identification with other aircraft and air traffic control. An identify symbol (IDENT) 491 may be selected to transmit a transponder code to air traffic control or another aircraft. Additional frequencies may be listed, for example, under rows 486, 487, 488, and 489 in FIG. 4K, for quick and easy selection of alternate radio frequencies. Additionally, other frequencies not shown can be accessed by scrolling the window down to access them. Those frequency channels include, but are not limited to, automatic direction finder (ADF), direction measuring equipment 1 and 2 (DME1 and DME2), and high frequency 1 and 2 (HF1 and HF2).

Figure 4L:
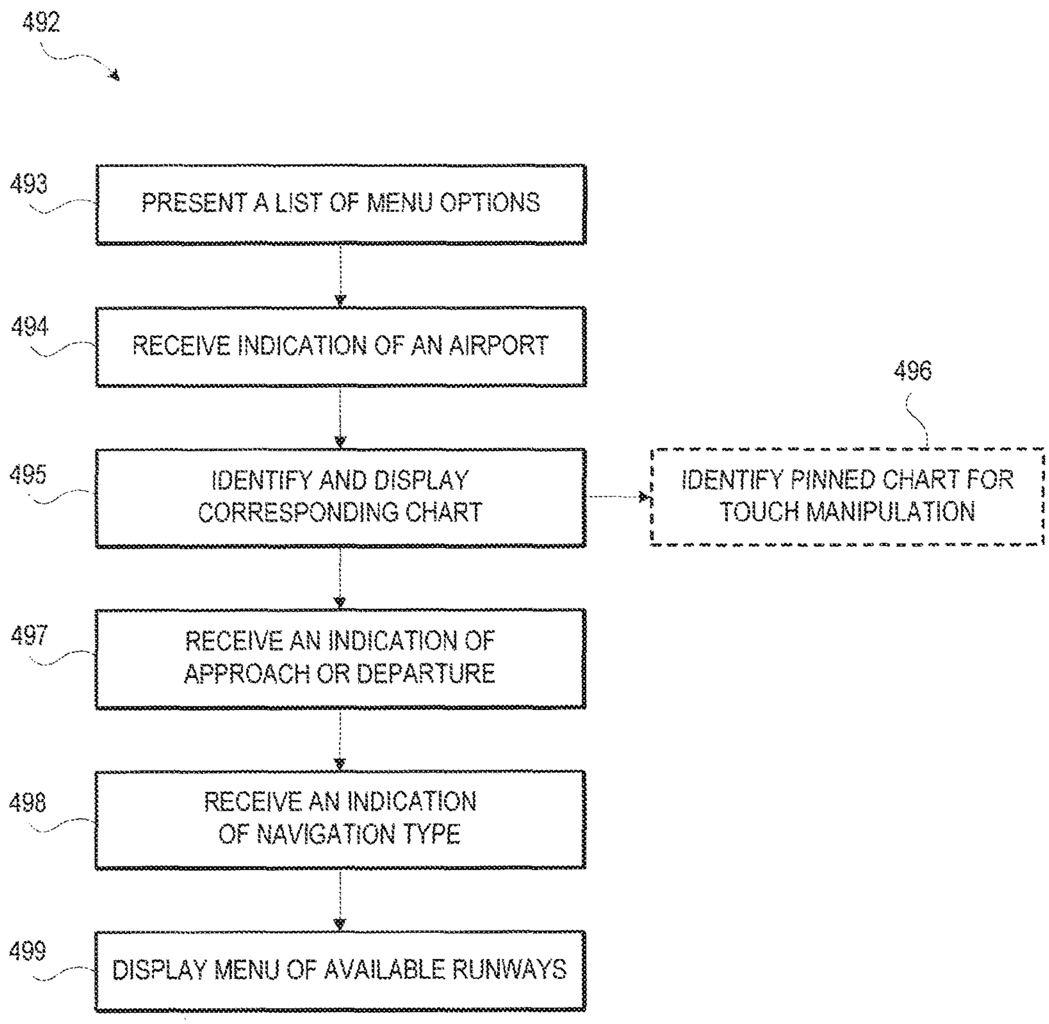
FIG. 4L depicts an embodiment of a flight planning method for providing a chart on a touch screen device, in accordance with an embodiment of the present invention.

FIG. 4L shows steps of an exemplary flight planning method 492 for providing a chart on a touch screen device. Method 492 utilizes onboard computer 201 to process information including user input, database 230, GPS location, and flight plan, for determining which airport chart to display. Database 230 provides the necessary charts to display for example. GPS location data are accessed, for example, when the proximity component is used to select an airport. Flight plan data may be used based upon origin and destination airports of a loaded flight plan.

In step 493, a list of menu options is presented on a touch screen mounted in an aircraft cockpit. In an example of step 493, a charts function is selected displaying charts panel 449. In an embodiment, charts function is selected from origin chart icon 411, destination chart icon 413, proximity icon 402, or favorites icon 403 of panel 400 of FIG. 4A, or from one or more touch icons displayed on TSIP 210. In an embodiment, charts component is activated in response to touch of an origin location 419 or destination location 442 within mapping interface 429. In an embodiment, charts component is activated by typing an airport code, airport name, or city from a keyboard. Menu options are selected by using charts panel 449 (FIG. 4G) displayed on TSIP 210.

In step 494, an indication of an airport is received. In an example of step 494, an indication of an airport is selected and its code is displayed using airport code indicator 455 of charts panel 449 of FIG. 4G. In an embodiment, an airport for Nassau, Bahamas, is selected and the airport code MYNN is displayed (see FIG. 4G).

In step 495, corresponding charts are identified and automatically displayed. In an example of step 495, a first page chart 458 and a second page chart 459 are identified and displayed in charts panel 449.

In optional step 496, it is identified that a selected chart is pinned to the touch screen by selection of a pin icon to enable manipulation of the selected chart with one or more touch gestures. In an example of optional step 496, charts panel 449 is pinned to TSIP 210 enabling first and second chart pages 458, 459 to be dragged, scrolled, rotated, zoomed or otherwise manipulated using touch gestures. A chart may be pinned to TSIP 210 before or after any step of method 492.

In step 497, an indication of approach or departure is received. In an example of step 497, approach is selected and displayed using approach/departure indicator 456 of charts panel 449 of FIG. 4G.

In step 498, an indication of a navigation type is received. In an example of step 498, navigation type is selected using select navigation indicator 457 of charts panel 449 of FIG. 4G. In an embodiment, available navigation types include ILS 461, ADF 462, VOR 463, GPS 464, NDB 465, and DME 466 as depicted in charts panel 460 of FIG. 4H. In an embodiment, navigation by ILS 461 is selected as shown in charts panel 467 of FIG. 4I.

In step 499, a menu of available runways is automatically displayed. In an example of step 499, a menu of available runways is displayed in charts panel 449. In an embodiment, runway fourteen (RWY 14) 469 is selected and corresponding chart 470 for approach to runway fourteen is shown in charts panel 468 of FIG. 4J.

Embodiments of the present invention are directed to providing navigational aids. Navigational aids have been used in aircraft to assist users in navigation and to improve situational awareness. However, the aids are typically separate components and sometimes multiple sources need to be referenced to gain access to necessary information. Additionally, the displays of previous navigational aid systems were limited and not able to display detailed information related to the navigational aid. For example, the previous displays were typically very small so including detailed information was not feasible since there was no room on the screen to display the information.

A navigational aid, as used herein, refers generally to a tool utilized to aid in the navigation of a vehicle whether it is the physical navigation of the vehicle, additional information aiding in the physical navigation of the vehicle, or the like. A vehicle may be any mode of transportation including, but not limited to, aircraft, watercrafts, etc. In preferred embodiments, the present invention is implemented within an aircraft. While navigational aids currently exist that help “guide” a vehicle, or aircraft in embodiments, that is the extent of the aid. A mere “guide” showing where the aircraft is traveling is provided. The present invention offers integration of multiple informational sources as well as detailed navigational information.

The navigational aids of the present invention may be displayed via the TSIP 210. Additionally, the use of a camera, such as camera 290, may facilitate the capture of the real-time image displayed on the TSIP 210. The navigations aids described herein may be displayed on the TSIP 210 overlaying the real-time image. In embodiments, navigational aids are displayed overlaying a three-dimensional real-time panoramic view. The navigational aids may include, for instance, a flight guide, an airport guide, and a traffic guide, to name a few. Any other application that aids in the navigation of a vehicle (e.g., aircraft) may be included in the navigational aids displayed via TSIP 210.

Initially, a flight guide navigational aid will be discussed. The flight guide may be displayed overlaying the three-dimensional real-time image of the TSIP 210. The flight guide itself may be displayed in a three-dimensional representation. The flight guide, with the use of a plurality of planes, or path indicators, creates a graphical representation of a flight plan and/or flight path. Flight plan, as used herein, refers generally to a planned path identified at the onset of the flight an aircraft should follow to arrive at a destination. A flight path, as used herein, refers generally to an actual path of an aircraft. The flight path may or may not be the same as the flight plan. User configurations may determine whether a flight plan or flight path is displayed. Alternatively, a setting could be selected that provides both the flight plan and the flight path such that a user is able to quickly view if there are any differences between the current flight plan and the planned flight plan.

The flight guide may interact with various systems of an aircraft including, but not limited to, aircraft avionics, autopilot and flight plan systems to determine location, speed, altitude, attitude, and the like, to display the appropriate flight track the aircraft will/should follow. The information necessary to the flight guide application may be acquired from the ARINC Data Bus of any avionics manufacturer system. In embodiments, the flight guide application may be a stand-alone component in communication with the avionics manufacturer's system. In additional embodiments, the flight guide application may be incorporated into an avionics manufacturer's system.

Figure 5A:
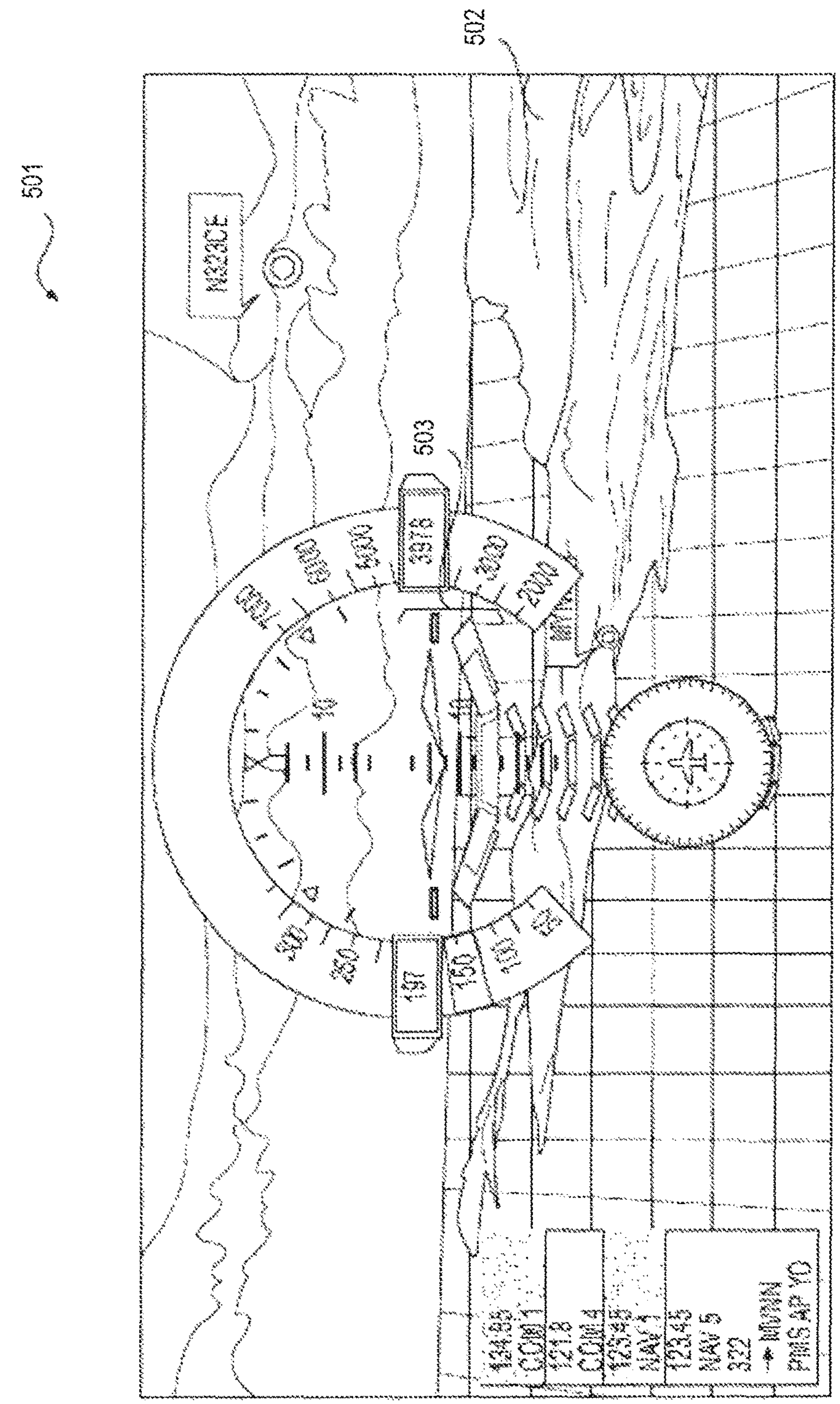
FIG. 5A depicts an exemplary graphical user interface (GUI) in which a navigational aid is displayed, in accordance with an embodiment of the present invention.

FIG. 5A provides an exemplary graphical user interface (GUI) 501 illustrating a flight guide application. A real-time image 502 is provided via the TSIP 210 and the flight guide application is provided such that it is overlaying the real-time image 502. The flight guide application is embodied in GUI 300 as a flight path 503 comprising a plurality of planes, or path indicators. The plurality of planes/path indicators may be used to highlight the flight path 503 of an aircraft. The plurality of planes may each be associated with various coordinates (e.g., physical locations in space), glide slopes, and the like. In an embodiment, the information associated with each plane/path indicator (e.g., glide slope, etc.) is displayed to a user upon an indication such as selection of the plane, hovering over the plane/path indicator, etc.

Figure 5B:
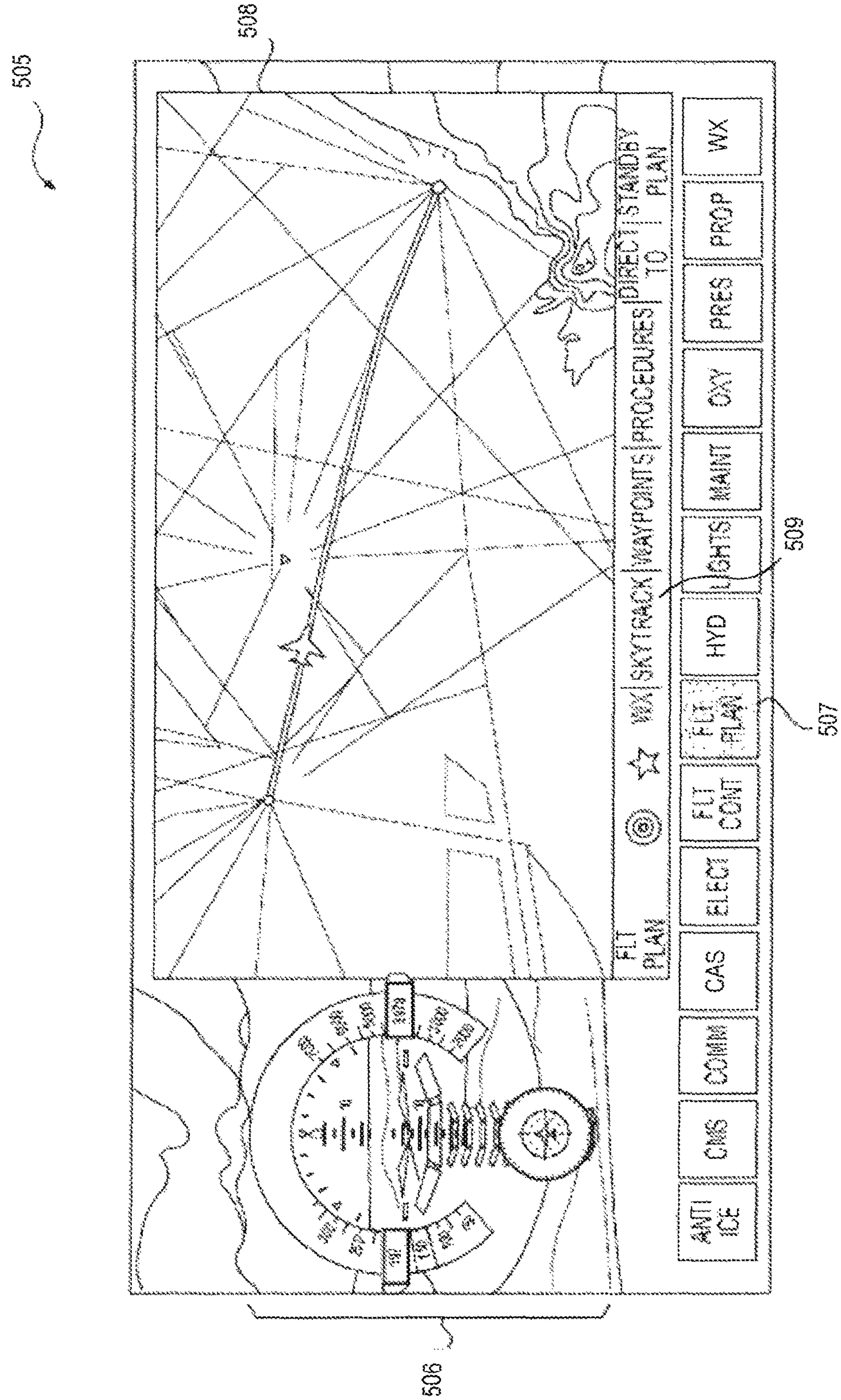
FIG. 5B depicts an exemplary graphical user interface in which a user interface panel is displayed with a navigational aid, in accordance with an embodiment of the present invention.

The flight guide application may be a feature that is controlled directly from the TSIP 210. FIG. 5B provides an exemplary GUI 505 illustrating the selection features of the flight guide application. The flight guide 506 may be displayed in combination with a menu including a flight guide activation icon 507 and a user interface panel 508 including flight path details. The flight guide activation icon 507 may be configured such that selection thereof provides a detailed flight plan user interface panel 508. The user interface panel 508 may include the flight plan from origin to destination, weather, a current flight path to destination, and the like. Within the user interface panel 508 a flight guide activation icon 509 may be included that is configured such that selection thereof activates (i.e., turns on) or deactivates (i.e., turns off) the flight guide application. If deactivated, the flight guide 506 may no longer be presented on the TSIP 210. Upon reactivation, the flight guide 506 may reappear via the GUI 505. This allows users the ability to dynamically control activation of the flight guide 506.

Figure 5C:
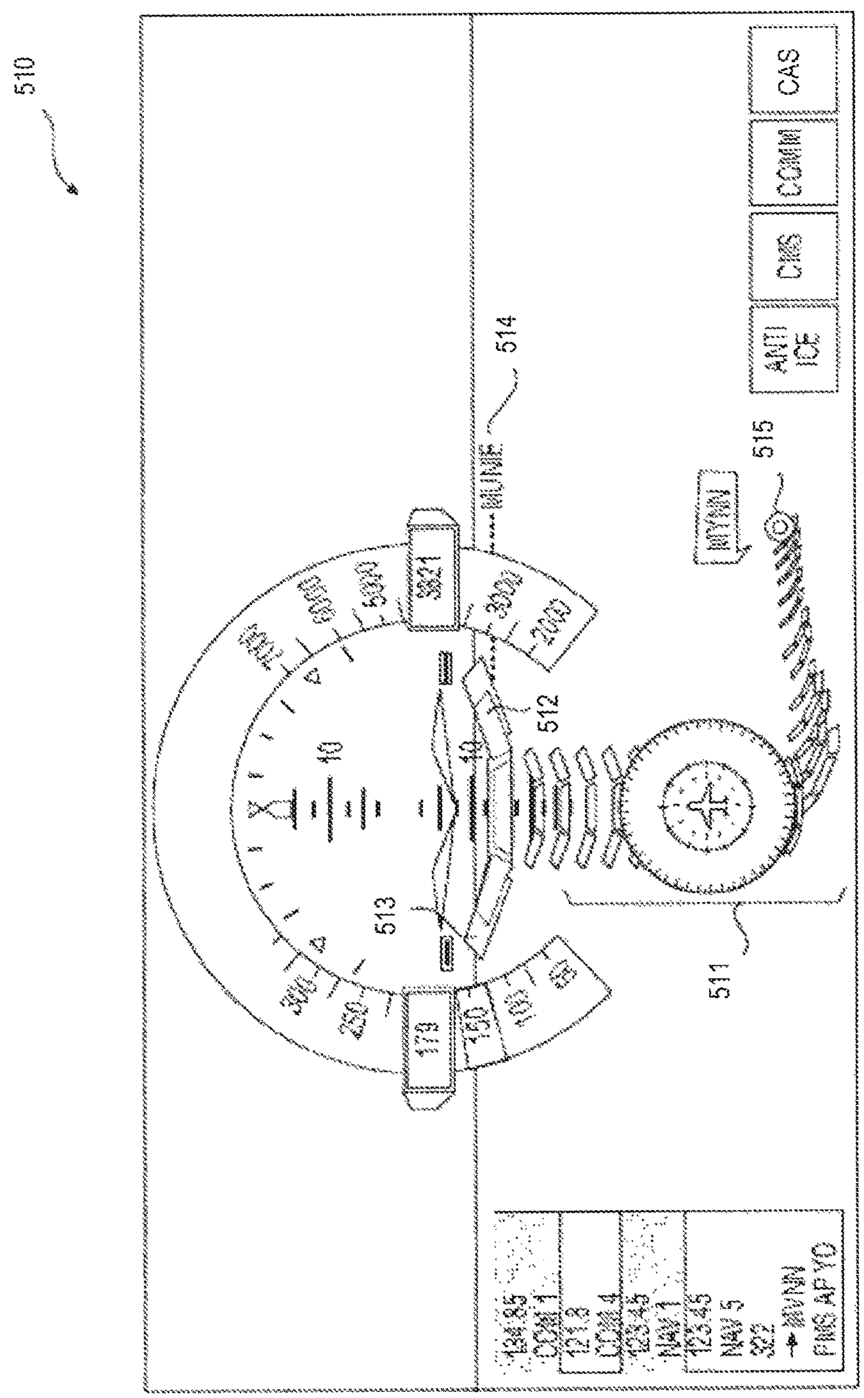
FIG. 5C depicts an exemplary graphical user interface in which a navigational aid is displayed with one or more markers, in accordance with an embodiment of the present invention.

Turning now to FIG. 5C, an exemplary GUI 510 is provided that illustrates a flight guide 511. As previously mentioned, the flight guide 511 illustrates a flight path including one or more path indicators to provide a graphical representation of the flight path. The one or more path indicators may each be associated with spatial coordinates. For instance, a first path indicator 512 is associated with different spatial coordinates than a second path indicator 513. Additionally, each of the path indicators may be represented in a different manner as the vehicle is approaching a path indicator. For example, the representation may be based on distance such that a first path indicator within X distance may be represented one way (e.g., a specific color, a visual representation, etc.) while a second path indicator within Y distance (further than X distance) may be represented another way, different from the first path indicator (e.g., a specific color different than that used for the first path indicator, a visual representation different from that used for the first path indicator, etc.). Alternatively, path indicators may be displayed the same way when they are each greater than a predetermined distance from the aircraft. This may be helpful so that only path indicators that are proximate (within a predetermined distance from an aircraft) are displayed differently and attract attention while the remaining path indicators that are not proximate indicate the flight path without distinguishing representations.

A plurality of path indicators is provided in FIG. 5C and may be seen as a first path indicator 512 and a second path indicator 513. As is shown, first path indicator 512 is on top of, or before, second path indicator 513 in the flight guide 511. This alerts users that the first path indicator 512 and coordinates associated therewith will be encountered prior to the second path indicator 513 and its respective coordinates.

The flight guide 511 may include one or more waypoints. A waypoint, as used herein, refers generally to coordinate in physical space. FIG. 5C provides a first waypoint 5314 and a second waypoint 515. By of example, a waypoint may be a destination airport, radio beacon, or VOR (VHF Omni-Directional Radio) stations along the flight guide, etc. The flight guide 511 may be configured so that path indicators are associated with waypoints. In embodiments, path indicators are displayed differently when approaching a waypoint. For example, when an aircraft is proximate to a waypoint (i.e., within a predetermined distance from a waypoint), the path indicators leading to the waypoint may be displayed differently to signal an approach. The path indicators may, for example, flash when the aircraft is approaching the path indicator. The path indicators may, alternatively, change colors to signal a relative distance from the aircraft, the waypoint, etc. The information necessary to integrate the flight guide, waypoints, etc., may be acquired from any aircraft system previously mentioned that typically supplies the data (e.g., GPS, charts, etc.).

Figure 5D:
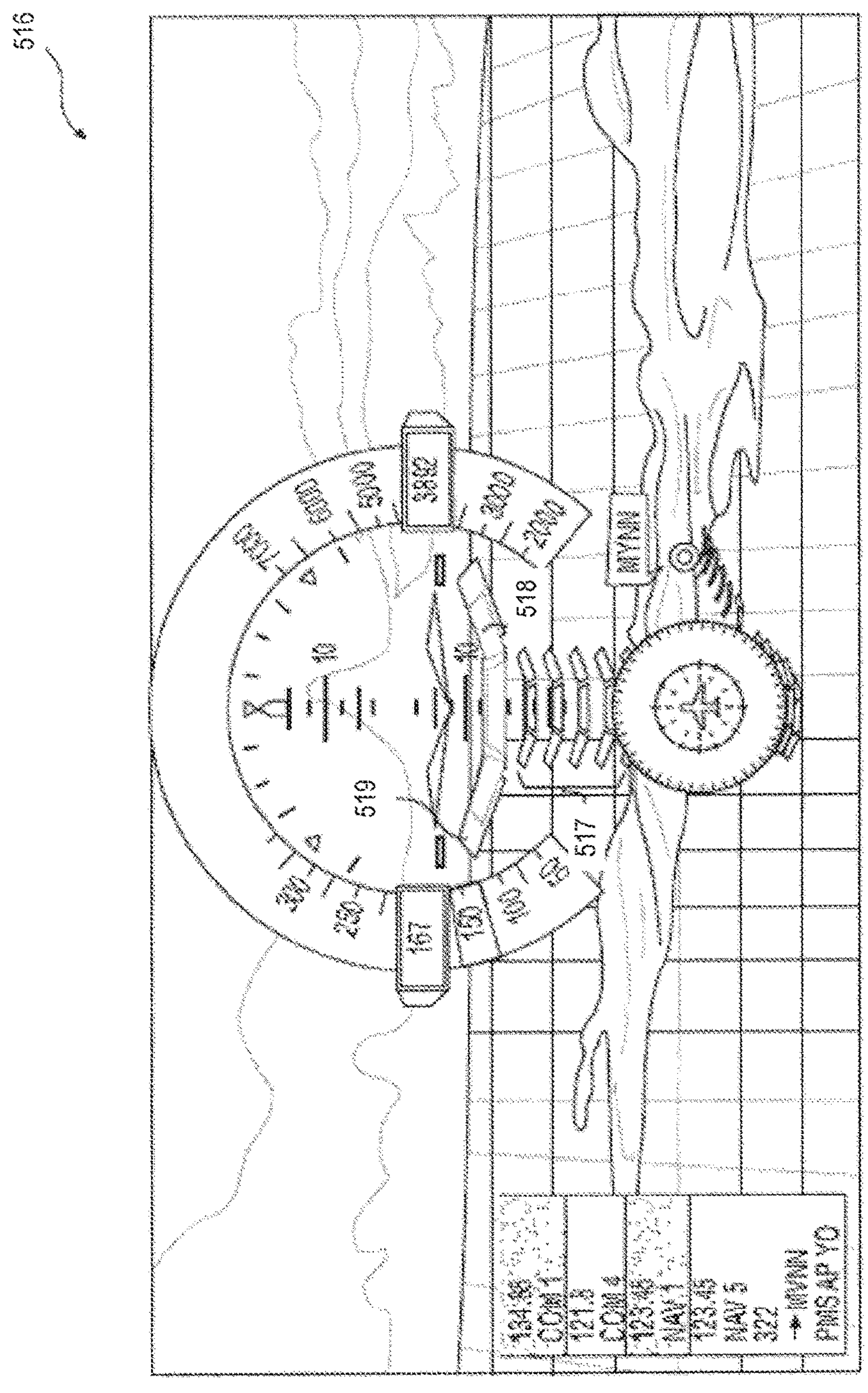
FIG. 5D depicts an exemplary graphical user interface in which a navigational aid is displayed with one or more markers, in accordance with an embodiment of the present invention.

This example is further described with respect to FIG. 5D. FIG. 5D provides an exemplary GUI 516 that is a front-view of a flight guide 517 including one or more path indicators, a first path indicator 518 and a second path indicator 519. As with FIG. 5C, the first path indicator 508 and second path indicator 519 are arranged such that the path of the aircraft is apparent to one or more users.

Figure 5E:
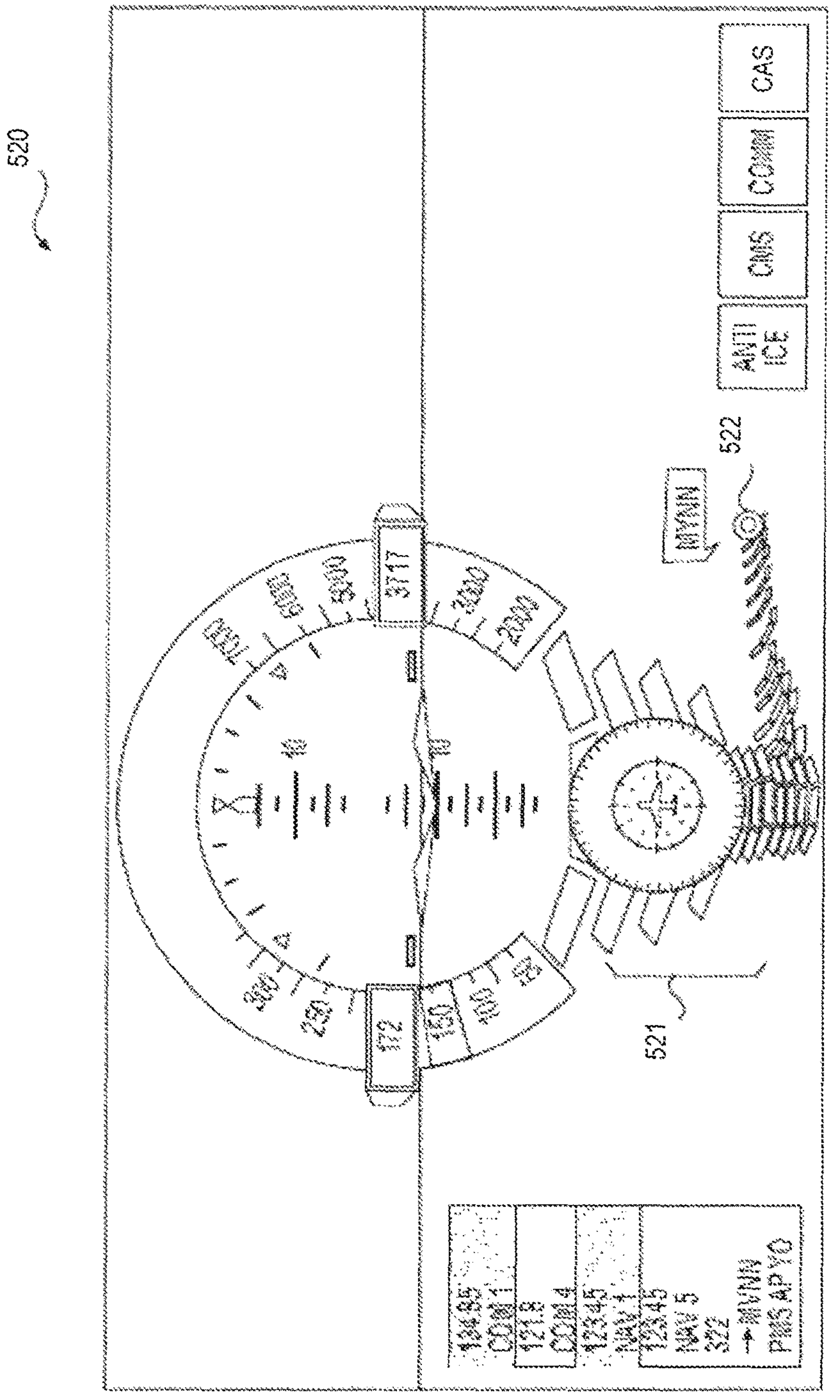
FIG. 5E depicts an exemplary graphical user interface in which a navigational aid is displayed with one or more markers, in accordance with an embodiment of the present invention.

FIG. 5E provides an exemplary GUI 520 of an exemplary descent screen. As in FIG. 5C, a flight guide 521 is provided with one or more path indicators illustrated. The concept described with reference to FIG. 5C is applicable in this example as well but is directed to a descent, specifically. As previously described, the one or more path indicators may be configured to convey information based on a distance to or from a waypoint, the aircraft, or the like. In a descent situation, the one or more path indicators proximate to the destination will indicate a descent is approaching and may be proximate to a waypoint 522 (e.g., destination airport). Similar to previous examples, this may be illustrated by displaying the path indicators differently to draw attention to them by, for example, using different colors, flashing the path indicators, etc. It is noted that the flight guides provided in FIGS. 5A-5E are overlaying a three-dimensional real-time image on the TSIP.

Figure 5F:
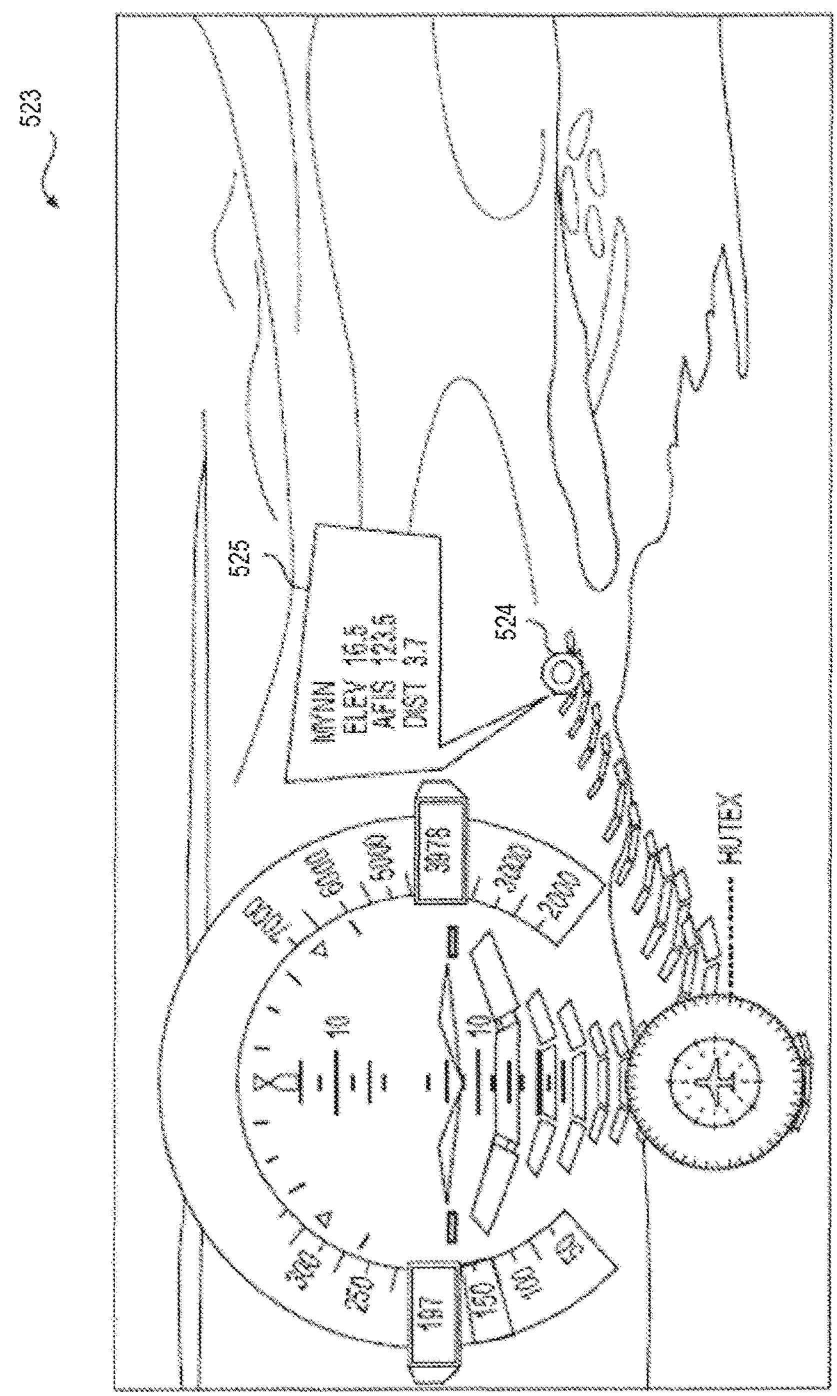
FIG. 5F depicts an exemplary graphical user interface in which detailed airport information is displayed, in accordance with an embodiment of the present invention.

One or more airports, as previously described, may be provided in a flight guide as a waypoint, a destination, an origin, or the like. When navigating, it may be useful to have access to airport information associated with said airports, whether it is the destination airport or not, for a variety of reasons. FIG. 5F provides an exemplary GUI 523 illustrating an embodiment where detailed information regarding an airport is provided. As with the previous GUI's described, FIG. 5F depicts a flight guide overlaying a real-time image. FIG. 5F provides a destination airport indicator 524 along with a user interface panel 525. The destination airport indicator 524 may be configured such that selection thereof results in the display of the user interface panel 525. A selection may be hovering over the indicator 525, touching the indicator 525 with a finger, a stylus, or any other input device, or any other method used for selection of an item on a touch-screen interface. The user interface panel 525 may include detailed information associated with the indicator 524. In this case, the destination airport indicator 810 is associated with a destination airport so information related to the particular destination is provided such as, for example, the airport code of the airport, an elevation, a distance of the destination airport from the aircraft, a frequency with which to contact the airport, and the like. Any information may be provided in the user interface panel 525 as determined by a user.

Airports may be presented within the TSIP when it is determined they are within a predetermined distance from the aircraft. The predetermined distance may be any distance desired by a user and is configurable such that it may be dynamically changed. An exemplary predetermined distance is 150 nautical miles. A current location of the aircraft may be continuously monitored such that the predetermined distance evaluated is constantly changing. For instance 150 nautical miles from the aircraft at Point A is different when the aircraft travels 5 miles east to Point B. Thus, the TSIP may be in constant communication with other aircraft systems to provide updated, real-time data including a current location of the aircraft and any updates to airport information based on changes in the aircraft's current location.

Figure 5G:
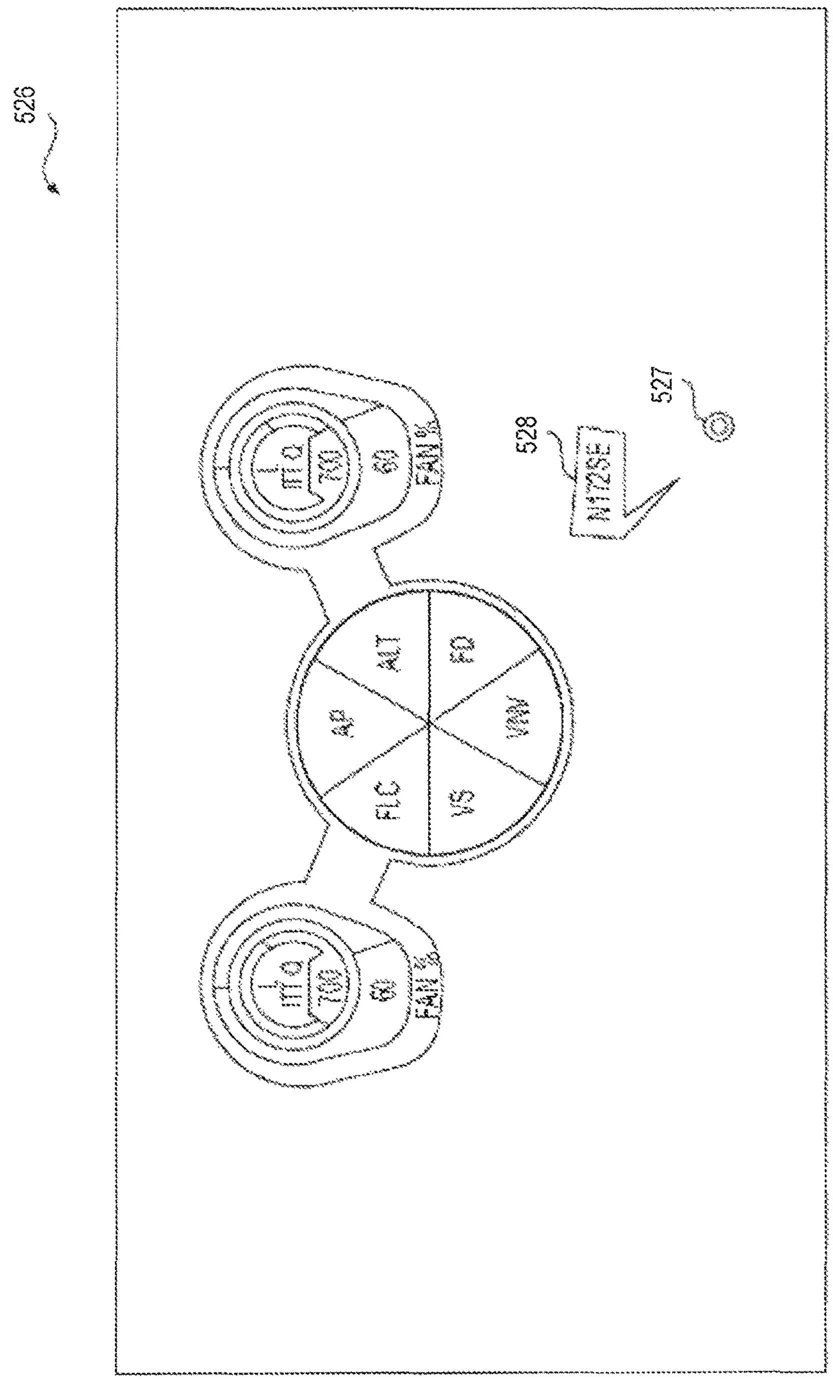
FIG. 5G depicts an exemplary graphical user interface in which traffic information is displayed, in accordance with an embodiment of the present invention.

As with airports, there may be situations where detailed information related to traffic may be needed. Traffic, as used herein, refers generally to any vehicle proximate to, or within a predetermined distance of, the aircraft. FIG. 5G provides an exemplary GUI 526 illustrating a traffic embodiment of the present invention. FIG. 5G illustrates this embodiment where traffic is indicated with a flight instrument display (similar to flight instrument display 120 of FIG. 1) but traffic could be displayed in any part of the TSIP. Here, an item of traffic is detected and represented as traffic icon 527. Traffic icon 527 may be associated with a traffic information panel 528. The traffic information panel 528 may include a tail number as a traffic identifier or any other identifying means to identify traffic associated with the traffic icon 527. In this case, a tail number of the aircraft associated with the traffic icon 527 is provided in the traffic information panel 528.

Figure 5H:
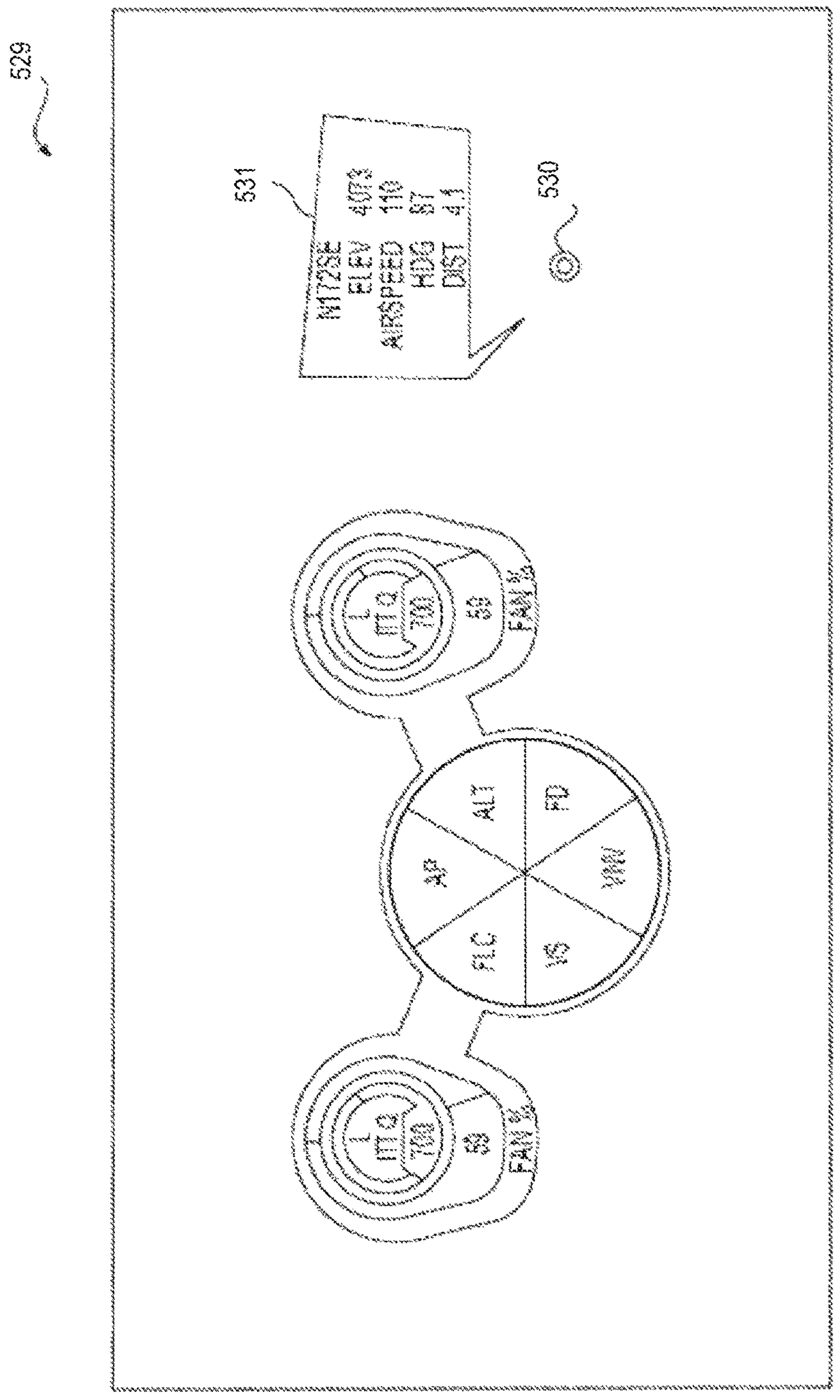
FIG. 5H depicts an exemplary graphical user interface in which detailed traffic information is displayed, in accordance with an embodiment of the present invention.

Traffic icon 527 may be configured such that selection thereof may result in a display of detailed traffic information. The detailed information may be provided in a detailed traffic panel as illustrated in FIG. 5H. FIG. 5H provides an exemplary GUI 529 illustrating a traffic icon 530 and a detailed traffic panel 531. The detailed traffic panel 531 in this case provides a tail number as a traffic identifier or other identifying means (that may have been displayed in a traffic information panel similar to traffic information panel 528 of FIG. 5G prior to selection of the traffic icon 530) as well as an elevation of the traffic associated with the traffic icon 530, a distance away from the aircraft, a speed, and the like. Information displayed may be configured by users to achieve a customized interface.

The ability to make a selection of, for example, a traffic icon or a destination airport indicator allows users to obtain a real-time detailed view via the TSIP where users may have otherwise been required to reference several sources to compile information and still would not have the compilation viewable on a touch screen interface with a single selection. Each embodiment of this application (e.g., traffic and airport details, flight guides, etc.) may be provided overlaying a real-time image.

Additionally, with each of the airport and traffic embodiments, information may have been previously displayed such as a simple identifier but detailed information including distance, elevation, speed, etc. was not previously displayed.

Furthermore, with each of the airport and traffic embodiments, a current location of the aircraft is continuously monitored and updated (via, for example, GPS) such that the airport information, traffic information, waypoint information, etc. is accurate. For example, the flight guide discussed herein is configured to indicate a proximate waypoint. A current location of an aircraft is continuously monitored and updated so that it is known when a waypoint is within a predetermined distance of the aircraft. Similarly, a current location of an aircraft should be known at all times in order to ascertain traffic that is within a predetermined distance of the current location. This real-time monitoring provides up-to-date information. Furthermore, detailed information provided (e.g., detailed airport information, detailed traffic information) may include information that requires updating based on updates to a current location of an aircraft. For instance, in FIG. 5H, a distance from the aircraft is provided as 4.1. As the aircraft moves, and as the traffic moves, this distance between the two changes and may be updated as updated locations and speeds are identified of both the aircraft and the traffic.

Traffic information may be provided to users based on distance levels. A distance level, as used herein, refers generally to distance ranges to organize data. Aircraft users (e.g., pilots, co-pilots) would like to be alerted to traffic but, in some cases, may not need an urgent alert. For example, traffic may be detected that is X distance away from aircraft, where X is a completely normal, safe distance. On the other hand, traffic may be detected that is Y distance from the aircraft, where Y is not necessarily a risk yet but is something that should be monitored or may require action. Lastly, there may situations where traffic is detected at Z distance, where Z is an emergent situation that is a risk and requires action to avoid danger. It makes sense to provide these varying levels of traffic notifications to a user in a different manner. Thus, distance levels may be utilized to organize traffic. Distance levels may be configured by a user and exemplary figures are only used herein for example purposes only. Assume that a predetermined distance from an aircraft to monitor is 100 nautical miles. A first distance level may be 50-75 nautical miles, while a second distance may be 25-50 nautical miles, and further more a third distance may be less than 25 nautical miles. Again, these distances are merely exemplary and may be configured and customized for each user's preferences. Additionally, the system may be configured to include as many distance levels as desired by users.

Thus, when traffic is detected within the first distance level, it may simply be displayed via the TSIP with some identifying information. Alternatively, traffic at other distance levels designated by a user to accompany a notification may be provided via the TSIP along with an alert. The alert may be a separate notification (e.g., a pop-up alert panel) or may be included in or with the traffic icon (e.g., an exclamation point on the traffic icon, the traffic icon appearing in an alert color (e.g., red), and the like). Additionally, the TSIP may be equipped with a master alert system that results in the TSIP (the entire TSIP) indicating an alert is present. In the example of nearby traffic, if an alert is warranted based on the distance level, the TSIP master alert system may initiate and generate an alert by, for example, making a border of the TSIP flash with an alert (e.g., the border may flash a color (red)), switch to an alert state (e.g., the border may switch to an alert color designated by a user), or the like.

Figure 5I:
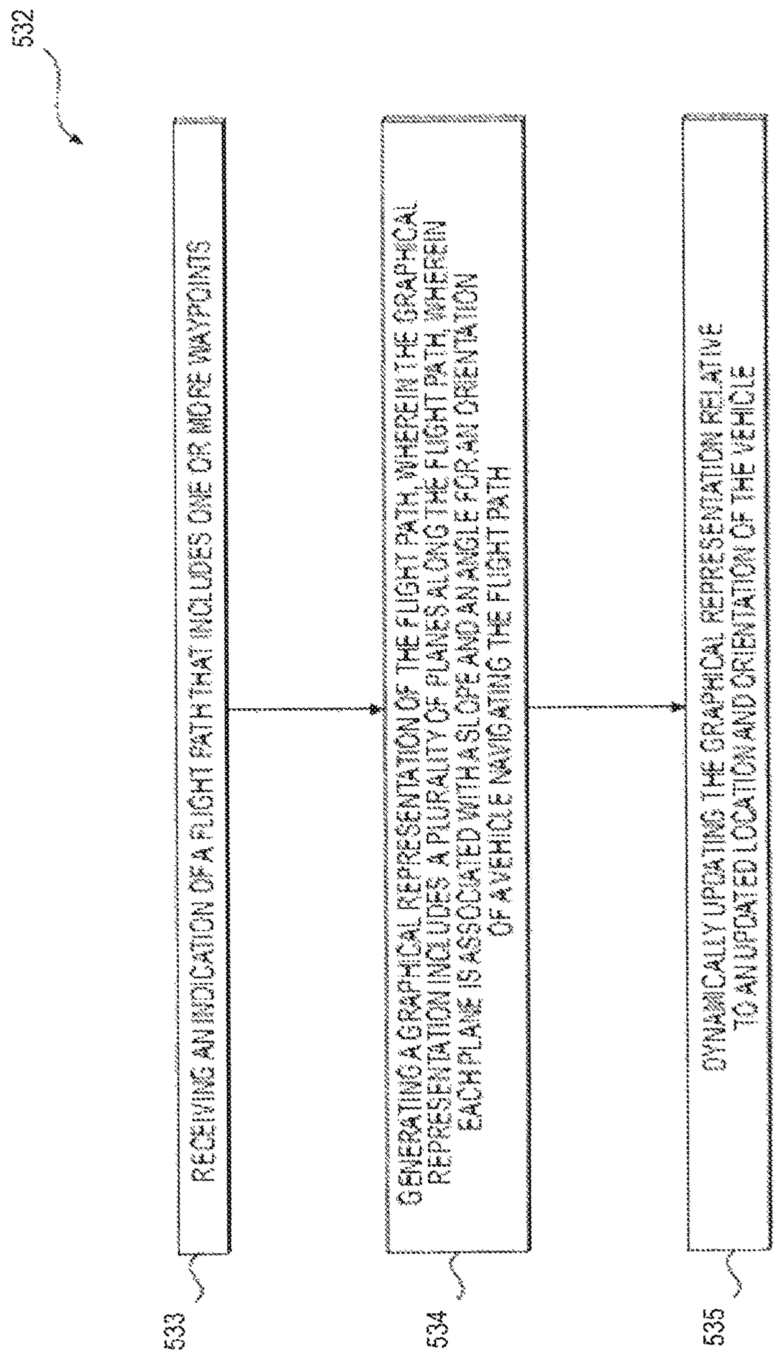
FIG. 5I is a flow diagram showing an exemplary method for providing navigational aids, in accordance with an embodiment of the present invention.

With reference to FIG. 5I, a flow diagram is provided showing an exemplary method 532 for providing navigational aids. Initially, at block 533, an indication of a flight path that includes one or more waypoints is received. A graphical representation of the flight path is generated at block 534. The graphical representation includes a plurality of planes (path indicators) along the flight path, wherein each plane is associated with a slope and an angle for an orientation of a vehicle navigating the flight path. At block 535 the graphical representation is dynamically updated relative to an updated location of the vehicle.

Figure 5J:
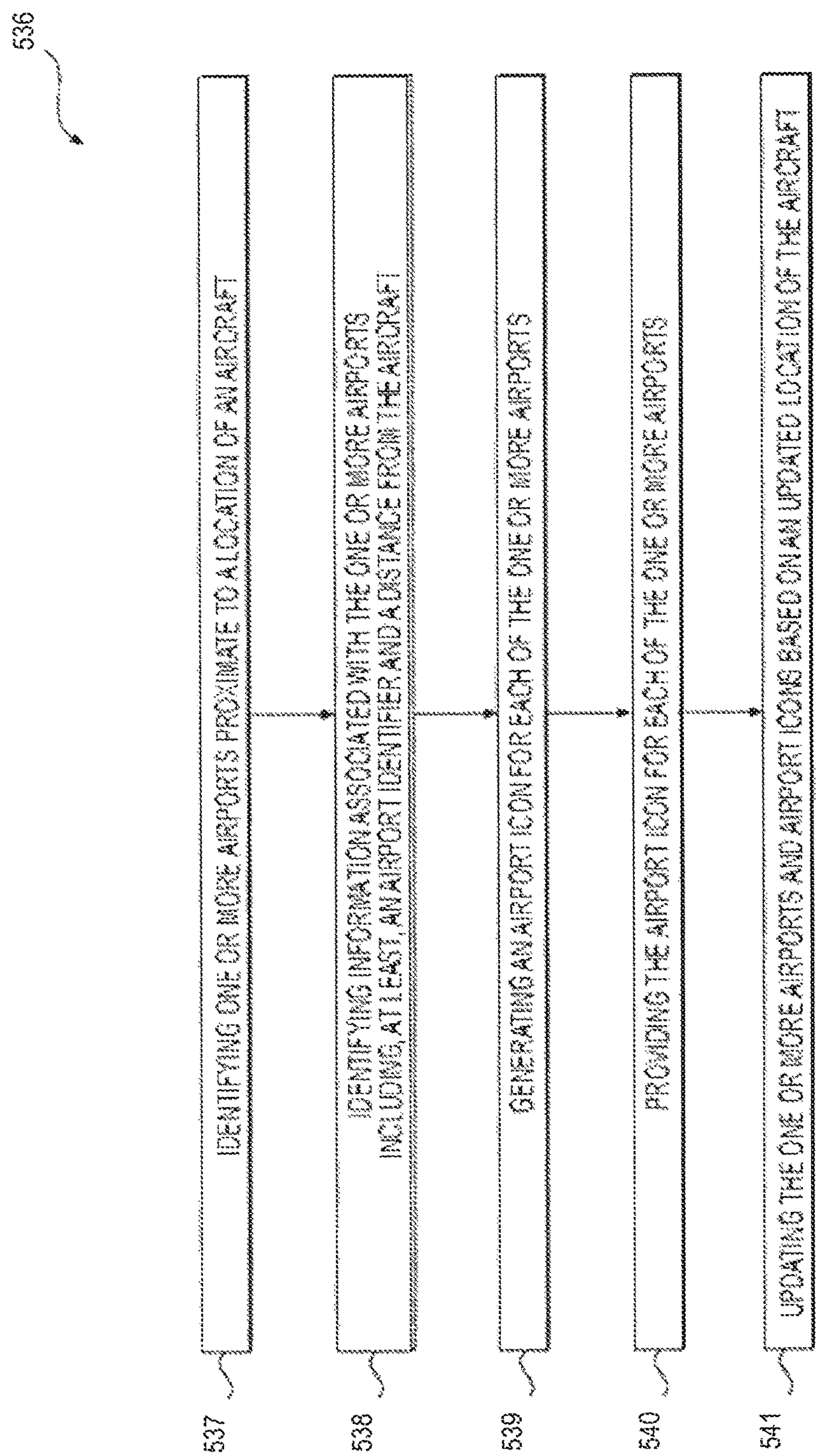
FIG. 5J is a flow diagram showing another exemplary method for providing navigational aids, in accordance with an embodiment of the present invention.

With reference to FIG. 5J, a flow diagram is provided showing another exemplary method 536 for providing navigational aids. Initially, at block 537, one or more airports proximate to a location of an aircraft is identified. Information associated with the one or more airports is identified at block 538 and includes, at least, an airport identifier and a distance from the aircraft. An airport icon is generated for each of the one or more airports at block 539 and is provided at block 540. At block 541, the one or more airports and airport icons are updated based on an updated location of the aircraft.

Figure 5K:
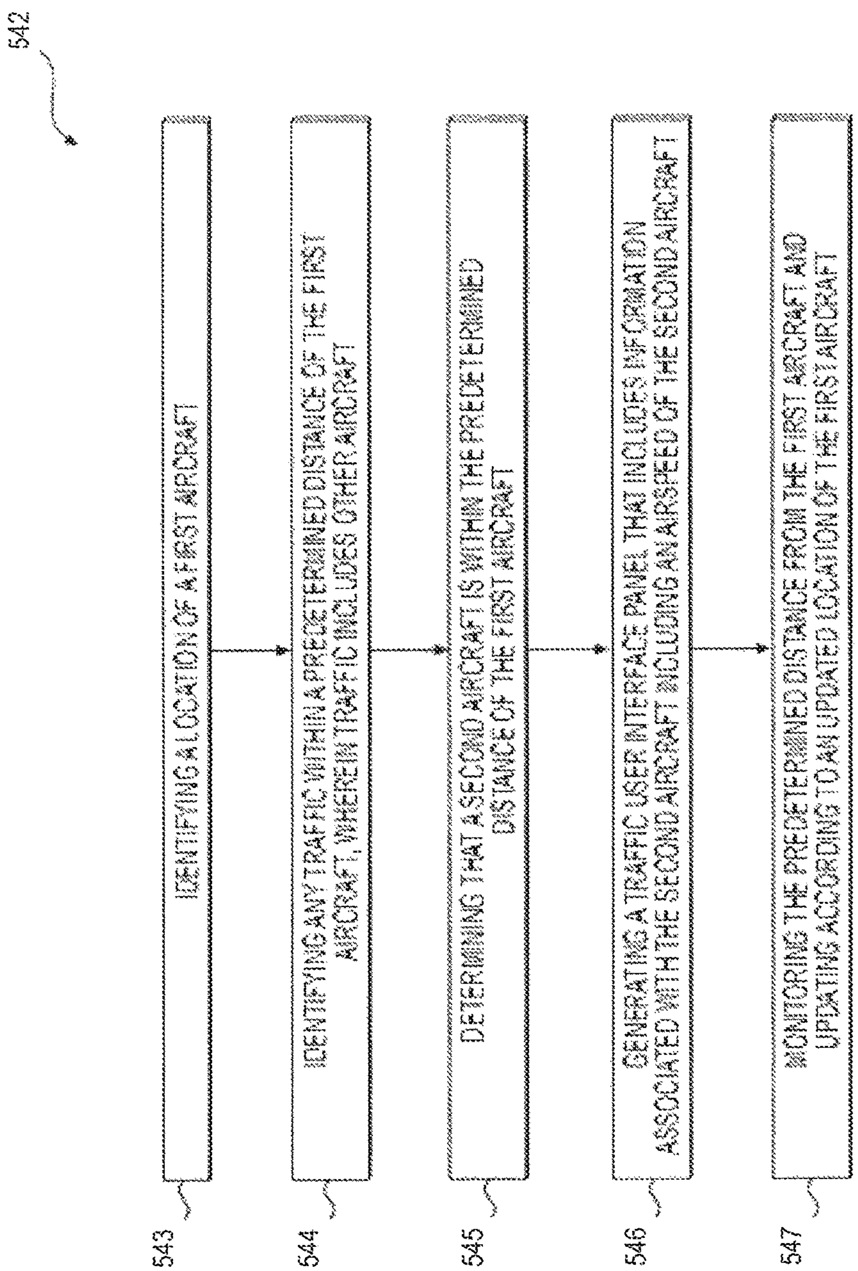
FIG. 5K is a flow diagram showing another exemplary method for providing navigational aids, in accordance with an embodiment of the present invention.

With reference to FIG. 5K, a flow diagram is provided showing yet another exemplary method 542 for providing navigational aids. Initially, at block 543, a location of a first aircraft is identified. At block 544, any traffic within a predetermined distance of the first aircraft is identified, wherein traffic includes other aircraft. It is then determined that a second aircraft is within the predetermined distance of the first aircraft at block 545. A traffic user interface panel that includes information associated with the second aircraft including airspeed of the second aircraft is generated at block 546. The predetermine distance from the first aircraft is monitored and updated according to an updated location of the first aircraft at block 547.

Additional embodiments of the present invention are directed to providing a synthetic vision display in combination with the TSIP. SVS have been used in aircraft for quite some time to improve situational awareness. However, the synthetic vision enhancements were either applied entirely or not at all. SVS are not currently available in a gradient-type application. In other words, synthetic vision enhancements have not been applied to a real-time image to achieve an image that is a combination of a real-time image and a synthetic vision enhancement. For example, rather than turning the SVS on and viewing a 100% synthetic image, a user could, utilizing the present invention, indicate that a synthetic vision enhancement should be applied according to a synthetic vision application value. A synthetic vision application value, as used herein, refers generally to a numerical value with which to apply a synthetic vision enhancement. In embodiments, the synthetic vision application value is a percentage value. In additional embodiments, the synthetic vision application value is a percentage value less than 100% to achieve a combination of a synthetically enhanced image and the real-time original image.

Figure 6A:
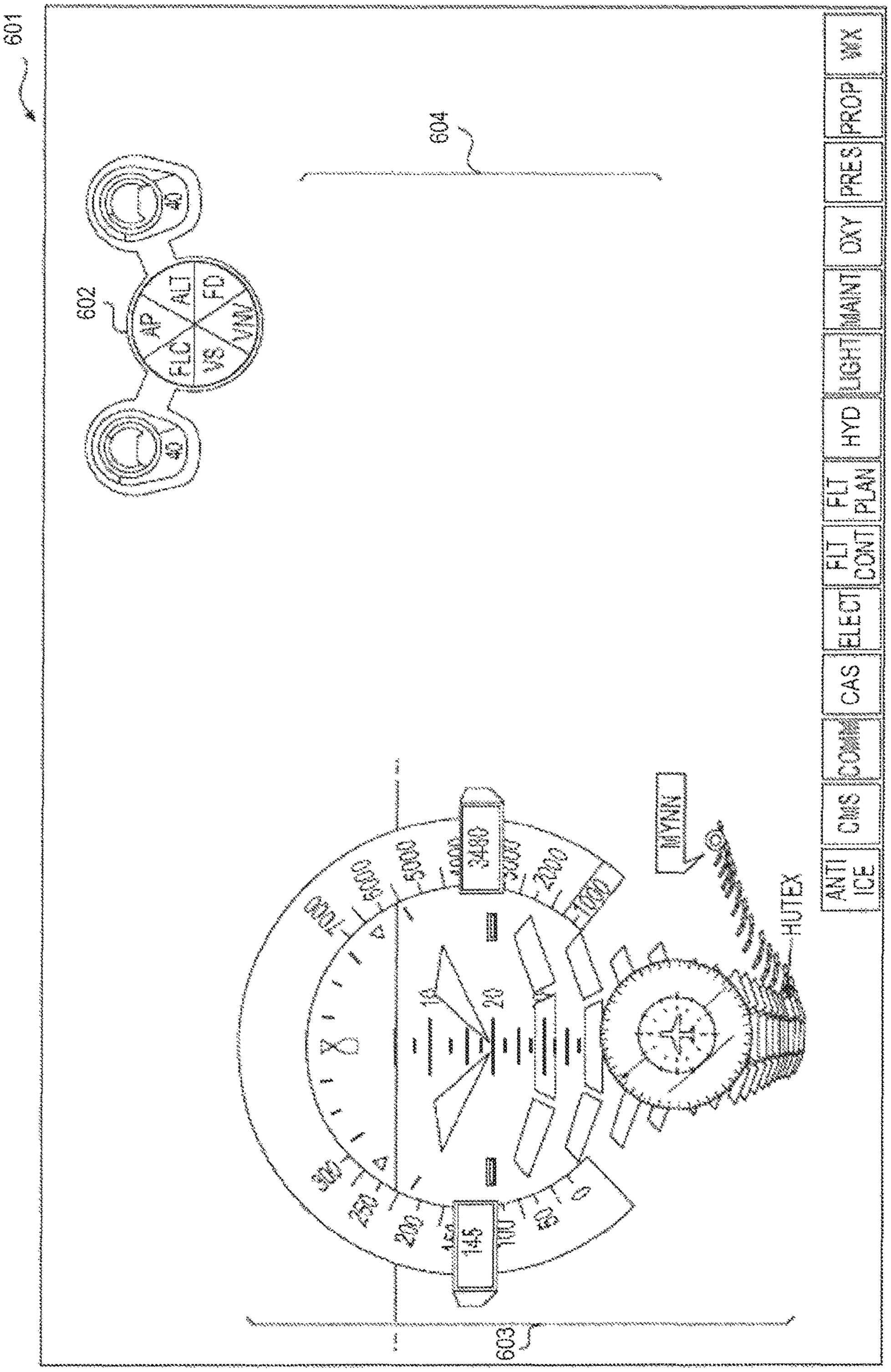
FIG. 6A depicts an exemplary graphical user interface in which a real-time view is displayed, in accordance with an embodiment of the present invention.

In application, a real-time image is captured by, for example, the camera 290 of FIG. 2, and displayed via the TSIP 210. The real-time, unenhanced, image may be referred to as an original image herein. FIG. 6A illustrates an exemplary graphical user interface (GUI) 601 in which a real-time image is displayed. The GUI includes, as previously identified, one or more flight instrument displays 602, one or more navigational displays 603 and the underlying real-time image 604. As is shown in FIG. 6A, the real-time image 604 does not include much detail as visibility is low in this example. Thus, one could imagine the view of the real-time image 604 as it is displayed is merely fog, clouds, etc.

The original image may be modified to include synthetic vision enhancements upon receiving an indication to apply a synthetic vision application or enhancement to the original image. The indication may be a user selection from a menu of the TSIP or any other means available to activate or apply a synthetic vision enhancement.

Once indicated, a synthetic vision application value is identified and applied to an original image. The synthetic vision application value may be user input. Alternatively, a default value may be set in the system to be automatically applied such as, for example, 50%. Any desired value may be set as the default value.

Figure 6B:
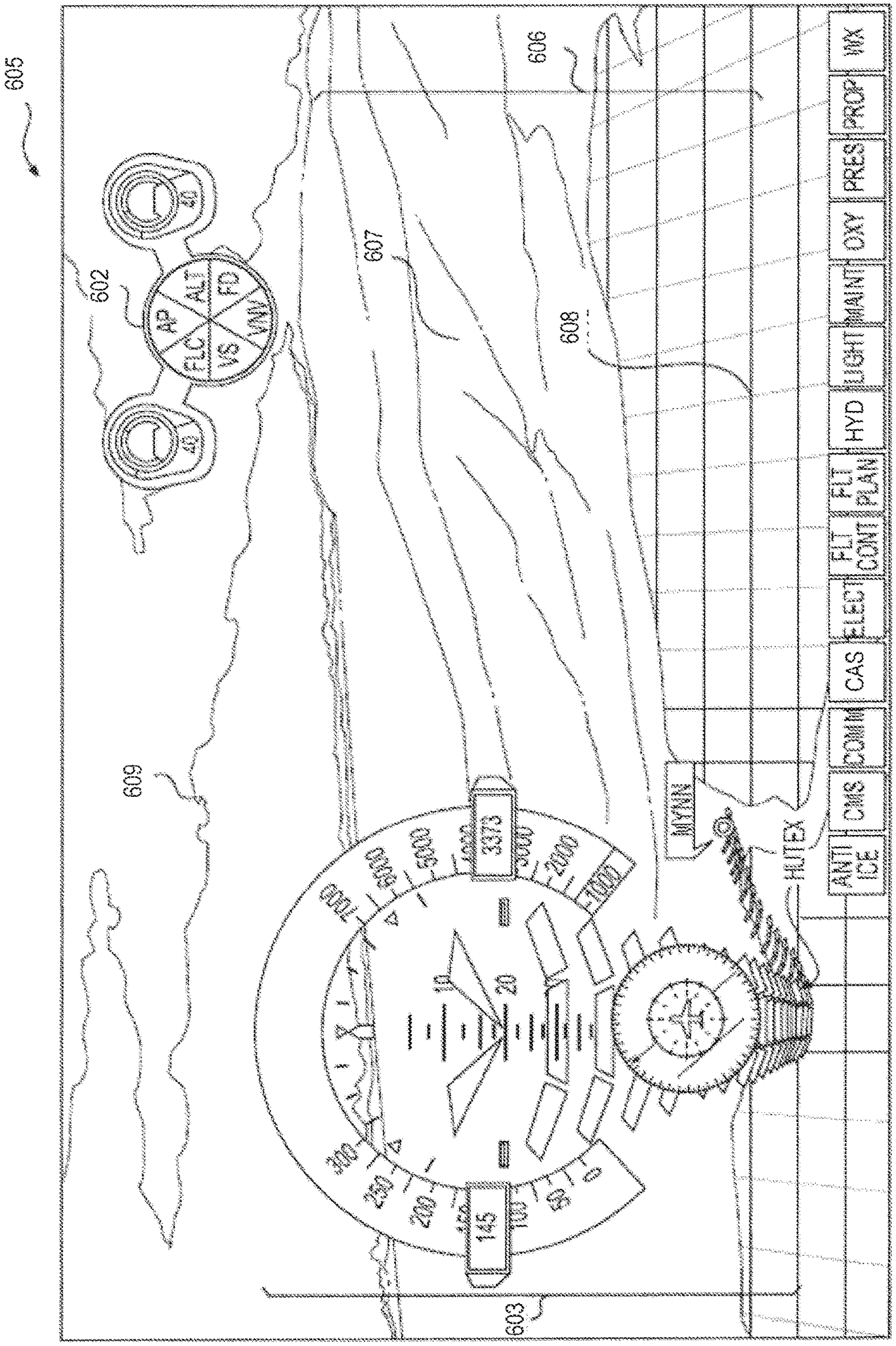
FIG. 6B depicts an exemplary graphical user interface in which a modified view including both the real-time view with an overlaying synthetic vision enhancement is displayed, in accordance with an embodiment of the present invention.

The indicated synthetic vision enhancement may be overlaid on the original image to generate a modified image. FIG. 6B illustrates an exemplary GUI 605 in which an original image is modified, or overlaid, with a synthetic vision enhancement according to a synthetic vision application value. FIG. 6B includes a modified image including a synthetic vision enhancement at a 50% application value. As is clear in FIG. 6B, the GUI 605 includes a view area 606 that is much clearer and more detailed than that in FIG. 6A. Note that the images in FIG. 6A and FIG. 6B are identical and are only different in the amount of synthetic vision applied to illustrate the clarity achieved with the gradient functionality of the synthetic vision application of the present invention. FIG. 6B clearly identifies various parts of a landscape including terrain 607, water 608, and clouds 609. The markers identified in FIG. 6B (i.e., terrain, water, clouds) are merely exemplary in nature and any identifying markers could be included in a view.

Figure 6C:
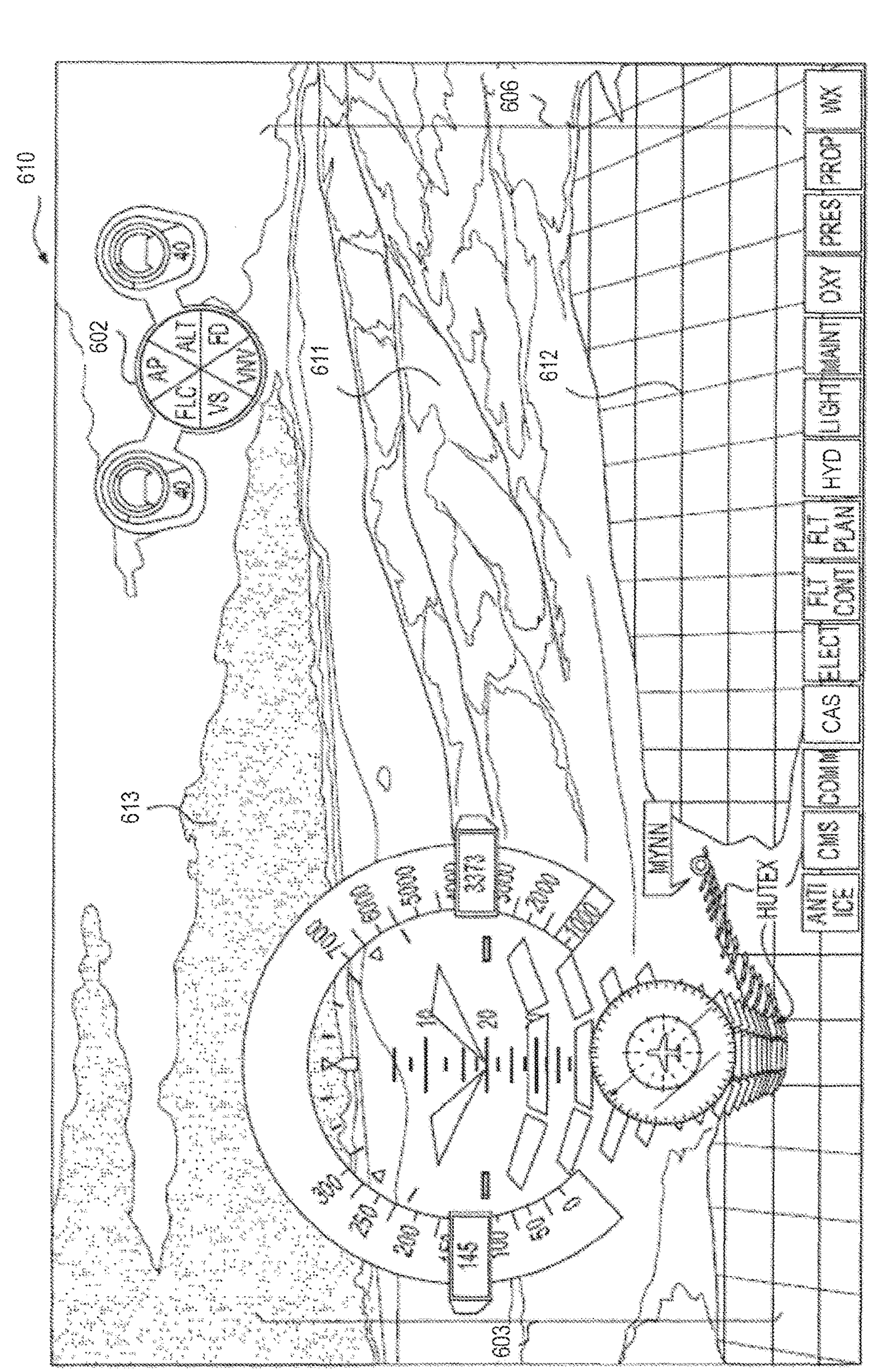
FIG. 6C depicts an exemplary graphical user interface in which a modified view including both the real-time view with an overlaying synthetic vision enhancement is displayed, in accordance with an embodiment of the present invention.

FIG. 6C goes on to include a detailed GUI 610 in which the original image is modified, or overlaid, with a synthetic vision enhancement according to a synthetic vision application value. FIG. 6C includes a modified image including a synthetic vision enhancement at a 90% application value. The application values illustrated in FIGS. 6A, 6B, and 6C are merely exemplary in nature and any value from 0-100% is possible. Ideally, a value less than 100% is utilized to achieve an image combining both a synthetic, digitally created view with a real-time, original view. Also, as with FIG. 6B, the image of FIG. 6C is identical to that of FIG. 6A, it is merely illustrating the original image of FIG. 6A overlaid with a synthetic enhancement. As is shown in FIG. 6C, the view area 606 includes the landscape shown in FIG. 6B, but with a higher degree of clarity. For instance, more details are visible in terrain 611 and clouds 613. Also present is water 612.

The gradient-type feature of the synthetic vision application provides users the ability to dynamically adjust images. This improves situational awareness by allowing users more power in controlling the image. For example, on a foggy/cloudy day, a user may need more synthetic vision to "see" through the weather but as the fog/clouds lift, the user could reduce the amount of synthetic vision enhancements to bring in real images to better identify landmarks (e.g., roads, rivers, houses, etc.) that the synthetic vision would not show.

Figure 6D:
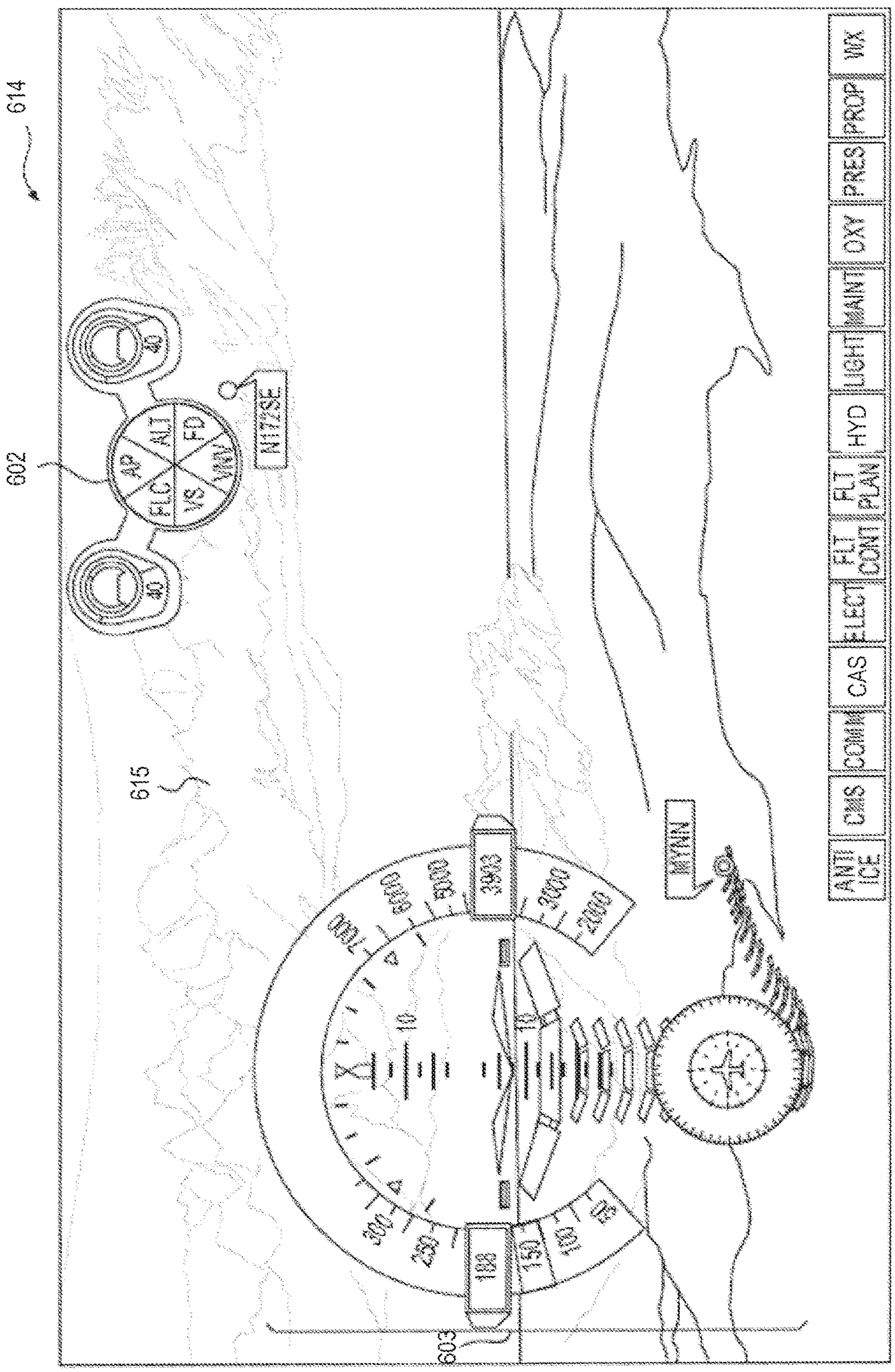
FIG. 6D depicts an exemplary graphical user interface in which a synthetic vision view and three-dimensional weather representations are displayed, in accordance with an embodiment of the present invention.

The TSIP 210 may be further configured to display data in a three-dimensional view. Weather, for instance, may be displayed in a three-dimensional view in combination with the original image. Alternatively, data (e.g., weather) may be displayed in a three-dimensional view in combination with a modified image including the original image and a synthetic vision enhancement. This embodiment is illustrated in FIG. 6D where a GUI 614 is provided that illustrates a modified view with a synthetic vision enhancement (note distinction in the view from FIG. 6A) and also including a three-dimensional weather representation 615. Previously, this combination presentation was not achieved since SVS data was typically presented on such a small display and overlaying any information could render the synthetic vision image useless (e.g., too much information in the small screen could overload or confuse the user). In the present invention, the TSIP 110 provides such an expansive view that many data points can be overlaid, including weather and synthetic vision, without overloading or confusing an image or a user. Furthermore, the ability to control the synthetic vision application value allows users to scale back the synthetic vision application when appropriate so that other items such as weather, for instance, may be highlighted when necessary.

Figure 6E:
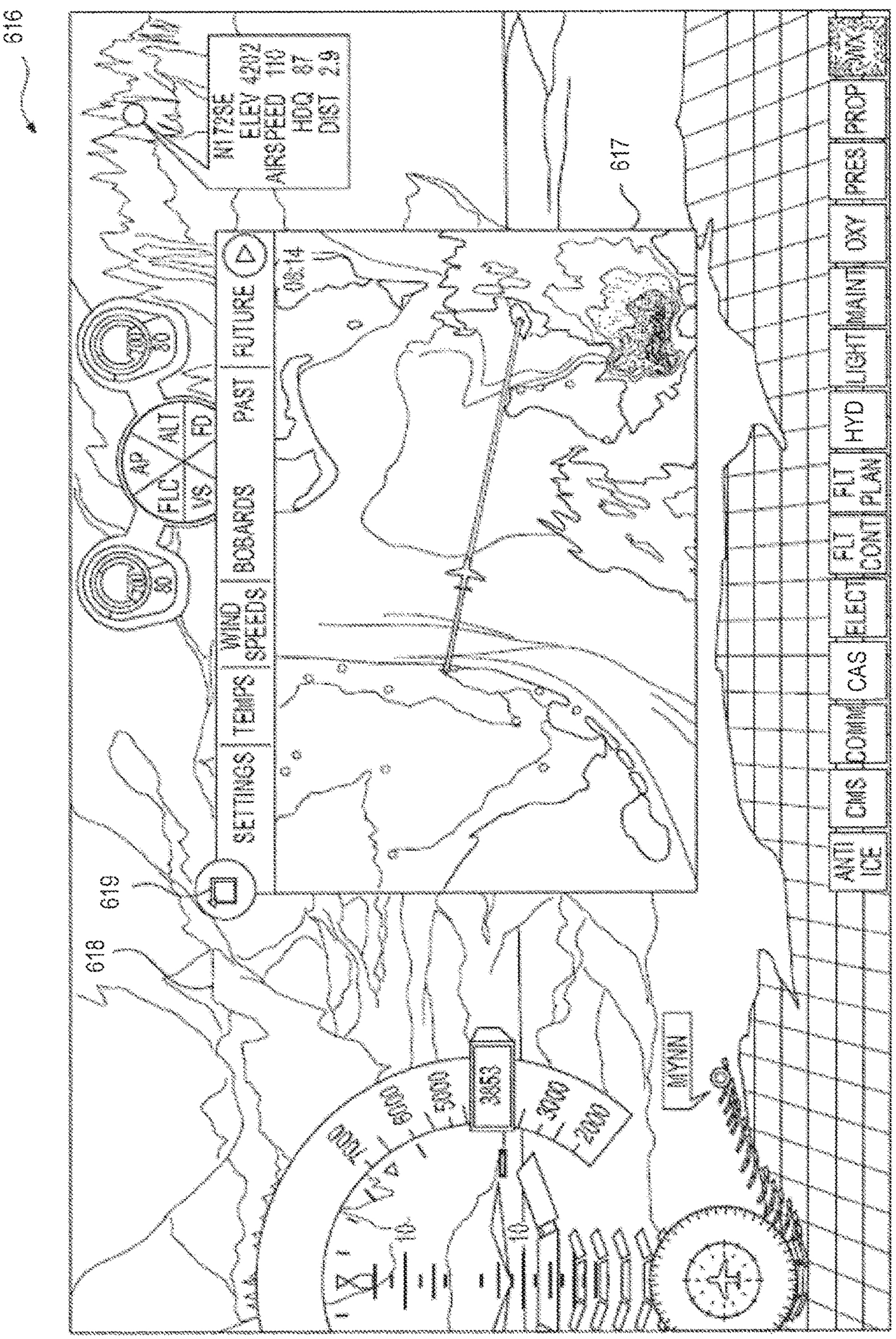
FIG. 6E depicts an exemplary graphical user interface in which a two-dimensional weather user interface panel overlays the three-dimensional weather representations, in accordance with an embodiment of the present invention.

Furthermore, two-dimensional user interface panels may be provided at any view of the TSIP. For instance, user interface panels may be provided over an original image, a modified image including an original image and a synthetic vision enhancement, or a modified image including an original image, a synthetic vision enhancement, and a three-dimensional representation. FIG. 6E provides a GUI 616 illustrating an embodiment where a two-dimensional user interface panel 617 is provided over a modified image (e.g., an original image overlaid with a synthetic vision enhancement) including a three-dimensional representation 618 (e.g., weather). In the illustration of FIG. 6E, the three-dimensional representation 618 is weather. Additionally, the two-dimensional user interface panel 617 is a weather user interface panel but could be any other panel configured by the system. The two-dimensional user interface panel 617 may be moved to any portion of the TSIP 210 or may be closed by selection of indicator 619. Additionally, the user interface panel 617 may be pinned to the TSIP such that is may be manipulated with user gestures within the user interface panel 617. For instance, the user interface panel 617 itself may be pinned to the TSIP such that the user interface panel 617 is stationary. Then a user could manipulate the user interface panel 617 via one or more gestures such as, for example, scrolling within the user interface panel 617, zooming in or zooming out the user interface panel 617 view via gestures, and the like.

In application, a second modified image may be generated upon receiving an indication that weather information (whether two or three-dimensional) is to be included in an image. The second modified image may be a modified image that includes the original image and a synthetic vision enhancement combined with weather information. Alternatively, weather information may be overlaid with an original image. For instance, an original image could be modified to include three-dimensional weather representations without the addition of any synthetic vision enhancements.

While various data points (e.g., synthetic vision enhancements, weather, etc.) may overlay an original image (i.e., view) the data can, at any time, be removed from the view.

Figure 6F:
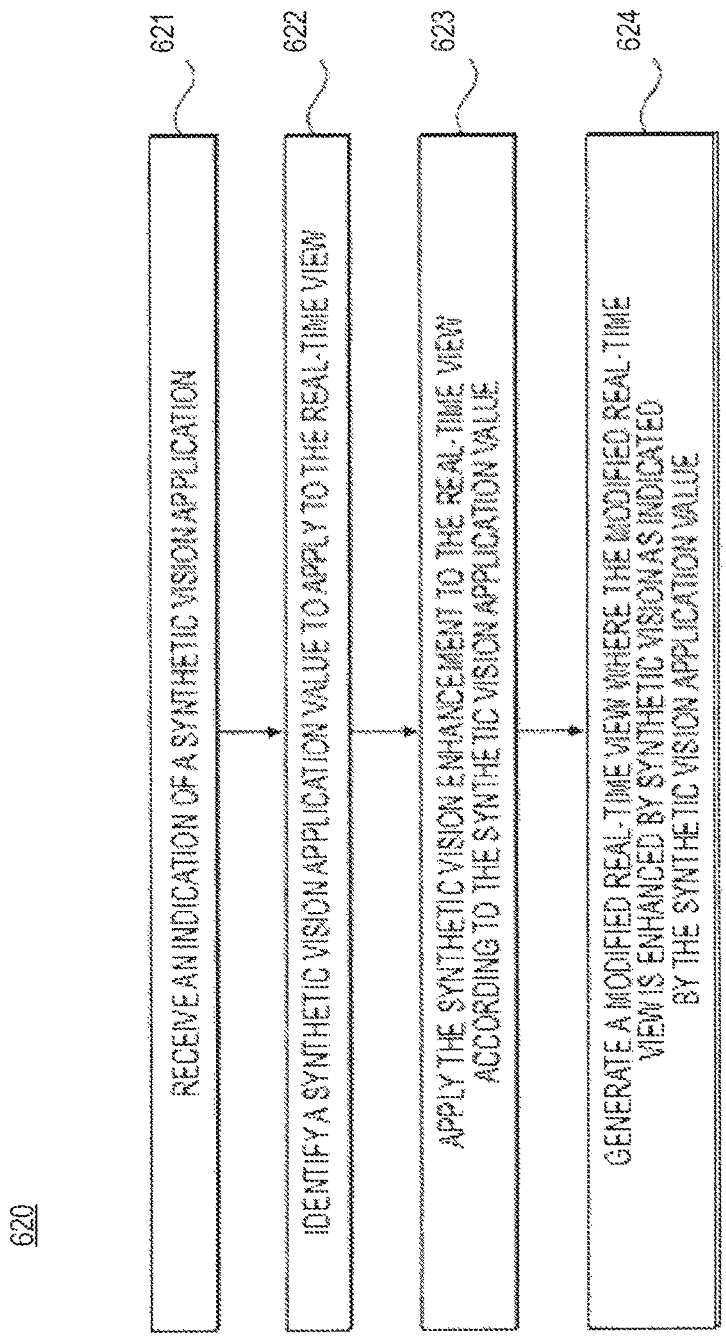
FIG. 6F is a flow diagram showing an exemplary method for displaying a real-time view within an aircraft, in accordance with an embodiment of the present invention.

With reference now to FIG. 6F, a flow diagram is illustrated showing an exemplary method 620 for displaying a real-time view in an aircraft, in accordance with an embodiment of the present invention. As indicated at block 621, an indication of a synthetic vision application is received. The indication may enable the synthetic vision application for the real-time view. At block 622, a synthetic vision application value to apply to the real-time view is identified. A synthetic vision enhancement is applied to the real-time view according to the synthetic vision application value at block 623. A modified real-time view is generated where the modified real-time view is enhanced by synthetic vision as indicated by the synthetic vision application value at block 624.

Figure 6G:
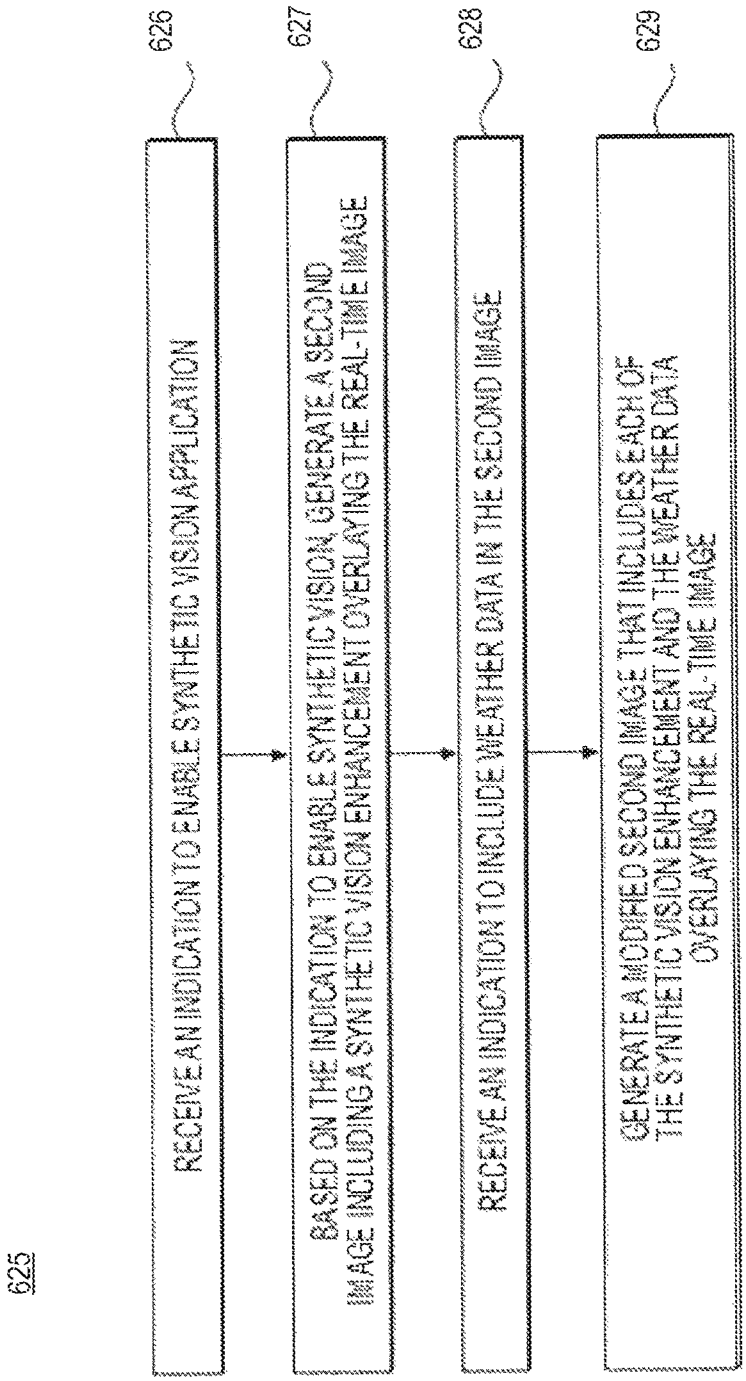
FIG. 6G is a flow diagram showing another exemplary method for displaying a real-time view within an aircraft, in accordance with an embodiment of the present invention.

With reference to FIG. 6G, a flow diagram is provided showing yet another exemplary method 625 for displaying a real-time view within an aircraft. Initially, at block 626, an indication to enable synthetic vision is received. Based on the indication to enable synthetic vision, a second image including a synthetic vision enhancement is generated and the second image overlays the real-time image at block 627. At block 628, an indication to include weather data in the second image is received. A modified second image that includes each of the synthetic vision enhancement and the weather data is generated and the modified second image overlays the real-time image at block 629.

FIGS. 7A through 7D depict exemplary aircraft flight-control systems for displaying aircraft surfaces and receiving selections to control aircraft surfaces via TSIP 210. FIGS. 7A through 7D illustrate an exemplary user interface that may be displayed over the real-time image provided by TSIP 210.

Figure 7A:
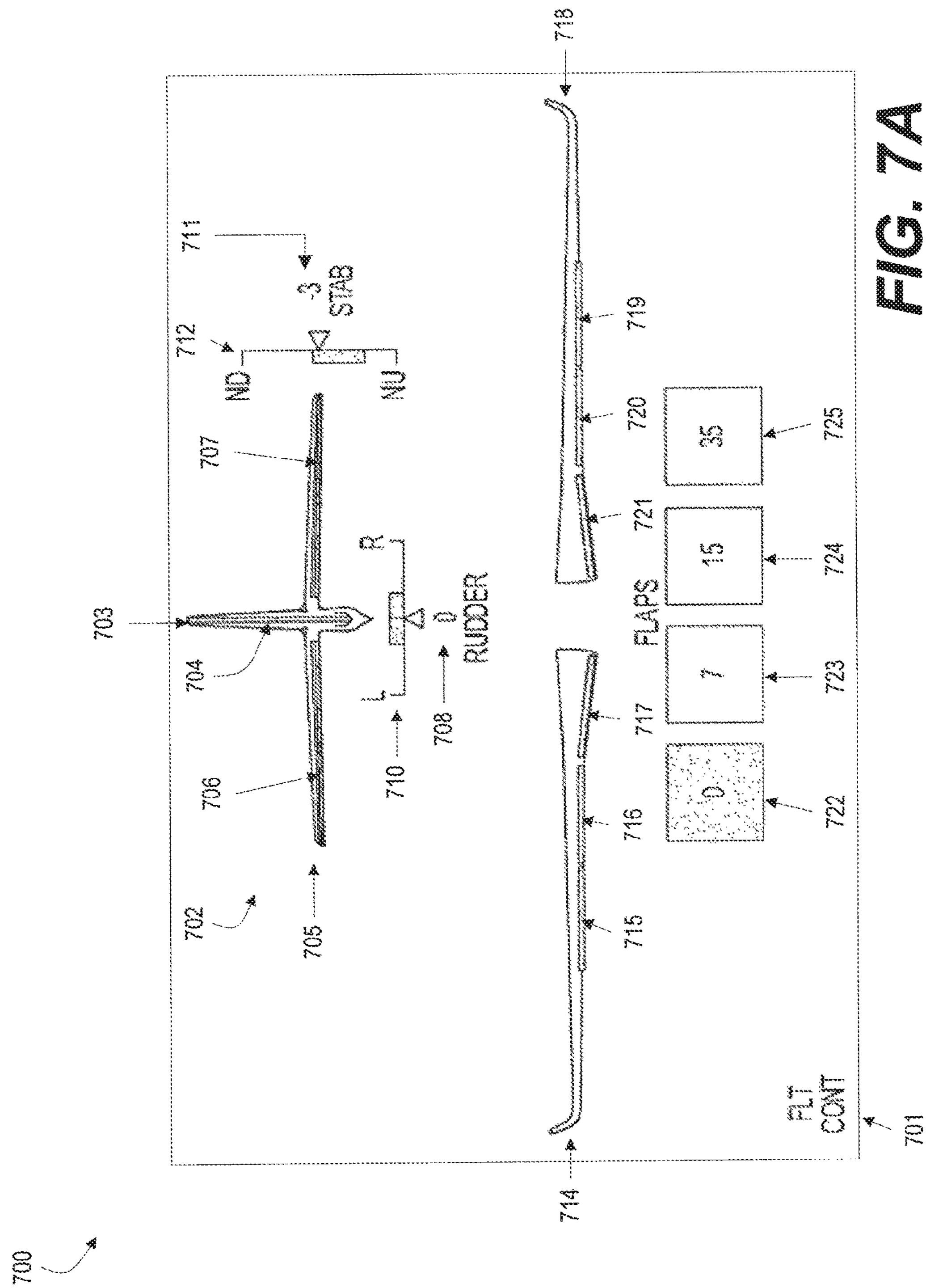
FIG. 7A depicts an aircraft flight-control system for displaying and controlling aircraft surfaces via a touch-screen instrument panel, in accordance with an embodiment of the present invention.

FIG. 7A depicts an exemplary aircraft flight-control system 700, which includes an abbreviated title (FLT CONT) 701, and is configured to continuously display numerically and graphically the instantaneous positions of the aircraft's flight-control surfaces via flight-control surface representations. A menu option displayed on TSIP 210, such as FLT CONT menu option 737 of FIG. 7E, for example, may be used to select aircraft flight-control system 700.

FIG. 7A depicts flight-control surface representations with silhouette images to represent large flight surfaces. For example, a tail image 702 depicts a silhouette of the aircraft tail with a perspective view from the rear of the aircraft. Tail image 702 may display large flight surfaces including a vertical stabilizer image 703 and a horizontal stabilizer image 705. Smaller flight-control surface representations may be overlaid on the silhouetted images. For example, vertical stabilizer image 703 includes an overlaid representation of a smaller flight-control surface, namely a rudder display 704. Similarly, horizontal stabilizer image 705 may include overlaid representations of smaller flight-control surfaces, such as a left elevator display 706 and a right elevator display 707.

FIG. 7A also includes a left wing image 714 and a right wing image 718, which depict a silhouette of each wing with a perspective view from the rear of the aircraft. Left wing image 714 may include representations of smaller flight-control surfaces, including but not limited to, flaps, ailerons, speed brakes, and slats. Aileron and speed brake graphical indicators are both shown in figures FIGS. 7C and 7D. Slats are located on the leading edge of the wing and thus are not shown in the perspective view from the rear provided by FIG. 7A. Slats are typically deployed automatically with flaps but may be controlled independently within an embodiment of aircraft flight-control system 700. Left wing image 714 includes a left-wing outboard flap display 715, a left-wing middle flap display 716, and a left-wing inboard flap display 717. Similarly, right wing image 718 includes a right-wing outboard flap display 719, a right-wing middle flap display 720, and a right-wing inboard flap display 721. In FIG. 7A, flap displays 715, 716, 717, 719, 720, 721 are configured to indicate that all flaps are located in a fully retracted position.

In addition to aircraft flight-control surface representations, aircraft flight-control system 700 continuously monitors aircraft data busses to determine positions and intended movement of the flight-control surfaces and illustrates instantaneous positions of flight-control surfaces with position indicators via TSIP 210. The aircraft's data busses continuously receive data from sensors configured to determine actual positions of flight-control surfaces. Position indicators may include graphical and numerical indicators. An exemplary graphical indicator is a rudder graphical indicator 710, which indicates the aircraft's rudder position to the left or right of the aircraft's vertical stabilizer. Specifically, FIG. 7A shows an equally balanced rudder graphical indicator 710 to indicate a straight (i.e., unturned) rudder position with respect to the aircraft's vertical stabilizer. Similarly, a horizontal stabilizer graphical indicator 712 may indicate nose-up or nose-down positions of the aircraft's horizontal stabilizer with respect to a nominal position. FIG. 7A shows horizontal stabilizer graphical indicator 712 indicating a nose-up position of the aircraft's horizontal stabilizer. Typically aircraft left and right elevators move simultaneously with each other and independently of the horizontal stabilizer. Accordingly, left and right elevator displays 706, 707 may represent left and right elevator positions simultaneously with each other and independently of horizontal stabilizer image 705.

Many aircraft flight-control surfaces, including rudders, horizontal stabilizers and elevators, typically receive input for control from a control stick and/or rudder pedals. Aircraft flight-control system 700 is configured to continuously display instantaneous positions regardless of how the flight-control surfaces are controlled. In an embodiment, aircraft flight-control system 700 is configured to receive inputs via TSIP 210 to control aircraft flight-control surfaces including rudders, horizontal stabilizers and elevators.

Figure 7B:
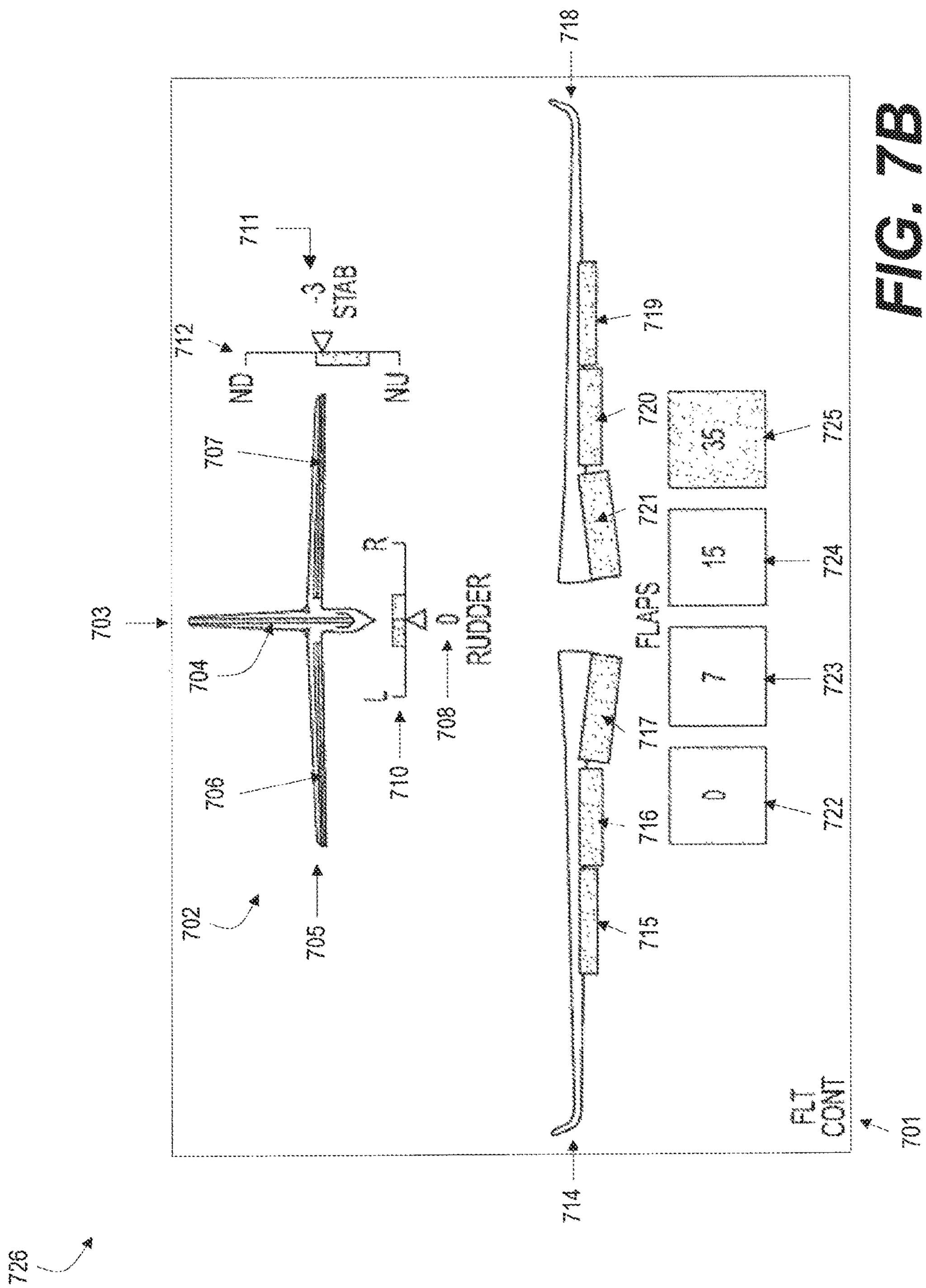
FIG. 7B depicts an aircraft flight-control system for displaying and controlling aircraft surfaces via a touch-screen instrument panel, in accordance with an embodiment of the present invention.

FIG. 7B depicts an exemplary aircraft flight-control system 726 for displaying aircraft surfaces and receiving selections to control aircraft surfaces via TSIP 210. Aircraft flight-control system 726 is an example of aircraft flight-control system 700 of FIG. 7A. Graphical displays may be integrated within silhouette images. For example, graphical displays for flap positions are overlaid on wing images. Specifically, FIG. 7B shows left wing image 714 and right wing image 715 with flap displays 715, 716, 717, 719, 720, 721 indicating fully deployed flap positions, whereas FIG. 7A shows flap displays 715, 716, 717, 719, 720, 721 for fully retracted flap positions. Note that the flap displays shown in FIG. 7B are larger than the flaps displays shown in FIG. 7A to provide a size perspective and an intuitive representation of flap deployment that may be quickly observed. In an embodiment, flap displays for intermediate flap angles (e.g., seven and fifteen degrees) are correspondingly sized to represent intermediate flap angles. In other words, a view of left wing image 714 and right wing image 718 mimics an actual view of the aircraft's flaps from behind the aircraft.

In addition to graphical indicators, aircraft flight-control system 700 includes numerical indicators to continuously display instantaneous positions of flight-control surfaces. For example, a rudder numerical indicator 708 displays a numeric position in degrees with respect to the aircraft's vertical stabilizer. Specifically, FIGS. 7A through 7D show a zero degree position of rudder numerical indicator 708, indicating that the rudder is straight (i.e., unturned) behind the aircraft's vertical stabilizer. Similarly, a horizontal stabilizer numerical indicator 711 may display a position in degrees from a nominal level position. Specifically, FIGS. 7A through 7D show a minus three degree position of horizontal stabilizer numerical indicator 711 to indicate the aircraft's horizontal stabilizer position is three degrees below nominal. In an embodiment, aircraft flight-control system 700 includes numerical indicators for left and right elevators 706, 707.

Figure 7C:
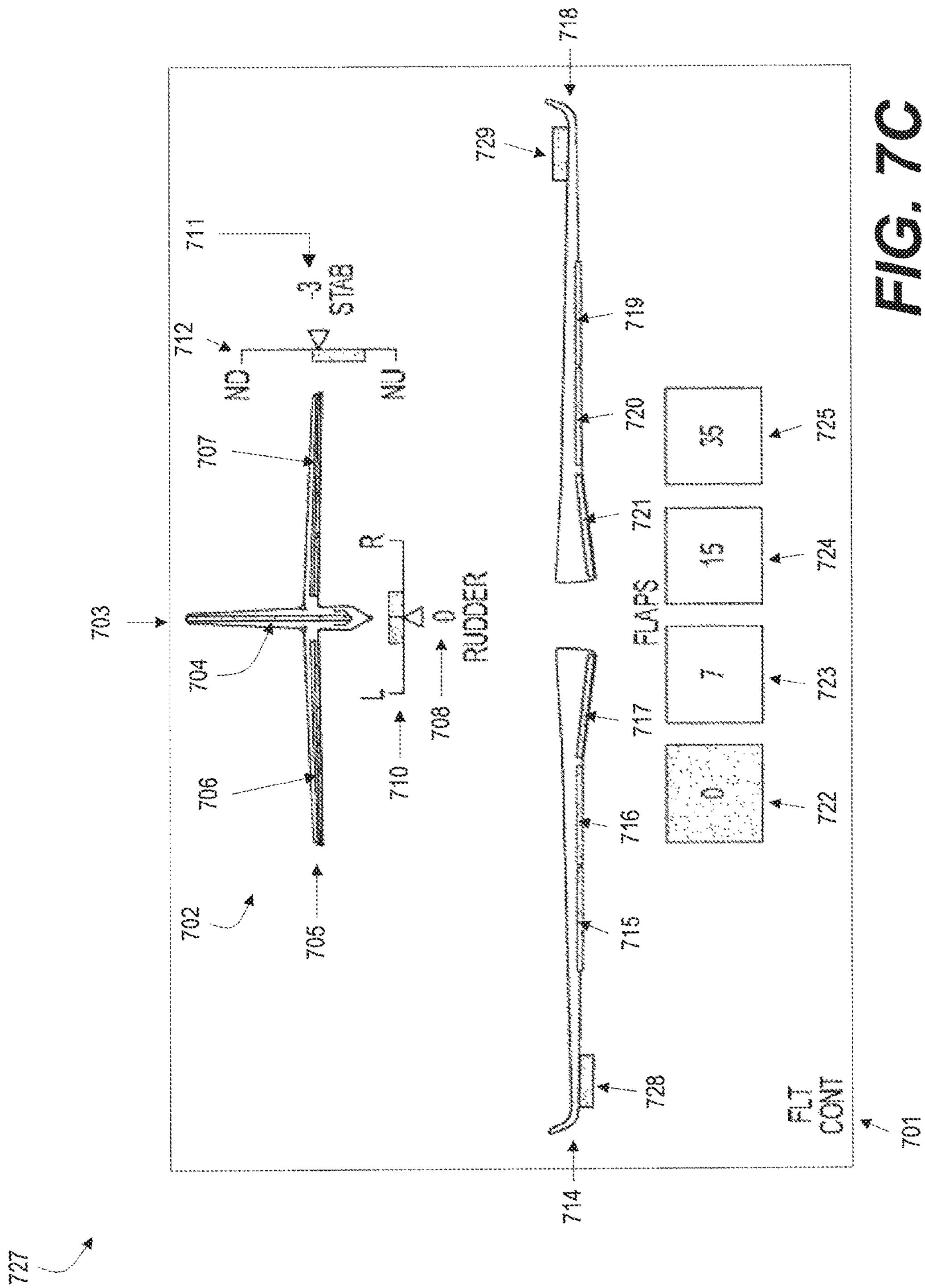
FIG. 7C depicts an aircraft flight-control system for displaying and controlling aircraft surfaces via a touch-screen instrument panel, in accordance with an embodiment of the present invention.
Figure 7D:
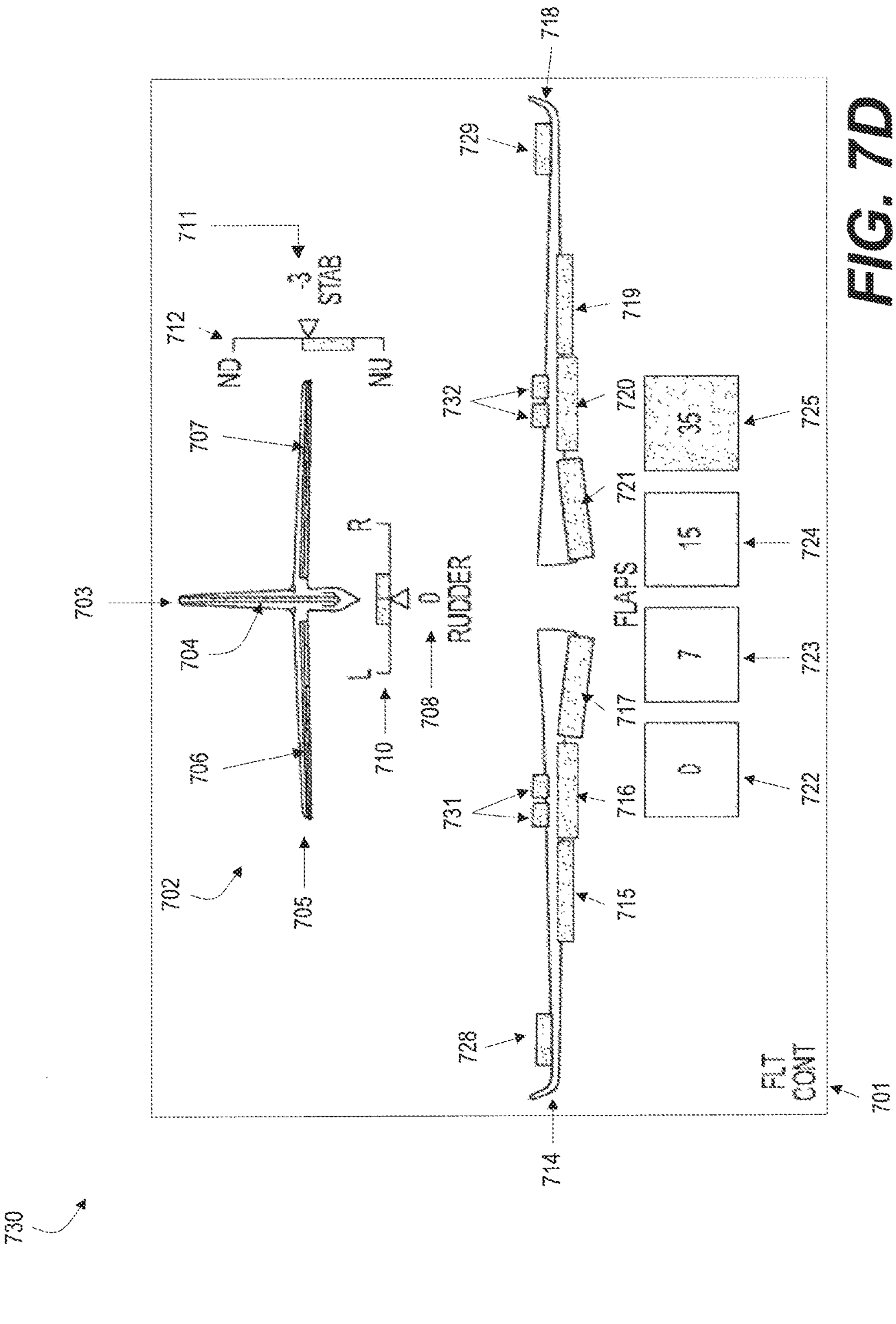
FIG. 7D depicts an aircraft flight-control system for displaying and controlling aircraft surfaces via a touch-screen instrument panel, in accordance with an embodiment of the present invention.

In addition to graphical and numerical position indicators used to display aircraft flight-control information, aircraft flight-control system 700 may be configured to receive selections for controlling aircraft surfaces. For example, a series of displayed flap angle options are configured to receive selections of flap angles. FIGS. 7A through 7D show exemplary flap angle options including a zero degree flap option 722, a seven degree flap option 723, a fifteen degree flap option 724, and a thirty-five degree flap option 725. FIGS. 7A and 7C show zero degree flap option 722 highlighted, indicating that selection of a zero degree position was received for fully retracted aircraft flaps. FIGS. 7B and 7D show thirty-five degree flap option 725 highlighted, indicating that selection of a thirty-five degree position was received for fully deployed aircraft flaps.

Controlling flap angles by receiving flap angle selections via TSIP 210 is an improvement over prior art methods that use a monument mounted in the pedestal. An aircraft flap controller is essentially a lever mounted to an electrical resolver, which reads the position of the flap handle lever and converts that position to a digital signal. The signal is interpreted as a command to the flap driver in the wing, which moves the flap surface. Aircraft flight-control system 700 replaces the monument and generates identical digital signals upon receiving selections via TSIP 210. One advantage of using TSIP 210 is to avoid the need for the pedestal, which removes potential for foot strikes on the flap controller.

Aircraft flight-control system 700 displays actual (measured) positions of flight-control surfaces. Thus, if selection is received to deploy the flaps, for example, but one or more flaps does not move, the actual state of each flap is displayed, not the intended position. This provides the flight crew with greater situational awareness in the event of a suspected malfunction with a flight-control surface.

During movement of a flight-control surface, corresponding graphical and numerical indicators may display the actual position accordingly. For example, if the aircraft's rudder moves to the right, rudder graphical indicator 710 indicates a rudder position to the right, and rudder numerical indicator 708 displays a numeric position in degrees, with respect to the aircraft's vertical stabilizer. In an embodiment, rudder display 704 also graphically indicates a rudder position to the right with respect to the aircraft's vertical stabilizer. In another embodiment, rudder display 704 is configured to blink to represent rudder movement.

When a desired position is not reached by a flight-control surface, one or more warning signals may be displayed via the graphical and numerical indicators. For example, if selection is received for thirty-five degree flap option 725 but one or more flaps does not reach thirty-five degrees below nominal (i.e., fully deployed), the corresponding graphical indicator for each faulty flap may be highlighted in a different shade or color. For example, a nominal graphical indicator may be green, whereas a caution is amber and a warning is red. In an embodiment, a warning includes a flashing graphical indicator to attract attention. In another embodiment, noises are made to attract attention to a warning. If a surface that is supposed to work in unison, such as the three flap panels, malfunctions, the system changes the flight-control surface color from green to amber or red. As an example, selection is received to deploy the flaps to thirty-five degrees, but middle flap panel on the right wing deploys to seven degrees, middle flap display 720 would produce a warning signal. Thus the graphical representation of aircraft flight-control system 700 provides the flight crew with a quick visual guide to the state of each flight-control surface for improved situational awareness.

FIG. 7C depicts an exemplary aircraft flight-control system 727 for displaying aircraft surfaces and receiving selections to control aircraft surfaces via TSIP 210. Aircraft flight-control system 727 is an example of aircraft flight-control system 700 of FIG. 7A. Aircraft flight-control system 727 includes a left wing aileron display 728 and a right wing aileron display 729. Ailerons are flight-control surfaces used to roll an aircraft for banking while turning. Ailerons are typically activated when a pilot makes an input with a control stick but may be controlled via TSIP 210 as an embodiment of aircraft flight-control system 727. The resulting position of the ailerons may be displayed on TSIP 210 via aircraft flight-control system 727. For example, when a right banking turn has been initiated, the aircraft's left wing aileron drops below the wing and the aircraft's right wing aileron lifts above the wing. Accordingly, aircraft flight-control system 727 displays left wing aileron display 728 below left wing image 714 and right wing aileron display 729 above right wing image 718, as shown in FIG. 7C. In certain situations both ailerons of an aircraft may be in a position above the wing for slowing the aircraft without rolling (see for example, FIG. 7D).

FIG. 7D depicts an exemplary aircraft flight-control system 730 for displaying aircraft surfaces and receiving selections to control aircraft surfaces via TSIP 210. Speed brakes are flight-control surfaces used to slow an airplane by creating drag. FIG. 7D illustrates exemplary locations of a left wing speed brake display 731 and a right wing speed brake display 732 above middle flap displays 716, 720 on top of left and right wing images 714, 718, respectively. Each aircraft speed brake may include one or more panels. For example, FIG. 7D shows two panels per left and right speed brake display, 731, 732, respectively. Speed brakes are deployed typically during landing but also during flight, by using a lever next to throttles on the pedestal, and aircraft flight-control system 730 is configured to display the resulting speed brake positions. Specifically, FIG. 7D illustrates fully deployed speed brakes with left and right wing speed brake displays 731, 732 shown above left and right wing images 714, 718, respectively. In an embodiment, left and right speed brake displays 731, 732 are configured to receive selections for controlling positions of the aircraft's speed brakes.

Figure 7E:
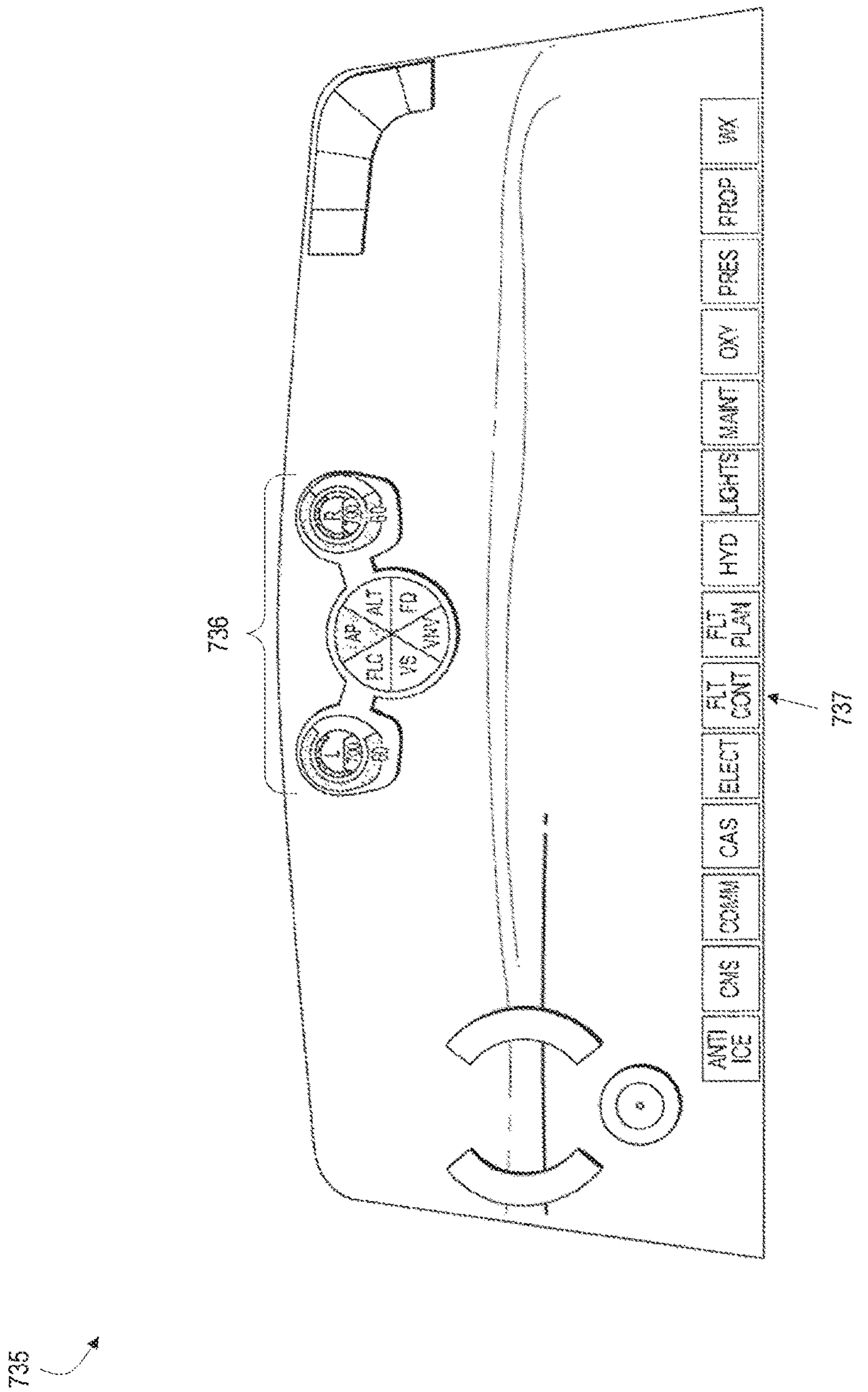
FIG. 7E depicts an aircraft flight-control system for displaying and controlling aircraft engines and autopilot on a touch-screen instrument panel, in accordance with an embodiment of the present invention.

FIG. 7E depicts an exemplary TSIP 735, which is an example of TSIP 210 of FIG. 2. FIG. 7E illustrates a combined mode controller and engine indicator 736 located in the upper middle portion of TSIP 735. Combined mode controller and engine indicator 736 displays a mode controller for controlling aircraft autopilot options and for visualizing engine information. In an embodiment, combined mode controller and engine indicator 736 is configured to be displayed in a convenient location between the pilot and co-pilot, as shown in FIG. 7E, but it may be displayed in any location on TSIP 210 without departing from the scope hereof. Aircraft flight-control system 700 may be selected from a menu, such as menu 150 of FIG. 1. Specifically, a FLT CONT 737 menu option may be used to select aircraft flight-control system 700, as shown in FIG. 7E.

Figure 7F:
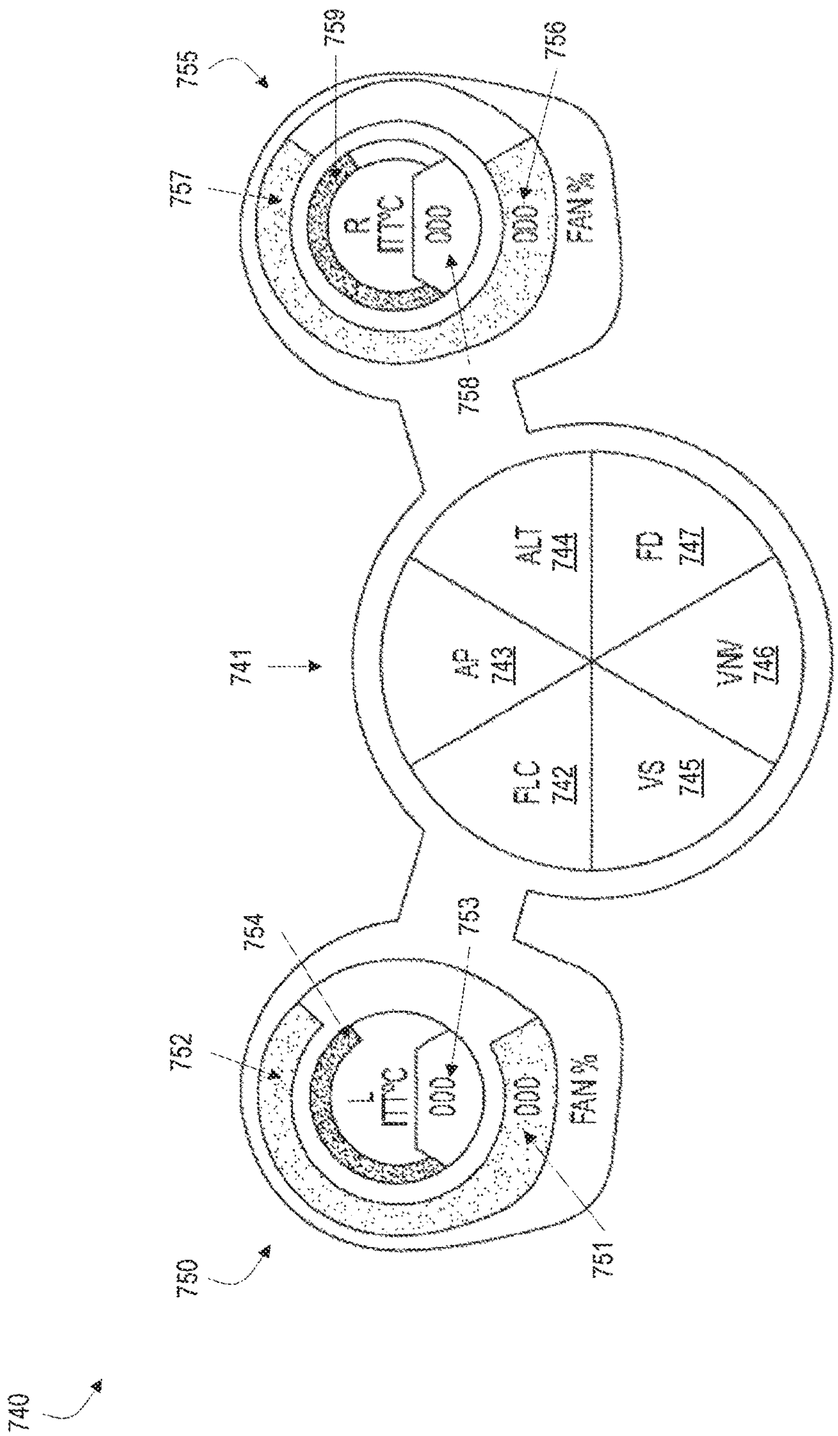
FIG. 7F depicts an aircraft flight-control system for displaying aircraft engine indicators and for displaying and controlling autopilot options via a touch-screen instrument panel, in accordance with an embodiment of the present invention.

FIG. 7F depicts a combined mode controller and engine indicator 740, which is an example of combined mode controller and engine indicator 736 of FIG. 7E. Combined mode controller and engine indicator 740 is designed to represent the shape of an aircraft's fuselage and engine cowlings, wherein the fuselage portion includes a mode controller 741 and the engine cowlings include a left engine indicator 750 and a right engine indicator 755. Combined mode controller and engine indicator 736 receives data from the aircraft's data busses and processes data using onboard computer 201 to determine left and right engine performance and displays the performance data on TSIP 210.

Mode controller 741 includes options for selection of various autopilot control functions via TSIP 210 including, but not limited to, Flight Level Change (FLC) 742, Autopilot (AP) 743, Altitude (ALT) 744, Vertical Speed (VS) 745, Vertical Navigation (VNV) 746, and Flight Director (FD) 747. Once selection of an autopilot mode is made, the respective portion of mode controller 741 may be highlighted, with a different shade or color for example.

Left engine indicator 750 and a right engine indicator 755 provide the flight crew with a graphical and numerical representation of engine performance and status. FIG. 7F shows an exemplary combined mode controller and engine indicator 740 for a dual-engine aircraft, but combined mode controller and engine indicator 740 could be configured to display engine indicators for a single-engine or triple-engine aircraft, without departing from the scope hereof.

Left engine indicator 750 includes a fan speed numerical display 751 and a fan speed graphical display 752. Similarly, right engine indicator 755 includes a fan speed numerical display 756 and a fan speed graphical display 757. Fan speed numerical displays 751 and 756 include numerical indicators of fan speed, for example, as a percentage of a pre-determined maximum fan speed, corresponding to the aircraft's left and right engine fan speeds, respectively. Fan speed graphical displays 752 and 757 include graphical indicators of fan speed, such as a graphical dial for example, corresponding to fan speed of the aircraft's left and right engines, respectively. Graphical displays 752 and 757 may include various shading or coloring to convey fan speed information. For example, fan speeds less than eighty percent may be colored green, while fan speeds between eighty and eighty-nine percent may be colored amber to indicate caution, and fans speeds of ninety percent or greater may be colored red to provide a warning signal. In an embodiment, fan speed graphical displays 752 and 757 include gradients of shading or coloring between different shades or colors, respectively. In an embodiment, fan speed numerical displays 751 and 756 include coloring or shading that matches fan speed graphical displays 752 and 757, respectively.

Left engine indicator 750 includes an Interstage Turbine Temperature (ITT) numerical display 753 and an ITT graphical display 754. Similarly, right engine indicator 755 includes an ITT numerical display 758 and an ITT graphical display 759. ITT numerical displays 753 and 758 include numerical indicators of temperature, for example in degrees Celsius, corresponding to measured temperature of the aircraft's left and right engines, respectively. ITT graphical displays 754 and 759 include graphical status indicators that change shade or color, for example, corresponding to temperature changes for the aircraft's left and right engines, respectively, and to provide warnings of anomalous performance. In an embodiment, ITT numerical displays 753 and 758 change shade or color to match the shade or color of ITT graphical displays 754 and 759, respectively Each of the numerical and graphical displays for the engine indicators, shown in FIG. 7F and described above, may be configured to receive selections for responding to warning signals. For example, selection of a numerical or graphical display provides a list of options displayed on TSIP 210, which may include standard operating procedures and checklists from databases 230 for alleviating anomalous performance.

Figure 7G:
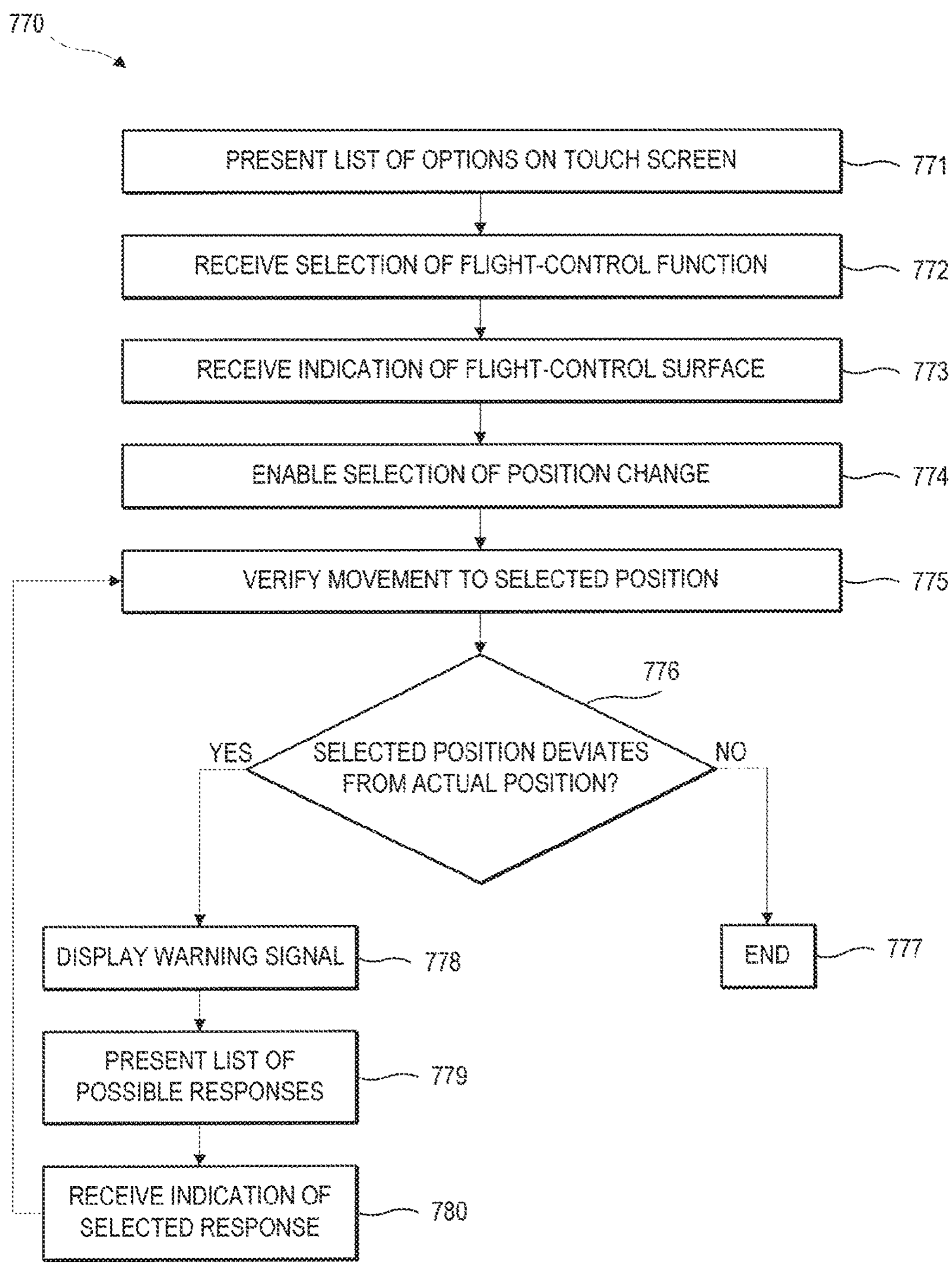
FIG. 7G shows steps of an aircraft flight-control method for displaying and controlling aircraft surfaces via a touch screen instrument panel, in accordance with an embodiment of the present invention.

FIG. 7G depicts an exemplary aircraft flight-control method 770 for controlling aircraft flight-control surfaces via TSIP 210. In step 771, a list of menu options is presented. In an example of step 771, a list of menu options, including a flight-control option 737, is presented on TSIP 210, as shown in FIG. 7E.

In step 772, a selection of an aircraft flight-control function is received. In an example of step 772, selection of aircraft flight-control system 700 (of FIG. 7A) is received via flight-control option 737 of TSIP 210, as shown in FIG. 7E.

In step 773, an indication is received to identify a flight-control surface to control. In an example of step 773, an indication is received to control flaps via flap angle options including zero degree flap option 722, seven degree flap option 723, fifteen degree flap option 724, and thirty-five degree flap option 725, as shown in FIGS. 7A through 7D. Note that aircraft flight control system 700 may be configured to continuously display instantaneous positions of flight-control surfaces, before, during and after an indication is received to control flight-control surfaces.

In step 774, a selection is enabled to initiate a position change for the selected flight-control surface. In an example of step 774, flap angle options are enabled for selection to change flap positions including zero degree flap option 722, seven degree flap option 723, fifteen degree flap option 724, and thirty-five degree flap option 725, as shown in FIGS. 7A through 7D. In an embodiment, zero degree flap option 722 is selected, as shown in FIGS. 7A and 7C. In another embodiment, thirty-five degree flap option 725 is selected, as shown in FIGS. 7B and 7D.

In step 775, a corresponding movement to a selected position is verified for the aircraft flight-control surface. Example flight-control surfaces include the aircraft's horizontal stabilizer, elevator, rudder, aileron, speed brake, and flap. Movement of flight-control surfaces may be controlled by aircraft flight-control system 700 or by other automatic or pilot initiated controls such as a control stick or rudder pedals. In an example of step 775, following selection of zero degree flap option 722, flap displays 715, 716, 717, 719, 720, 721 are configured to indicate fully retracted flap positions and zero degree flap option 722 is highlighted, as shown in FIGS. 7A and 7C. Fully retracted flap positions are measured, for example, by sensors configured to detect each fully retracted flap and send a corresponding signal to TSIP 210 via onboard computer 201. In another example of step 775, following selection of thirty-five degree flap option 725, flap displays 715, 716, 717, 719, 720, 721 are configured to indicate fully deployed flap positions and thirty-five degree flap option 725 is highlighted, as shown in FIGS. 7B and 7D. Fully deployed flap positions are measured, for example, by sensors configured to detect each fully deployed flap and send a corresponding signal to TSIP 210 via onboard computer 201. Example sensors include contact switches, magnetic contact switches, resolvers, and non-contact interlock switches.

Step 776 is a decision to determine if the selected position deviates from an actual position. If in step 776, the selected and actual positions are determined to be the same (i.e., they essentially do not deviate from one another), then method 770 proceeds to step 777 to end. In an example of step 776, following selection of thirty-five degree flap option 725, fully deployed flap positions are measured, and method 770 proceeds to step 777 to end. Because aircraft flight-control system 700 is configured to continuously display actual flight-control surface positions, step 776 is both simple and intuitive to perform. For example, aircraft flight-control system 726 instantaneously displays the actual position of fully-deployed flaps by highlighting thirty-five degree flap option 725 and showing flap displays 715, 716, 717, 719, 720, 721 in their fully deployed configuration, as shown in FIG. 7B.

If in step 776, the selected and actual positions are determined to deviate from one another (i.e., they are not essentially the same position), then method 770 proceeds to step 778 to display a warning signal to indicate that the selected position deviates from the actual position of the control surface. Step 778 is followed by step 779 to present a list of selections for possible responses to the warning signal. Example responses include silencing an audible warning signal, stopping a warning signal from flashing, resetting a flight-control surface to its nominal position, and repeating selection for a desired position. In step 780, an indication is received of a selected response to the warning signal, after which method 770 returns to step 775 to verify movement of the selected position to the actual position.

Figure 8A:
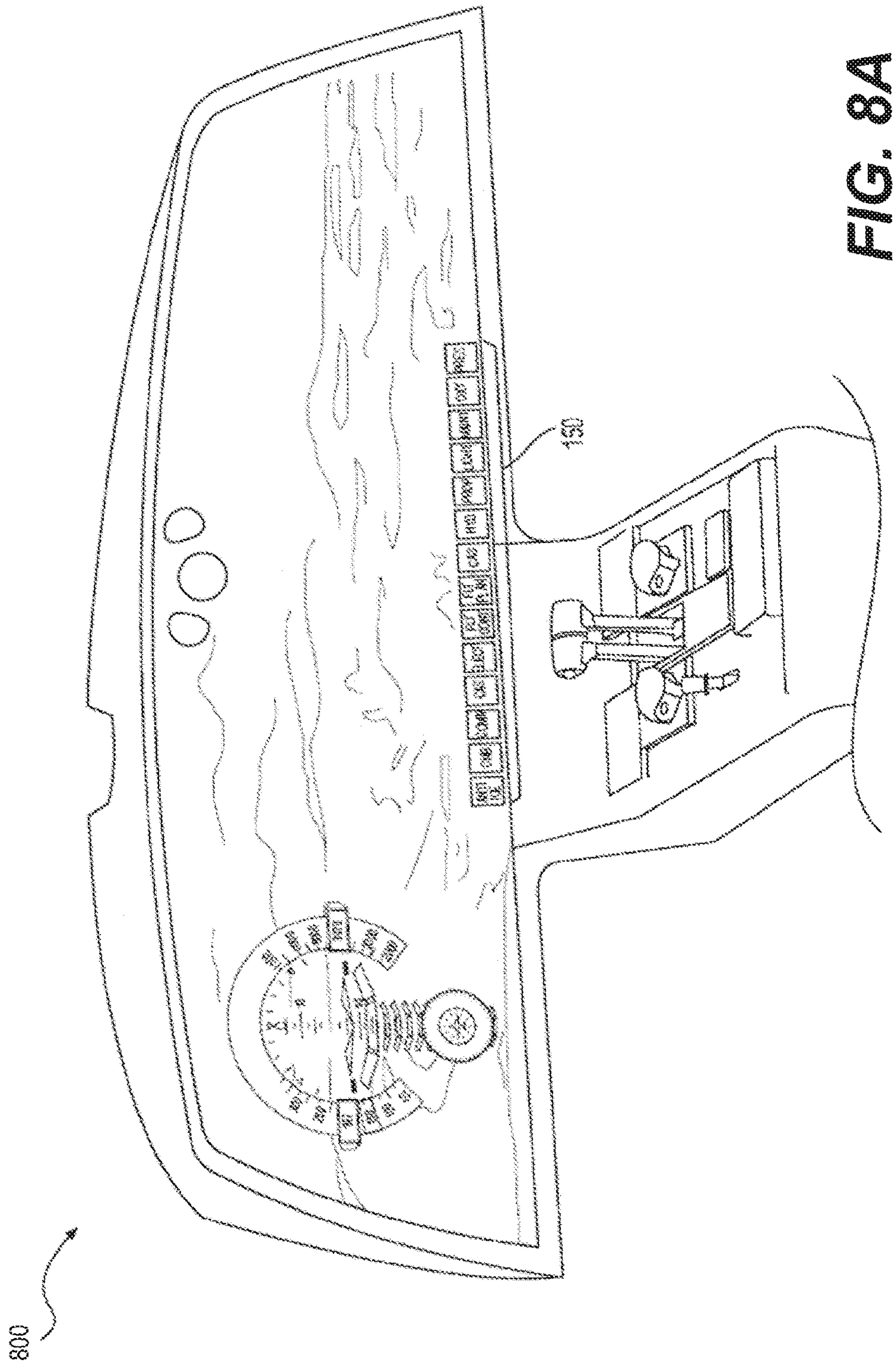
FIG. 8A depicts a touch-screen instrument panel system for an aircraft in a pre-alert state, in accordance with an embodiment of the present invention.

In embodiments, awareness-enhancing indications are communicated by displaying them on the touch screen instrument panel. In order to provide a frame of reference, FIG. 8A shows the touch screen instrument panel 100 in a pre-alert status before any warnings have been triggered. As can be seen, no windows are shown being opened up on the display 800, and the terrain image and other normal in-flight content are plainly visible. Further, none of the menu buttons 150 are presented in a way that distinguishes them from the others, other than identifying markings.

Figure 8B:
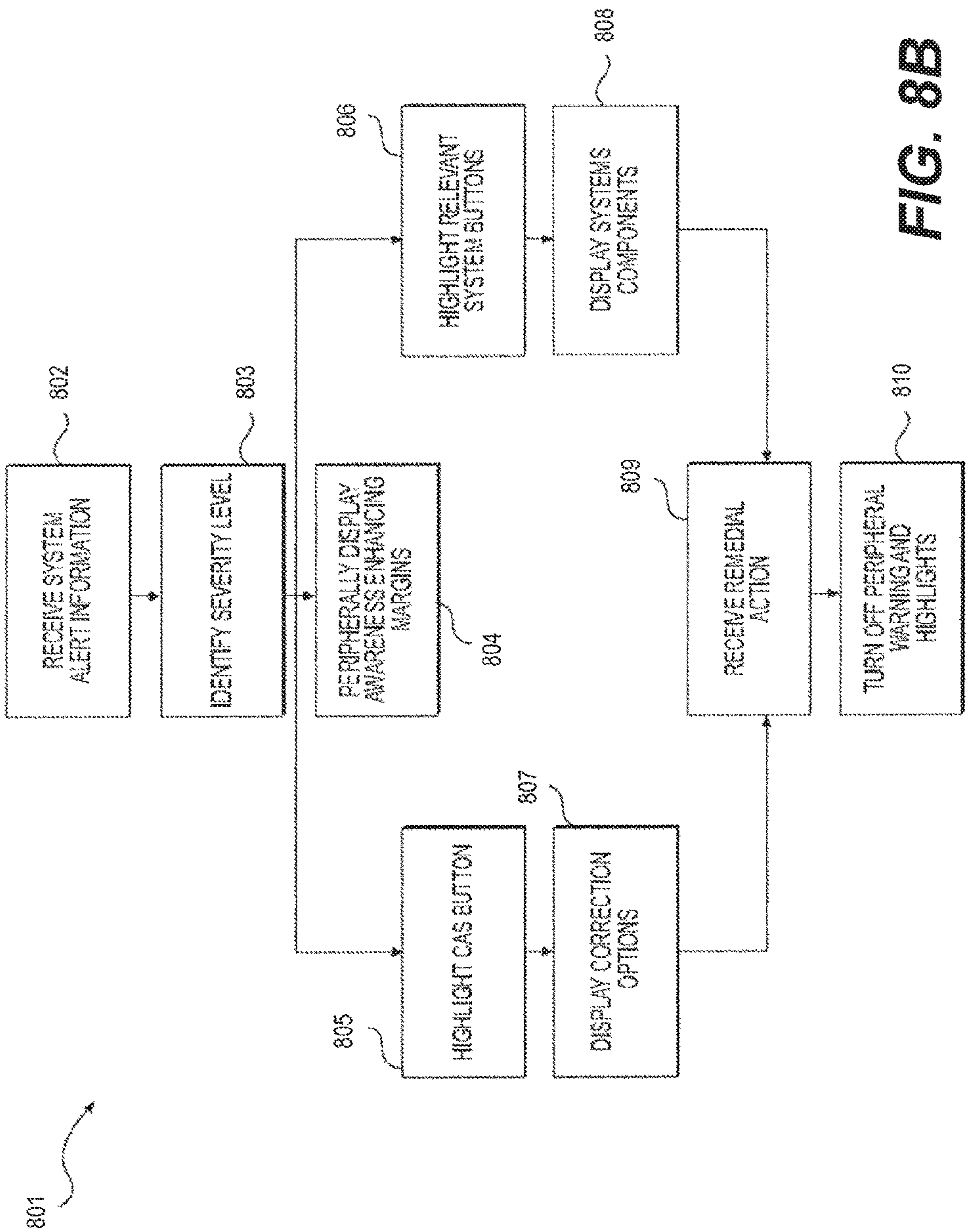
FIG. 8B depicts a flow diagram for the warning system useable with a touch screen instrument panel in an aircraft, in accordance with an embodiment of the present invention.

This changes, however, when an alert is received from the aircraft systems. Referring now to FIG. 8B, a process flow diagram 801 is representative of alert processes which might be executed on the computer 201 to increase crew awareness. In a first step 802, alert information is received from an aircraft system. In one embodiment, this information might include either TCAS or TAWS information or alerts/warnings from component 280 (See FIG. 2). Alternatively, the message might be received from aircraft flight equipment 250 regarding, e.g. an issue regarding lighting, de-icing equipment, control surfaces, etc. The information could regard any of the aircraft systems shown in FIG. 2. Regardless of the source, the type of information, when received, is normally associated with a severity level. More specifically, a level of urgency in which some corrective measures should be taken. Thus, in a step 803, the level of severity of the information is identified. For example, four levels of severity might be employed. A first level of severity may be called "informational" and colored white for conditions that do not require flightcrew response, but are for informational purposes only. A second level of severity may be called "advisory" and colored cyan (or blue) for conditions that require flightcrew awareness and may require subsequent flightcrew response. A third level of severity may be called "caution" and colored amber (or yellow) for conditions that require immediate flightcrew awareness and subsequent flightcrew response. A fourth level of severity may be called "warning" and colored red for conditions that require immediate flightcrew awareness and immediate flightcrew response. These severity levels may be referred to as part of the aforementioned color coding scheme as will be discussed hereinafter.

In a Step 804, assuming the information regards an alert at a sufficient severity level, the computer 201 causes an awareness-enhancing indication, which, in an embodiment could be a peripheral display made to alert the crew of the existence of a warning. More specifically, in some embodiments, the display is made peripherally at one or more locations. In yet further other embodiments, the display is made substantially around the entire periphery of the touch screen as can be seen in the embodiment disclosed in FIG. 8C.

Figure 8C:
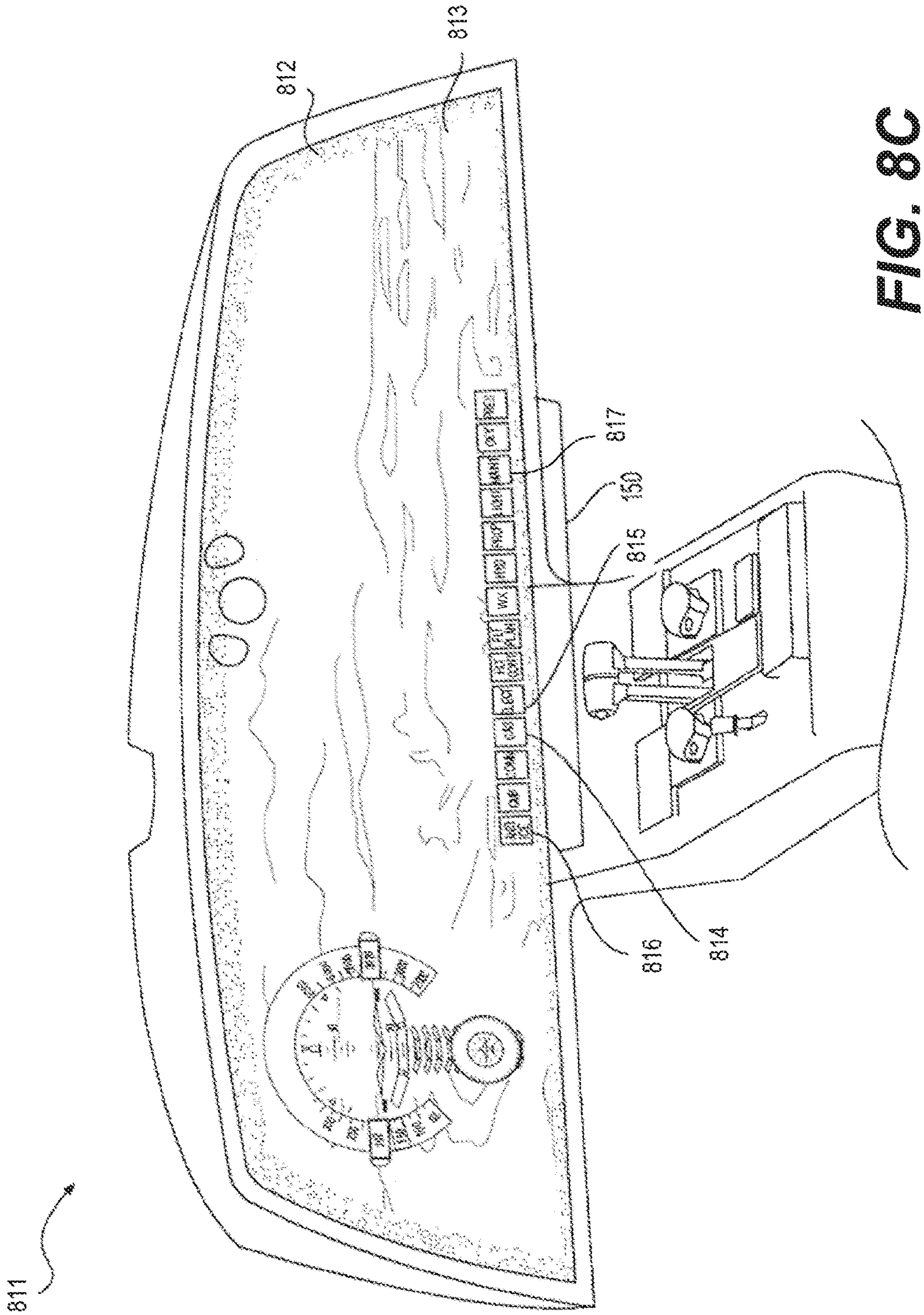
FIG. 8C depicts a touch-screen instrument panel system for an aircraft in a state where at least one alert is detected, in accordance with an embodiment of the present invention.

Referring to FIG. 8C, it can be seen that the state of the panel shown in FIG. 8A3 has changed to include the peripherally displayed graphic 813. In one embodiment, the awareness-enhancing indication is color-coded, for example, red for an extreme emergency or warning, and amber or yellow for a less extreme emergency or caution. With respect to alert information that is at lower severity levels, a process running on computer 201 may result in no peripheral graphic being displayed at all. In further embodiments, a peripheral warning graphic displayed will pulsate to draw additional extra attention. It should be evident to those skilled in the art that various colors and attraction inducing measures could be selected in order to meet this objective. It should also be evident that because of the peripheral location of the warning indication, that the crew is able to clearly see and maintain the use of most of the display area 813, while at the same time, the indication pulsing and colored at the margins is impossible to miss.

In other embodiments, or in addition to, or instead of the margin-displayed indication, the awareness-enhancing indication is provided in the form of highlighting menu options. "Highlighting" or "highlighted" as used herein means that an item is made to be differentiated from other items, or otherwise modified to increase awareness relative to that item. The use of the term should not be interpreted as requiring any particular color or other further restrictive constructions unless otherwise specified.

In terms of the process embodiment disclosed in FIG. 8B, it can be seen that a crew alert button 805 is subjected to highlighting. In terms of look-and-feel, FIG. 8C shows the crew alert button 814 as it might be highlighted on the menu 150 to enhance awareness (e.g., the crew will know that it is a menu item that should be selected to learn more about the problem, and also redress the problem).

Aside from the crew-alert button illumination (CAS) shown in 814 of FIG. 8C and shown as Step 805 in FIG. 8B, a Step 806 causes the illumination of one or more system buttons (e.g., menu buttons 815 and 817, also in FIG. 8C).

Each of these menu buttons 814, 815, and 817 can be highlighted in a number of different ways. In some embodiments, they are illuminated in a color that is the same of the particular warning level identified in Step 803. For example, for an extreme alert, a button might be illuminated in red—a color that those skilled in the art recognize as indicating a high level of seriousness. For less serious, but still important situations, the buttons might be illuminated in yellow. For moderately important situations the coloring might be blue, and for less serious items the coloring might be white.

Figure 8D:
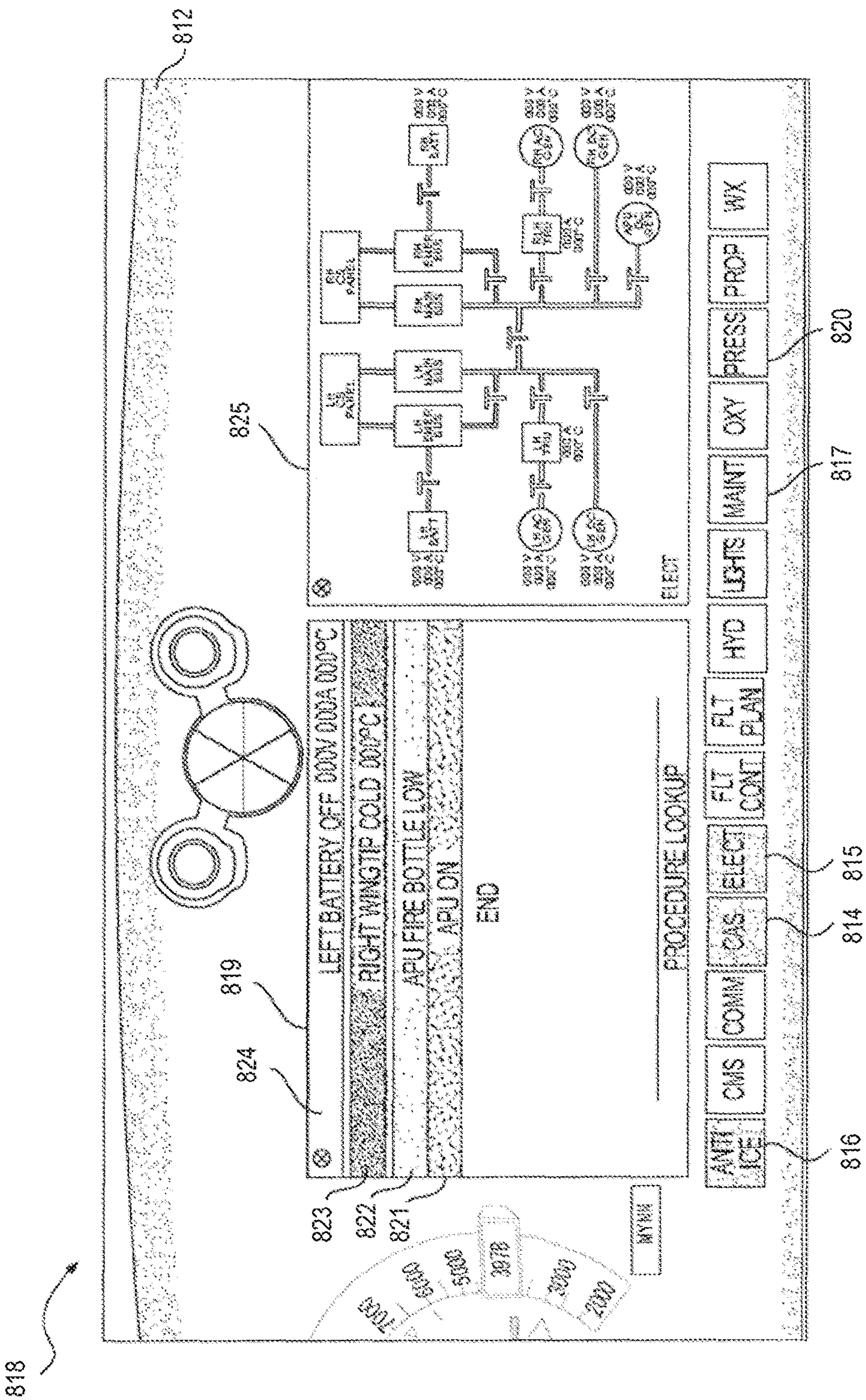
FIG. 8D depicts the panel where the crew-alert system and a system diagram window have been called up by a crew member, in accordance with an embodiment of the present invention.

Once a crew member identifies an alert exists as described wherein the peripheral area 812 is illuminated, in buttons 814, 815, and 817 are similarly highlighted by illumination, corrective measures can be taken. Button 815 "ELECT" provides, for example, electrical system schematic diagrams (see FIG. 8 and description below). Button 817 "MAINT" provides, for example, menu options for accessing maintenance issues (see FIG. 8G and description below). In order to assist the crew member in this regard, a step 807 provides that when a crew member selects the crew alert button 814, FIG. 8D shows that this will bring up a window 819 in a Step 807 where bars 821, 822, 823, and 824 are displayed. Each of bars 821, 822, 823, and 824 represents a system for which an alert exists.

Looking more closely at the crew alertness window 819, the window is initially presented in a collapsed format (as shown in FIG. 8D), but is expandable. More specifically, if the user clicks on any of bars 821, 822, 823, and 824, existing in FIG. 8D can be expanded as shown in the screen 826 shown in FIG. 8E. Note that sensed data is continuously displayed providing improved situational awareness for responding to a fault. For example, bar 823 includes a wingtip temperature reading and bar 824 includes battery voltage, current and temperature.

Figure 8E:
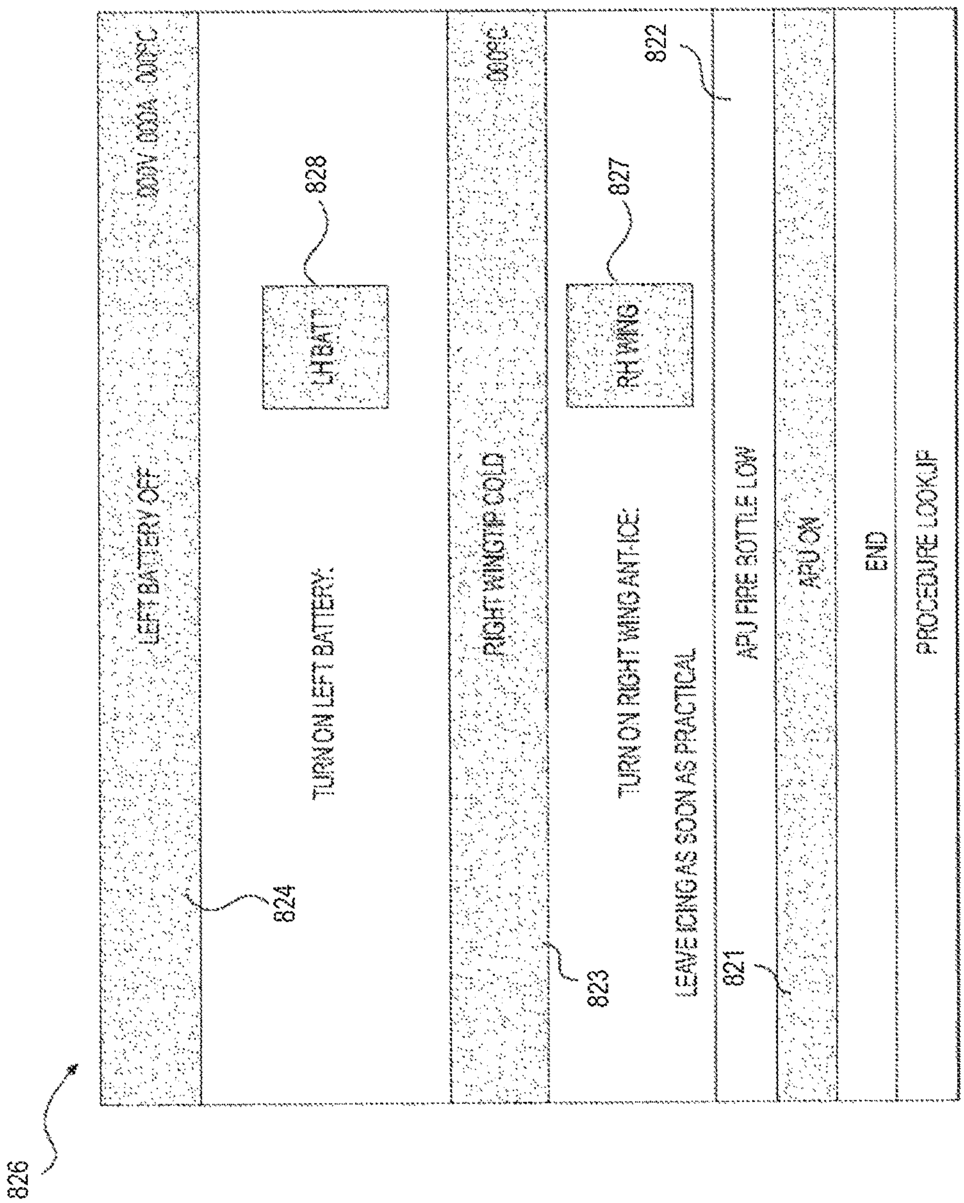
FIG. 8E depicts a crew-alert window which can be brought up by a crew person and used to rectify a condition needing attention, in accordance with an embodiment of the present invention.
Figure 8F:
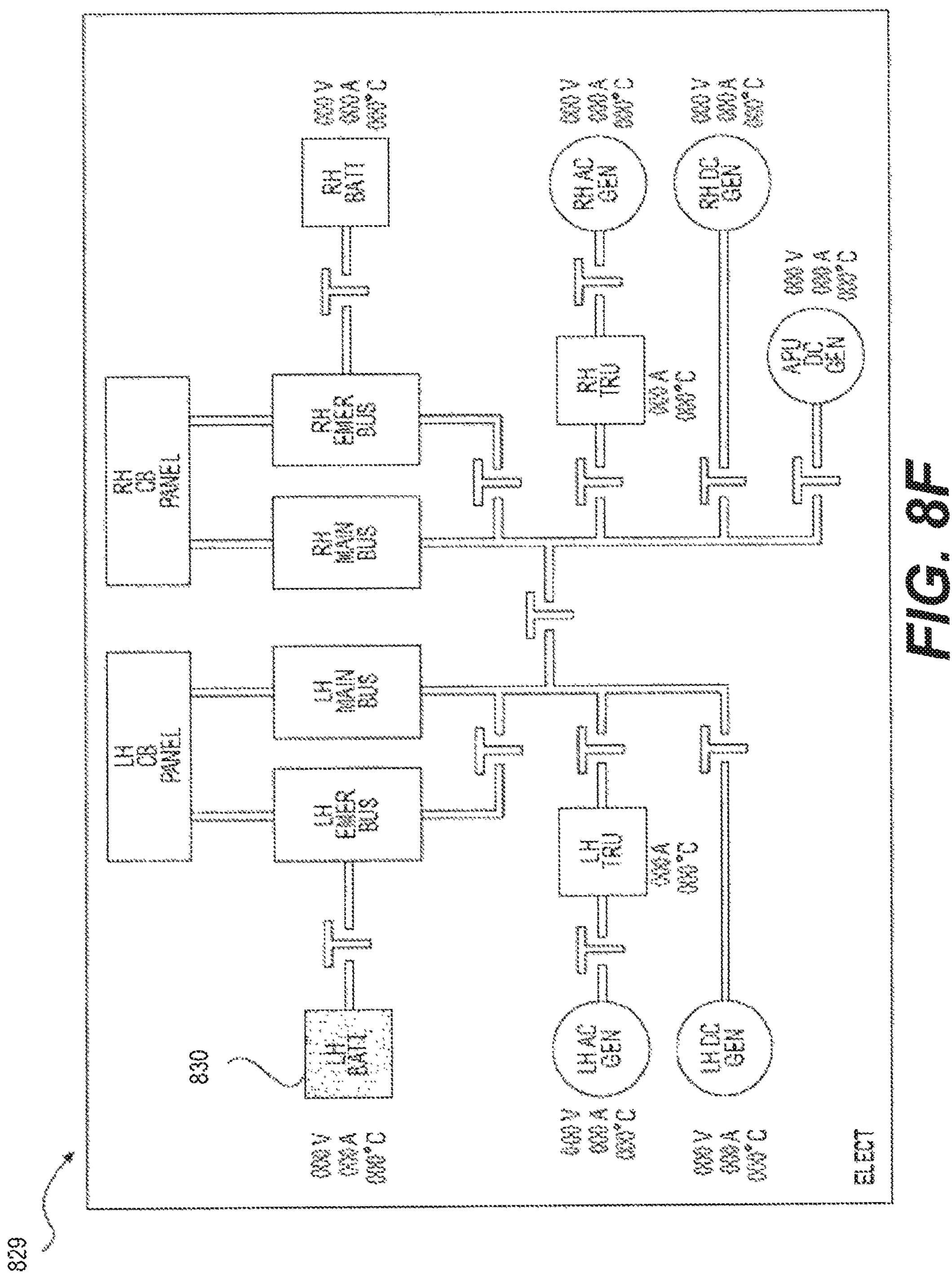
FIG. 8F depicts a synoptic window which can be brought up by a member of the crew to look at a device of concern, in accordance with an embodiment of the present invention.

Referring to FIG. 8E, and moving from bottom to top, the "APU ON" bar 821, e.g., might be color coded white to represent a low priority state of alert. One bar up, the "APU FIRE BOTTLE LOW" Bar 822 might be colored blue to reflect a slightly more concerning alert level. Above that, a bar 823 for "RIGHT WING TIP COLD" is shown in expanded form, a user having selected it. Like with bars 821 and 822, bar 823, in the present embodiment, will be color coded with respect to severity level. For example, bar 823, in embodiments, could be colored yellow, reflecting a serious event, but not an emergency.

A crew member concerned about the warning is then able to click on, and thus expand bar 823, revealing means to correct the situation. Here, temperature sensors have detected a temperature, displayed in bar 823, that is below a predetermined setpoint. Thus, the expansion of bar 823 displays an appropriate solution, that being "TURN ON RIGHT WING ANTI-ICE" which is displayed next to a button 827 labeled with "RH WING". In embodiments, action button 827 will also be highlighted in the same color of warning indication (yellow) as has been used to lead the user through the process. If the crew member selects action button 827, the anti-ice equipment will be activated with respect to the right wing, thus correcting the problem of potential ice buildup.

Bar 824, labelled as "LEFT BATTERY OFF", would operate in much the same way. For example, it might also be displayed at its respective severity level, e.g. yellow here, indicating a serious situation needing to be dealt with, but not emergency situation. Note that bar 824 may include pertinent information, such as real-time data from sensor measurements for battery voltage, current and temperature, for example. When Bar 824 is expanded as shown in FIG. 8E, an appropriate solution is displayed. For example, the user is told to "TURN ON LEFT BATTERY", and provided with a selectable field/button 828 (here "LH BATT") which when selected will turn the left battery back on, thus correcting the problem.

Procedurally speaking, the crew-alert processes enable the reaching of a solution to the warning by increasing awareness (leading the user through menus using color-coded highlighting). In FIG. 8B, these processes are represented in a Step 807. Then, when the crew makes the corrective action, the process moves on to a Step 809 where the computer receives the remedial action due to the touch screen selection made (e.g., by activating either of buttons 827 or 828).

The crew is also offered an alternative approach to reaching the same solution. More specifically, given an alert, highlighting also directs the user to find a solution to the problem by looking at a particular system involved. As will be recalled, from the discussions involving FIG. 8C, and at the same time reviewing FIG. 8B, a step 806 causes the highlighting of one or more system items (e.g., menu buttons 814 and 816 also in FIG. 8C) as is expressed in the process diagram of FIG. 8B as a step 808.

Upon the selection of highlighted menu item 815 (labeled as "ELECT" in FIG. 8F), a window 825 will be called up (see FIG. 8D). This window is shown in more detail in FIG. 8. Looking to FIG. 8, it is shown that a schematic of the electrical system is displayed. When the system screen 829 is presented, the particular component of interest will be highlighted. Here, the left-hand-side battery, or "LH BATT" 830 will be highlighted. In some embodiments, the highlighting will be in the color reflective of the warning level. For example, here, yellow just like with the crew-alert processes. If the crew member touches the "LH BATT" button, the battery will be turned back on to correct the error. Thus, this is another, alternative to direct a crew member to an appropriate solution by enhancing awareness. In other words, the system-focused processes expressed in steps 806 and 808 give the crew an alternative guided solution to reaching remedial step 809 aside from the crew-alert processes offered by following steps 805 and 807.

A similar process would also be afforded to a crew member in addressing the problem with the anti-icing system reflected by the highlighting of system button 816 (entitled "ANTI ICE"). Assuming that all the remedial actions have been taken, the computer will then turn off the peripheral warning and remove the highlighting in a Step 810.

Another aspect of the touch-screen instrument panel enables the bringing up of a graphical representation of at least one system component (e.g., possibly a device that is a part of the aircraft flight equipment 250, see FIG. 2), and then displaying information regarding a real-time value for an aircraft-parameter proximate the device relevant. The terms "graphical" or "graphic" as used herein should not be construed as requiring any particular level of vividness or realism. These terms mean simply that the graphic is identifiable as being a resemblance of something.

Figure 8G:
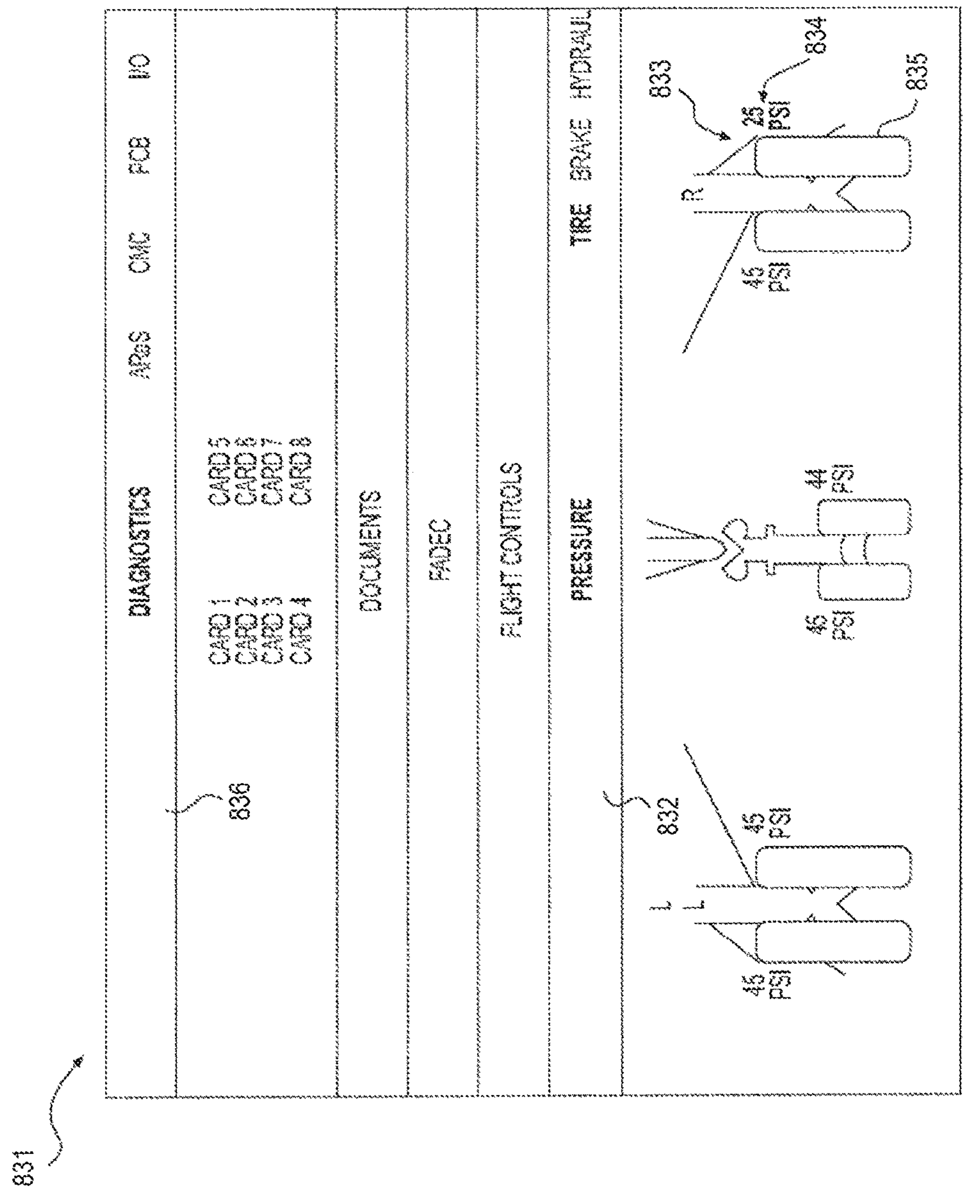
FIG. 8G depicts a maintenance window which reports real-time parameters and locates the values graphically at the positions of the components for which the readings are relevant, in accordance with an embodiment of the present invention.
Figure 8H:
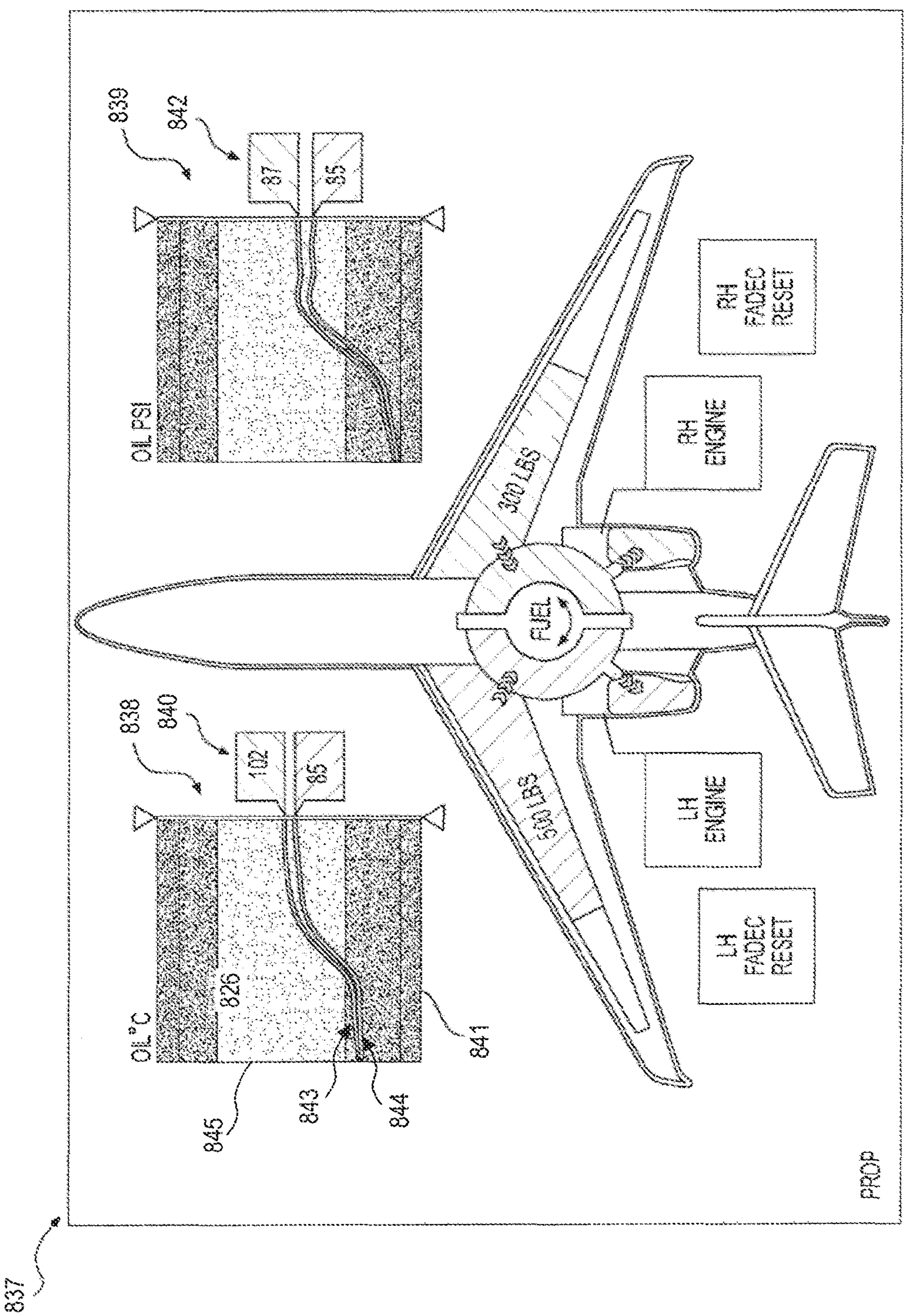
FIG. 8H depicts an embodiment for a window which can be opened up by a crew member, the window including readings of a parameter over time, thus, in a historical context.

Referring back to FIG. 8C, it can be seen that a maintenance "MAINT" button 817 is shown. When a crew member activates this button, a window like that shown in FIG. 8G is displayed. On initial opening up, all four of the bars (e.g., 832 and the three above it) would all be in a collapsed state (see discussions regarding screen 819 in FIG. 8D). FIG. 8G, however, shows two of the bars (the "PRESSURE" and "DIAGNOSTICS" bars) have been expanded by the user. It can be seen that the "PRESSURE" bar 832 has been expanded to reveal a graphic representation of a nose wheel landing gear arrangement symmetrically paired between left and right landing gear. Additionally, the real-time values for tire pressures are shown for each tire in each tire tandem. These graphical representations make it very convenient for the user in that they are able to graphically associate the real-time parameter values (e.g., PSI) with the actual physical components in the proper orientation. For example, it can be seen upon looking at the right wheel 833, that a value 834 in the right outboard tire 835 is abnormally low (25 PSI versus the normal 45 PSI). The combination of real time parameter values (e.g., tire pressures) along with the physical representations of the components makes it easy for the user to identify the problem.

It should also be understood that this maintenance window can also be brought up as a result of an alert issued. This might occur, e.g., when a parameter value (e.g., PSI) is identified as being abnormally low (e.g., the value of 25 PSI value in tire 835). Referring back to the process diagram 801 shown in FIG. 8B, an abnormal pressure level 834 detected in the left tire would trigger a warning from the aircraft systems. This warning would result in the highlighting of maintenance button 817 (according to step 806) and then, upon receipt of a selection of that button by a crew member, the maintenance window of FIG. 8G would be brought up. Bar 832 would, at that time, be collapsed, but would be highlighted in the relevant color (the same color, e.g., yellow, currently used in the highlighting of the menu item 817 and in the display of the margin warning 812). A click on the highlighted bar by a crew member, will expand the "PRESSURE" bar 832 revealing graphical representations of the wheel components as shown in FIG. 8G. This gives the crew member an additional level of awareness regarding the relative orientations of actual physical device having the problem.

Additionally, the warning-causing parameter value display 834 and/or the particular device (e.g., tire 835) in which the abnormality is occurring are (in embodiments) highlighted in a color indicating the severity level of the alarm (and consistent with the color currently used in the highlighting of the menu item 817 and margin warning 812). The result is that a user, in face of a system abnormality, is quickly navigated to the source of the problem, and can easily identify the real-time value relevant to that problem.

Expanding of the "DIAGNOSTICS" bar 836 (as shown) gives the user the ability to examine the states of the inputs and outputs of various PC cards by selecting (i.e. touch) any of the particular cards listed. Additional maintenance items may be retrieved from the maintenance window along with document look-ups stored on databases 230. This feature provides an aircraft maintenance crew with improved access to relevant maintenance information.

In another aspect which enhances crew awareness, processes are provided which give the crew a historical context for parameter values. Referring to FIG. 8C, selection of the "PROP" button brings up a screen 837 shown in FIG. 8H. Screen 837 shows one of many other possible arrangements where real time values are displayed in a historical context. These values will be recorded over time by computer 201 utilizing a database (e.g., in one of a number of databases 230 in FIG. 2). Recorded and time-stamped values for parameters (e.g., pressures, temperatures) are then called up and continually displayed as is depicted in an oil temperature chart 838 and an oil pressure chart 839. In the embodiment disclosed, chart 838 reflects two lines, a first plot 843 representative of an oil temperature for the left hand engine over time, and a second plot 844 representative of an oil temperature for the right hand engine over time. The real time current values 840 are displayed as shown for chart 838. Chart 838 includes time on an X axis 841, and includes the relevant parameter value (here, oil temperature) on a Y axis 845.

Similarly, oil pressure chart 839 enables the crew to see not only real-time values 842, but also to view them in a historical context. The historical nature of these charts is beneficial because the crew member is able to see abnormalities not only in the real time value 840, but also in the context of the past for those values.

Embodiments of the invention have been described to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed but, rather, the invention is to cover all modifications, alternative constructions, and equivalents falling within the spirit and scope of the invention.

It will be understood by those of ordinary skill in the art that the order of the steps recited herein is not meant to limit the scope of the present invention in any way and, in fact, the steps may occur in a variety of different sequences within embodiments hereof. Any and all such variations, and any combination thereof, are contemplated to be within the scope of embodiments of the present invention.

The invention claimed is:

1. A method for displaying information and receiving commands for piloting an aircraft, comprising:
- displaying a real-time external view captured by a camera mounted to the aircraft on a single touch-screen instrument panel; and
- overlaying one or more real-time interactive navigational displays over the real-time external view, such that a user maintains a heads-up view while piloting the aircraft.

2. The method of claim 1, wherein overlaying the one or more real-time interactive navigational displays comprises overlaying a flight guide over the real-time external view, the flight guide having one or more path indicators associated with spatial coordinates corresponding to the real-time external view for providing a real-time graphical representation of a flight path.

3. The method of claim 1, wherein overlaying the one or more real-time interactive navigational displays comprises overlaying a touchable icon over a nearby aircraft or a waypoint visible in the real-time external view such that an indication received via touch input displays information about the nearby aircraft or the waypoint.

4. The method of claim 1, further comprising overlaying one or more user interfaces for displaying aircraft or flight information and receiving commands via touch input.

5. The method of claim 1, further comprising moving the one or more user interfaces to a different location of the single touch-screen instrument panel to enable visualization of a different portion of the real-time external view or of the one or more real-time interactive navigational displays.

6. The method of claim 1, further comprising modifying the real-time external view by overlaying a synthetic view based on an infrared real-time image such that the external real-time view is enhanced by the synthetic view.

7. A heads-up display for an aircraft, comprising:
- a touch-screen instrument panel comprising a single interactive display;

a real-time external view provided by a camera mounted to the aircraft, the real-time external view substantially spanning the single interactive display; and a computer having a non-transitory memory for storing software instructions and a processor for executing the software instructions, the computer enabling:

at least one user interface overlaying the real-time external view to display flight or aircraft information and to receive indications for piloting the aircraft and managing the flight and aircraft information; and a navigational display overlaying a feature visible in the real-time external view.

8. The heads-up display of claim 7, wherein the single interactive display substantially extends across a cockpit of the aircraft in front of one or more pilot seats.

9. The heads-up display of claim 7, wherein the navigational display comprises a touchable icon that highlights the feature visible in the real-time external view such that an indication received via touch input displays information about the feature.

10. The heads-up display of claim 7, wherein the feature is selected from the group consisting of aircraft, airports, waypoints, and navigation stations.

11. The heads-up display of claim 7, wherein the navigational display comprises a flight guide having one or more path indicators associated with spatial coordinates corresponding to the real-time external view for providing a real-time graphical representation of a flight path.

12. The heads-up display of claim 7, further comprising an awareness-enhancing indicator for illuminating a substantial portion of a periphery of the single interactive display due to an urgent aircraft or flight condition.

13. The heads-up display of claim 7, further comprising an awareness-enhancing indicator highlighting a button of a menu corresponding to the at least one user interface for displaying flight or aircraft information pertaining to a condition that requires attention.

14. An aircraft instrument panel for piloting an aircraft, comprising:

a touch screen displaying a real-time external view captured by a forward-facing camera, the real-time external view substantially spanning the touch screen; and a computer having a non-transitory memory for storing software instructions and a processor for executing the software instructions, the computer overlaying at least one user interface over the real-time external view for displaying flight or aircraft information and receiving commands by touch input, thereby enabling a user to maintain a heads-up view while piloting the aircraft.

15. The aircraft instrument panel of claim 14, wherein the at least one user interface is moveable by touch gestures for moving to a desired location on the touch screen.

16. The aircraft instrument panel of claim 14, wherein the aircraft instrument panel replaces a physical instrument panel in a cockpit of an aircraft.

17. The aircraft instrument panel of claim 14, wherein the aircraft instrument panel replaces a pedestal and a monument in a cockpit of an aircraft.

18. The aircraft instrument panel of claim 14, wherein the at least one user interface displays a graphical image of the aircraft for displaying flight-control surface representations and one or more position indicators for indicating one or more positions of the aircraft flight-control surfaces.

19. The aircraft instrument panel of claim 18, wherein the graphical image and the position indicators are configured to receive commands by touch input for controlling positions of the aircraft flight-control surfaces and to display actual aircraft flight-control surface positions.

20. The aircraft instrument panel of claim 19, wherein the aircraft flight-control surfaces comprise flaps such that the graphical image and the position indicators of the at least one user interface replace a flap handle lever located in the monument.

* * * * *